(12) United States Patent
Ikeda et al.

(10) Patent No.: US 12,210,251 B2
(45) Date of Patent: Jan. 28, 2025

(54) LIQUID CRYSTAL LIGHT CONTROL DEVICE AND LIGHTING DEVICE

(71) Applicant: Japan Display Inc., Tokyo (JP)

(72) Inventors: Kojiro Ikeda, Tokyo (JP); Takeo Koito, Tokyo (JP); Tae Kurokawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/443,634

(22) Filed: Feb. 16, 2024

(65) Prior Publication Data

US 2024/0184170 A1 Jun. 6, 2024

Related U.S. Application Data

(63) Continuation of application No. PCT/JP2022/030182, filed on Aug. 5, 2022.

(30) Foreign Application Priority Data

Aug. 23, 2021 (JP) ................................. 2021-135953

(51) Int. Cl.
*G02F 1/1347* (2006.01)
*G02F 1/1337* (2006.01)
*G02F 1/1343* (2006.01)

(52) U.S. Cl.
CPC ...... *G02F 1/1347* (2013.01); *G02F 1/133773* (2021.01); *G02F 1/134309* (2013.01)

(58) Field of Classification Search
None
See application file for complete search history.

(56) References Cited

U.S. PATENT DOCUMENTS 5,777,706 A * 7/1998 Chen .................. G02F 1/13471
349/77
8,233,125 B2 * 7/2012 Yuh .................. G02F 1/134363
349/141

(Continued)

FOREIGN PATENT DOCUMENTS

| JP | 2010-525388 A | 7/2010 |
| JP | 2010-230887 A | 10/2010 |
| WO | WO2021/157225 A1 | 8/2021 |

OTHER PUBLICATIONS

Search Report issued in International Patent Application No. PCT/JP2022/030182, mailed Sep. 13, 2022 and English translation of same. 5 pages.

(Continued)

*Primary Examiner* — Ryan Crockett
(74) *Attorney, Agent, or Firm* — K&L Gates LLP

(57) ABSTRACT

A liquid crystal light control device includes a plurality of liquid crystal cells arranged in a stack. Each of the plurality of liquid crystal cells includes a first substrate and a second substrate opposite the first substrate, a first electrode and a second electrode both of which have a strip pattern arranged on at least one of the first substrate and the second substrate, a first alignment film on the first substrate and a second alignment film on the second substrate, and a liquid crystal layer between the first substrate and the second substrate. The strip pattern is arranged alternately with the first electrode and the second electrode, an alignment direction of the first alignment film is aligned with a direction of extension of the strip pattern, and an alignment direction of the second alignment film is arranged intersecting the alignment direction of the first alignment film.

11 Claims, 29 Drawing Sheets

(56) References Cited

U.S. PATENT DOCUMENTS

| | | | | |
|---|---|---|---|---|
| 9,058,782 | B2* | 6/2015 | Fan | G09G 3/3607 |
| 2010/0026920 | A1* | 2/2010 | Kim | H04N 13/305 |
| | | | | 349/33 |
| 2010/0149444 | A1* | 6/2010 | Hikmet | G02F 1/134363 |
| | | | | 349/122 |
| 2011/0059670 | A1* | 3/2011 | Jin | G02F 1/1323 |
| | | | | 445/24 |
| 2013/0235288 | A1* | 9/2013 | Takama | G02F 1/1343 |
| | | | | 349/200 |
| 2016/0065950 | A1* | 3/2016 | Quan | G02F 1/1339 |
| | | | | 348/51 |
| 2016/0252782 | A1* | 9/2016 | Wang | G02F 1/134309 |
| | | | | 349/96 |
| 2018/0196318 | A1* | 7/2018 | Presniakov | G02F 1/134363 |
| 2019/0025657 | A1* | 1/2019 | Presniakov | G02F 1/133504 |
| 2020/0050076 | A1* | 2/2020 | Galstian | G02B 27/0927 |
| 2022/0128869 | A1* | 4/2022 | Tanaka | G02F 1/1347 |
| 2022/0187647 | A1* | 6/2022 | Nagasawa | G02F 1/1347 |
| 2022/0260217 | A1* | 8/2022 | Hasegawa | F21V 11/06 |
| 2022/0373831 | A1* | 11/2022 | Koito | G02F 1/13756 |
| 2023/0359091 | A1* | 11/2023 | Kurokawa | G02F 1/13439 |
| 2023/0418108 | A1* | 12/2023 | Ikeda | G02F 1/1347 |
| 2023/0418119 | A1* | 12/2023 | Ikeda | G02F 1/134309 |
| 2024/0004243 | A1* | 1/2024 | Koito | G02F 1/134309 |
| 2024/0045276 | A1* | 2/2024 | Koito | G02F 1/1343 |
| 2024/0045282 | A1* | 2/2024 | Ikeda | G02F 1/134309 |

OTHER PUBLICATIONS

Written Opinion issued in International Patent Application No. PCT/JP2022/030182, mailed Sep. 13, 2022. 4 pages.

English translation of Office Action issued in related Japanese Patent Application No. 2023-543793, mailed on Aug. 6, 2024. 4 pages.

English translation of Office Action issued in related Korean Patent Application No. 10-2024-7005583, dated Nov. 18, 2024. 11 pages.

* cited by examiner

First Configuration

Second Configuration

Reference Example

LIQUID CRYSTAL LIGHT CONTROL DEVICE AND LIGHTING DEVICE

CROSS-REFERENCE TO RELATED APPLICATIONS

This application is a Continuation of International Patent Application No. PCT/JP2022/030182, filed on Aug. 5, 2022, which claims the benefit of priority to Japanese Patent Application No. 2021-135953, filed on Aug. 23, 2021, the entire contents of which are incorporated herein by reference.

FIELD

An embodiment of the present invention relates to a device that controls the light distribution of light emitted from a light source by utilizing the electro-optical effect of liquid crystals. Another embodiment of the present invention relates to a device arranged with a device that controls the light distribution of light emitted from a light source using the electro-optical effect of liquid crystals.

BACKGROUND

A lighting device provided with liquid crystal lenses is disclosed. For example, a lighting device is disclosed in which two liquid crystal lenses are overlapped and the overlap of strip-shaped transparent electrodes arranged on each liquid crystal lens is adjusted to eliminate uneven light illumination (refer to Japanese Unexamined Patent Application Publication No. 2010-230887).

SUMMARY

A liquid crystal light control device in an embodiment according to the present invention includes a plurality of liquid crystal cells arranged in a stack, wherein each of the plurality of liquid crystal cells includes a first substrate and a second substrate opposite the first substrate, a first electrode and a second electrode both of which have a strip pattern arranged on at least one of the first substrate and the second substrate, a first alignment film on the first substrate and a second alignment film on the second substrate, and a liquid crystal layer between the first substrate and the second substrate. The plurality of liquid crystal cells is arranged overlapping each other, the strip pattern is arranged alternately with the first electrode and the second electrode, a voltage is applied to form a transverse electric field between the first electrode and the second electrode, the alignment direction of the first alignment film is arranged to intersect the extending direction of the strip pattern, and an alignment direction of the second alignment film is arranged to intersect the alignment direction of the first alignment film.

DESCRIPTION OF EMBODIMENTS

Hereinafter, embodiments of the present invention are described with reference to the drawings. However, the present invention can be implemented in many different aspects, and should not be construed as being limited to the description of the following embodiments. For the sake of clarifying the explanation, the drawings may be expressed schematically with respect to the width, thickness, shape, and the like of each part compared to the actual aspect, but this is only an example and does not limit the interpretation of the present invention. For this specification and each drawing, elements similar to those described previously with respect to previous drawings may be given the same reference sign (or a number followed by a, b, etc.) and a detailed description may be omitted as appropriate. The terms "first" and "second" appended to each element are a convenience sign used to distinguish them and have no further meaning unless otherwise explained.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

The term "optical rotation" as used herein refers to a phenomenon in which a linearly polarized component rotates its polarization axis as it passes through the liquid crystal layer.

The term "alignment direction" of an alignment film herein refers to the direction in which the liquid crystal molecules are aligned on the alignment film by a treatment (for example, rubbing treatment) that imparts an orientation-restricting force on the alignment film. When the treatment performed on the alignment film is a rubbing treatment, the alignment direction of the alignment film is usually the rubbing direction.

The "direction of extension" of a strip pattern herein refers to the direction in which the long side of a pattern having a short side (width) and a long side (length) extends when the strip pattern is viewed in a plan view. The strip pattern shall include a rectangular pattern in a plan view, and shall also include a pattern that bends or curves at least once in the middle of its long side.

The term "polar angle" as used herein refers to an angle formed by a normal direction of a principal surface of a liquid crystal panel and a traveling direction of emitted light.

Figure 1:
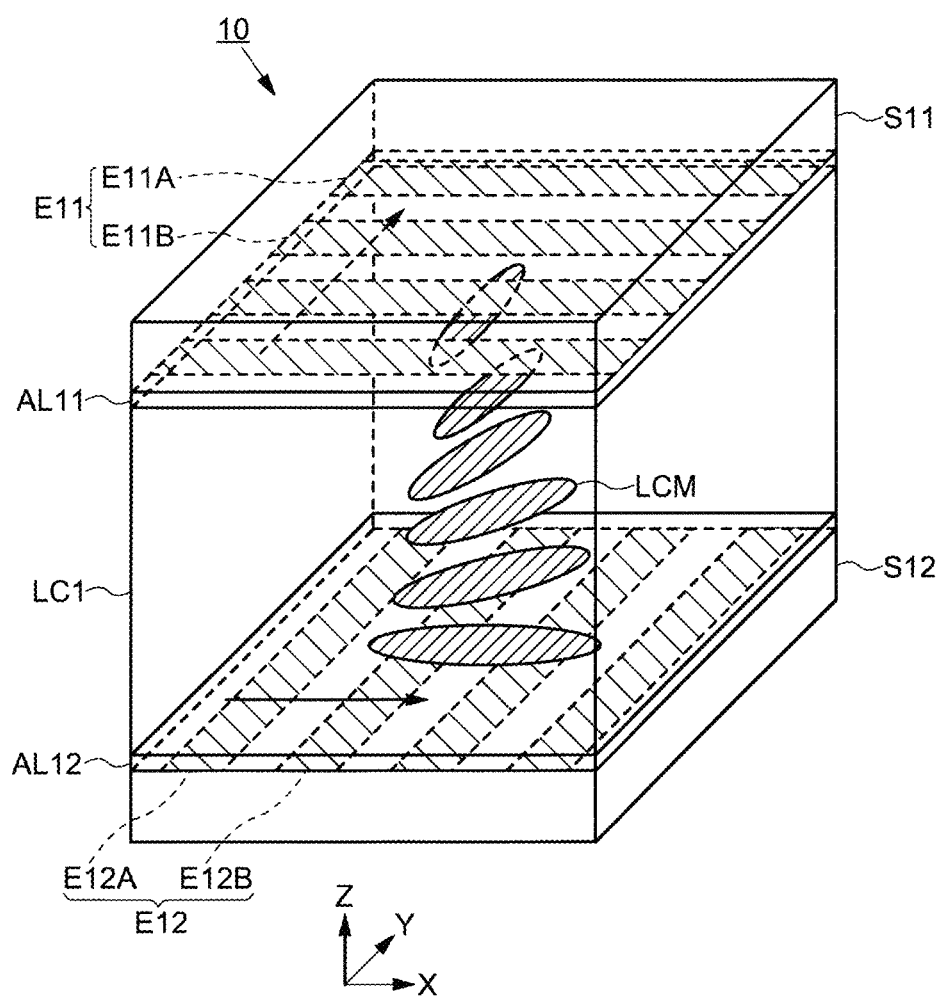
FIG. 1 is a perspective view showing a structure of a liquid crystal cell configuring a liquid crystal light control device according to an embodiment of the present invention.

FIG. 1 is a diagram of the configuration of a first liquid crystal cell 10. The first liquid crystal cell 10 includes a first substrate S11 and a second substrate S12, and a first liquid crystal layer LC1 between the first substrate S11 and the second substrate S12. The first substrate S11 is arranged with a first electrode E11 and a first alignment film AL11, and the second substrate S12 is arranged with a second electrode E12 and a second alignment film AL12. The first alignment film AL11 covers the first electrode E11 and the second alignment film AL12 covers the second electrode E12. The first electrode E11 and the first alignment film AL11 are arranged on the first liquid crystal layer LC1 of the first substrate S11 side, and the second electrode E12 and the second alignment film AL12 are arranged on the first liquid crystal layer LC1 side of the second substrate S12. The first electrode E11 and the second electrode E12 face each other across the first liquid crystal layer LC1.

The first electrode E11 includes a first strip electrode E11A and a second strip electrode E11B having a strip pattern (or comb-shaped pattern). The second electrode E12 includes a third strip electrode E12A and a fourth strip electrode E12B having a strip pattern (or comb-shaped pattern). A plurality of first strip electrodes E11A and second strip electrodes E11B are arranged alternately on the insulating surface of the first substrate S11, and a plurality of third strip electrodes E12A and fourth strip electrodes E12B are arranged alternately on the insulating surface of the second substrate S12.

FIG. 1 shows X, Y, and Z axis directions for illustration. The first liquid crystal cell 10 has the first strip electrode E11A and a plurality of second strip electrodes E11B arranged in a direction parallel to the X-axis direction, while the third strip electrode E12A and a plurality of fourth strip electrodes E12B are arranged in a direction parallel to the Y-axis direction. The third strip electrode E12A and the fourth strip electrode E12B are arranged to intersect the first strip electrode E11A and the second strip electrode E11B. The direction of extension of the first strip electrode E11A and the second strip electrode E11B intersects the direction of extension of the third strip electrode E12A and the fourth strip electrode E12B, for example, within 90±10 degrees, preferably orthogonally (90 degrees).

The first alignment film AL11 and the second alignment film AL12 have an alignment regulating force that is roughly parallel to a principal plane of the respective substrates. The alignment direction of the first alignment film AL11 is aligned in the direction that intersects the direction of extension of the first strip electrode E11A and the second strip electrode E11B (Y-axis direction), and the alignment direction of the second alignment film AL12 is aligned in the direction that intersects the direction of extension of the third strip electrode E12A and the fourth strip electrode E12B (X-axis direction). The angle at which the alignment direction of the first alignment film AL11 and the second alignment film AL12 intersect the direction of extension of the strip electrodes can be set in the range of 90±10 degrees.

The first liquid crystal layer LC1 is, for example, a twisted nematic (TN: Twisted Nematic) liquid crystal. When voltage is not applied to the first electrode E11 and the second electrode E12, the first liquid crystal layer LC1, which is affected by the orientation-regulating force of the first alignment film AL11 and the second alignment film AL12, is aligned in a direction in which the long axis direction of liquid crystal molecules LCM is parallel to the alignment direction. Since the alignment direction of the first alignment film AL11 and that of the second alignment film AL12 are in an intersecting (orthogonal) relationship, the long axis direction of the liquid crystal molecules LCM gradually changes its orientation direction from the first substrate S11 to the second substrate S12 in 90 degrees twist. Although not shown in FIG. 1, a spacer may be arranged between the first substrate S11 and the second substrate S12 to keep the distance constant.

In contrast to the initial alignment state of the liquid crystal molecules LCM as shown in FIG. 1, the alignment state of the liquid crystal molecules LCM on the first substrate S11 side is changed by applying a voltage so that a potential difference is generated between the first strip electrode E11A and the second strip electrode E11B. The alignment state of the liquid crystal molecules LCM on the second substrate S12 side is changed by applying a voltage so that a potential difference is generated between the third strip electrode E12A and the fourth strip electrode E12B.

Figure 2A:
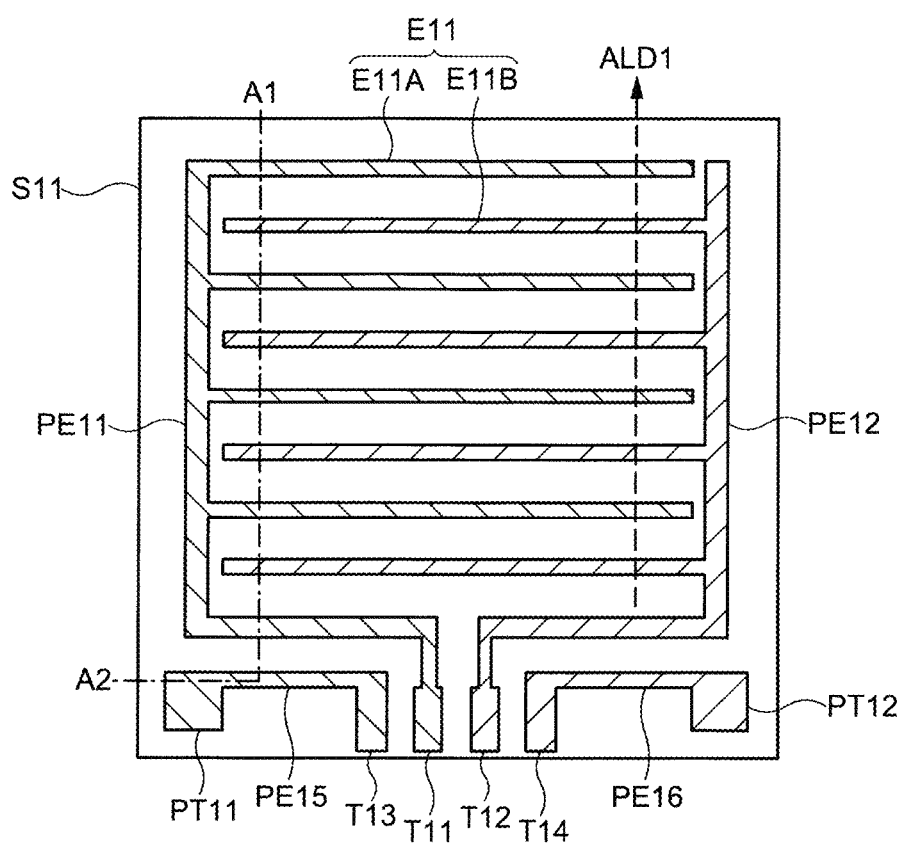
FIG. 2A is a plan view of electrodes on a first substrate of a liquid crystal cell configuring a liquid crystal light control device according to an embodiment of the present invention.
Figure 2B:
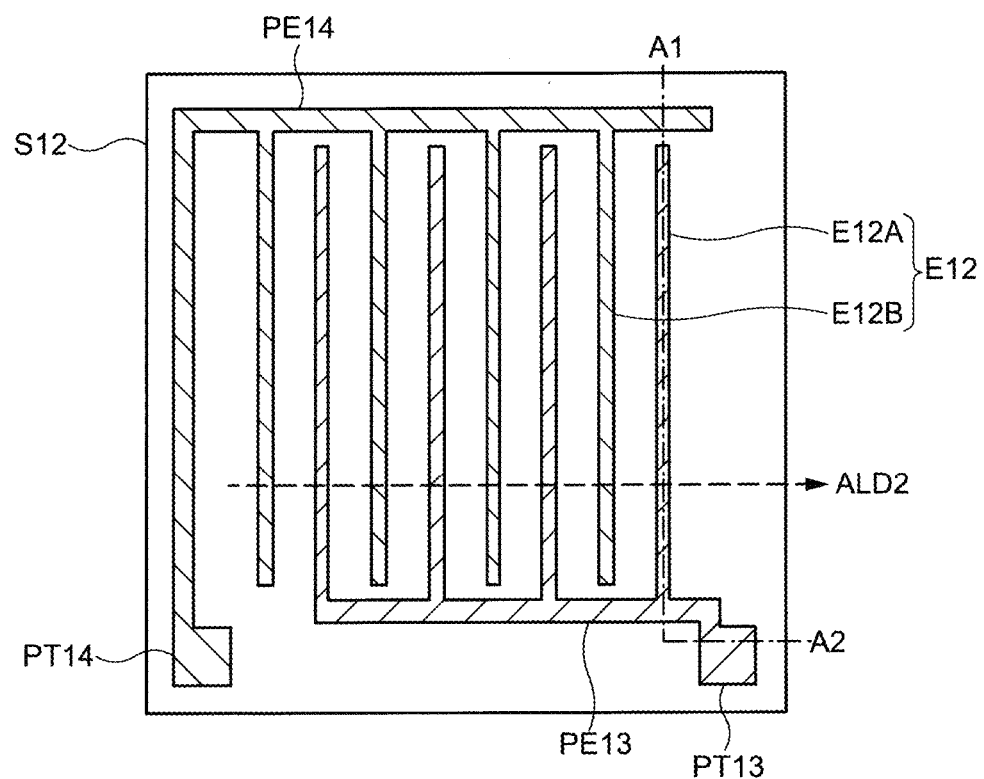
FIG. 2B is a plan view of electrodes on a second substrate of a liquid crystal cell configuring a liquid crystal light control device according to an embodiment of the present invention.

FIG. 2A is a plan view of the first substrate S11, and FIG. 2B is a plan view of the second substrate S12.

As shown in FIG. 2A, the first electrode E11 is arranged on the first substrate S11. The first electrode E11 includes the plurality of first strip electrodes E11A and the plurality of second strip electrodes E11B. The plurality of first strip electrodes E11A and the plurality of second strip electrodes E11B have a strip pattern. The strip patterns of the plurality of first strip electrodes E11A and the strip patterns of the plurality of second strip electrodes E11B are arranged alternately in a direction intersecting the direction of extension and separated by a predetermined interval.

The plurality of first strip electrodes E11A are each connected to a first power supply line PE11, and the plurality of second strip electrodes E11B are each connected to a second power supply line PE12. The first power supply line PE11 is connected to a first connection terminal T11, and the second power supply line PE12 is connected to a second connection terminal T12. The first connection terminal T11 and the second connection terminal T12 are arranged along one edge of the first substrate S11. A third connection terminal T13 is arranged adjacent to the first connection terminal T11 and a fourth connection terminal T14 is arranged adjacent to the second connection terminal T12 on the first substrate S11. The third connection terminal T13 is connected to a fifth power supply line PE15. The fifth power supply line PE15 is connected to a first power supply terminal PT11 arranged at a predetermined position in the plane of the first substrate S11. A fourth connection terminal T14 is connected to a sixth power supply line PE16. The sixth power supply line PE16 is connected to a second power supply terminal PT12 arranged at a predetermined location in the plane of the first substrate S11.

The plurality of first strip electrodes E11A are connected to the first power supply line PE11 so that the same voltage is applied. The plurality of second strip electrodes E11B are connected to the second power supply line PE12 so that the same voltage is applied. When different voltages are applied to the plurality of first strip electrodes E11A and the plurality of second strip electrodes E11B, an electric field is generated between both electrodes due to the potential difference. That is, an electric field in the transverse direction is generated by the plurality of first strip electrodes E11A and the plurality of second strip electrodes E11B.

As shown in FIG. 2B, the second substrate S12 is arranged with the second electrode E12. The second electrode E12 includes the plurality of third strip electrodes E12A and the plurality of fourth strip electrodes E12B. The plurality of third strip electrodes E12A and the plurality of fourth strip electrodes E12B have a strip pattern. The strip patterns of the plurality of third strip electrodes E12A and the plurality of fourth strip electrodes E12B are arranged alternately in a direction intersecting the direction of extension and separated by a predetermined interval. The third strip electrode E12A and the fourth strip electrode E12B are arranged at an inclination of 90±10 degrees with respect to the direction of extension of the first strip electrode E11A and the second strip electrode E11B.

The plurality of third strip electrodes E12A are each connected to a third power supply line PE13, and the plurality of fourth strip electrodes E12B are each connected to a fourth power supply line PE14. The third power supply line PE13 is connected to a third power supply terminal PT13, and the fourth power supply line PE14 is connected to a fourth power supply terminal PT14. The third power supply terminal PT13 is arranged at a position corresponding to the first power supply terminal PT11 on the first substrate S11, and the fourth power supply terminal PT14 is arranged at a position corresponding to the second power supply terminal PT12 on the first substrate S11.

The plurality of third strip electrodes E12A are connected to the third power supply line PE13 so that the same voltage is applied. The plurality of fourth strip electrodes E12B are connected to the fourth power supply line PE14 so that the same voltage is applied. When different voltages are applied to the plurality of third strip electrodes E12A and the plurality of fourth strip electrodes E12B, an electric field is generated between both electrodes due to the potential difference. That is, an electric field in the transverse direction is generated by the plurality of third strip electrodes E12A and the plurality of fourth strip electrodes E12B.

The connection terminals T11 to T14 on the first substrate S11 are connected to the flexible wiring substrate. The first power supply terminal PT11 and the third power supply terminal PT13 are electrically connected by a conductive material, and the second power supply terminal PT12 and the fourth power supply terminal PT14 are electrically connected by a conductive material, in the first liquid crystal cell 10.

Figure 3:
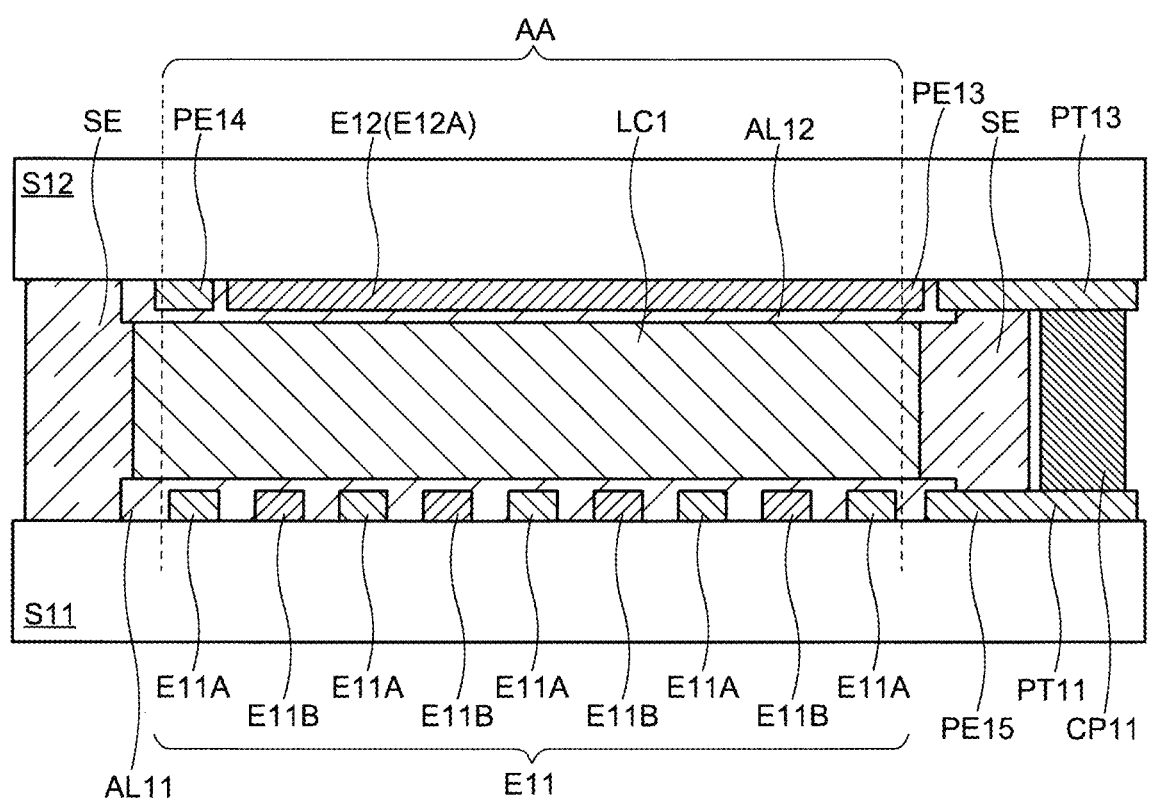
FIG. 3 is an example of a cross-sectional structure of a liquid crystal cell configuring a liquid crystal light control device according to one embodiment of the present invention.

FIG. 3 shows a cross-sectional view of the first liquid crystal cell 10. The cross-sectional structure of the first liquid crystal cell 10 shown in FIG. 3 corresponds to the line A1-A2 of the first substrate S11 shown in FIG. 2A and the second substrate S12 shown in FIG. 2B.

The first liquid crystal cell 10 has an effective region AA through which incident light is transmitted. The first electrode E11 and the second electrode E12 are arranged in the effective region AA. The first substrate S11 and the second substrate S12 are bonded by a sealing material SE arranged outside the effective region AA. The first liquid crystal layer LC1 is sealed between the first substrate S11 and the second substrate S12 by the sealing material SE.

The first power supply terminal PT11 has a continuous structure from the fifth power supply line PE15 and is arranged outside the sealing material SE. The third power supply terminal PT13 has a continuous structure from the third power supply line PE13 and is arranged outside the sealing material SE.

The first power supply terminal PT11 and the third power supply terminal PT13 face each other and are arranged to face each other in a region outside the sealing material SE. A first conductive member CP11 is arranged between the first power supply terminal PT11 and the third power supply terminal PT13 to electrically connect the two terminals. The first conductive member CP11 can be formed with a conductive paste material, for example, silver paste or carbon paste. Although not shown in FIG. 3, the second power supply terminal PT12 and the fourth power supply terminal PT14 are also electrically connected by a conductive member in the same way.

The first substrate S11 and the second substrate S12 are transparent substrates, for example, glass and resin substrates. The first electrode E11 and second electrode E12 are transparent electrodes formed by a transparent conductive material such as indium tin oxide (ITO) or indium zinc oxide (IZO). The power supply lines (first power supply line PE11, second power supply line PE12, third power supply line PE13, fourth power supply line PE14, fifth power supply line PE15, and sixth power supply line PE16), connection terminals (first connection terminal T11, second connection terminal T12, third connection terminal T13, and fourth connection terminal T14), and power supply terminals (first power supply terminal PT11, second power supply terminal PT12, third power supply terminal PT13, and fourth power supply terminal PT14) are formed by metallic materials such as aluminum, titanium, molybdenum, and tungsten. The power supply lines (first power supply line PE11, second power supply line PE12, third power supply line PE13, fourth power supply line PE14, fifth power supply line PE15, and sixth power supply line PE16) may be formed of the same transparent conductive film as the first electrode E11 and second electrode E12. Of course, a configuration in which either or both of the first electrode E11 and the second electrode E12 are formed by metallic materials can also be adopted.

Figure 4A:
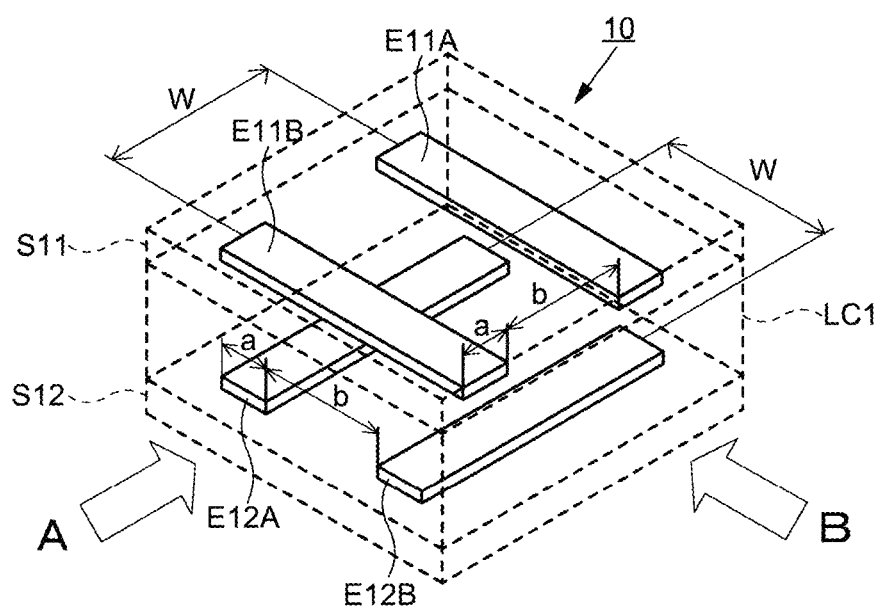
FIG. 4A is a diagram illustrating the operation of a liquid crystal cell configuring a liquid crystal light control device according to an embodiment of the present invention, and shows the alignment state of the liquid crystal molecules in a state in which voltage is not applied.
Figure 4B:
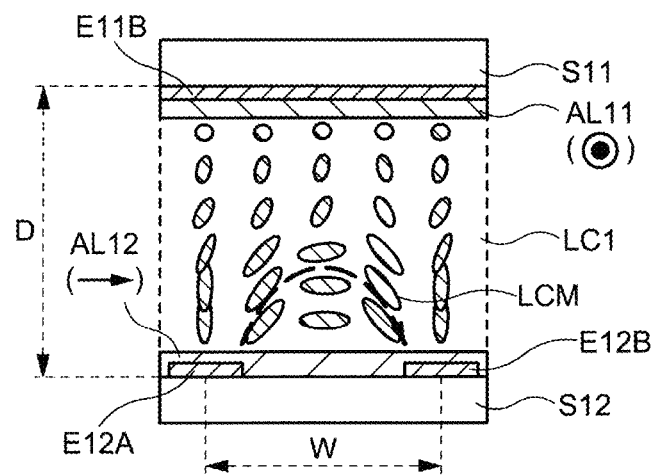
FIG. 4B is a diagram illustrating the operation of a liquid crystal cell configuring a liquid crystal light control device according to an embodiment of the present invention, and shows the alignment state of the liquid crystal molecules in a state in which voltage is applied.
Figure 4C:
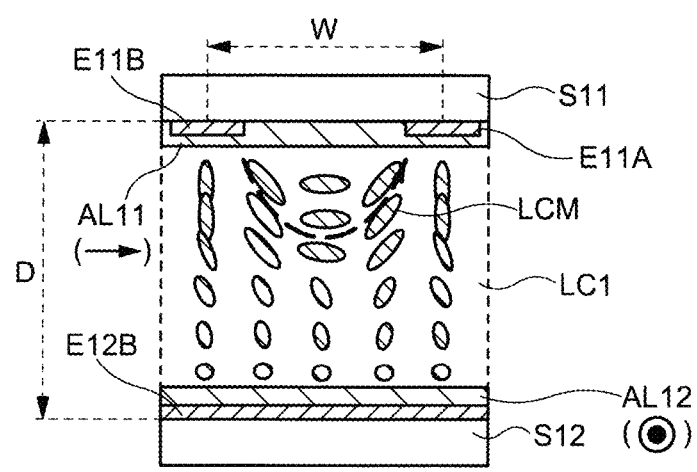
FIG. 4C is a diagram illustrating the operation of a liquid crystal cell configuring a liquid crystal light control device according to an embodiment of the present invention, and shows the alignment state of the liquid crystal molecules in a state in which voltage is applied.

FIG. 4A is a partial perspective view of the first liquid crystal cell 10. FIG. 4A is a diagram showing the arrangement of the first strip electrode E11A and the second strip electrode E11B, the third strip electrode E12A and the fourth strip electrode E12B, and the first liquid crystal layer LC1. FIG. 4B and FIG. 4C are cross-sectional schematic diagrams of the first liquid crystal cell 10. FIG. 4B and FIG. 4C are cross-sectional schematic views of the first liquid crystal cell 10 shown in FIG. 4A from the side A and the side B respectively. FIG. 4B and FIG. 4C show that the alignment treatment direction of the first alignment film AL11 and the alignment treatment direction of the second alignment film AL12 are different.

As shown in FIG. 4A, the first strip electrode E11A and the second strip electrode E11B are arranged at a center-to-center distance W, and the third strip electrode E12A and the fourth strip electrode E12B are similarly arranged at a center-to-center distance W. This center-to-center distance W has the relationship W=a+b, where "a" is the width of the first strip electrode E11A and "b" is the distance from the edge of the first strip electrode E11A to the edge of the second strip electrode E11B, as shown in FIG. 4A.

As shown in FIG. 4B and FIG. 4C, the first substrate S11 and the second substrate S12 are arranged to face each other at a distance D. The distance D is the distance between the substrates, which corresponds substantially to a thickness of the first liquid crystal layer LC1. In practice, the first strip electrode E11A and the first alignment film AL11 are arranged on the first substrate S11, and the third strip electrode E12A and the second alignment film AL12 are arranged on the second substrate S12, but since the thickness of these electrodes and alignment films is sufficiently thin compared to the magnitude of the distance D, the thickness of the first liquid crystal layer LC1 is practically the same as the distance D.

The distance D corresponding to the thickness of the first liquid crystal layer LC1 should have a size equal to or greater than the center-to-center distance W of the strip electrodes (D≥W). The distance D should have a length that is one or more times the center-to-center distance W. For example, the distance D corresponding to the thickness of the first liquid crystal layer LC1 is preferably two or more times as large as the center-to-center distance W of the strip electrode. For example, when the width of the first strip electrode E11A is 5 µm, the width a of the first strip electrode E11A and the second strip electrode E11B is 5 µm, and the distance b from the edge of the first strip electrode E11A to the edge of the second strip electrode E11B is 5 µm, the center-to-center distance W of the strip electrodes is 10 µm. In contrast, the distance D corresponding to the thickness of the first liquid crystal layer LC1 is preferably larger than 10 µm.

This relationship between the center-to-center distance W of the strip electrodes and the distance D corresponding to the thickness of the first liquid crystal layer LC1 suppresses mutual interference between the electric field generated between the first strip electrode E11A and the second strip electrode E11B and between the third strip electrode E12A and the fourth strip electrode E12B.

It is known that the refractive index of a liquid crystal changes depending on its alignment state. As shown in FIG. 1, in the off state, in which there is no electric field acting on the first liquid crystal layer LC1, the long axis direction of the liquid crystal molecules is aligned horizontally on the substrate surface and aligned with a degrees twist from the first substrate S11 side to the second substrate S12 side. At this time, the first liquid crystal layer LC1 has a uniform refractive index distribution. When light is incident on the first liquid crystal cell 10, the polarized component of the incident light transitions its direction due to the twisting of the liquid crystal molecules LCM. Hereafter, such an action of the liquid crystal layer is referred to as optical rotation. In this case, the incident light passes through the first liquid crystal layer LC1 without being refracted (or scattered) while being optically rotated.

On the other hand, as shown in FIG. 4C, when the state is on (ON), where an electric field is generated between the first strip electrode E11A and the second strip electrode E11B, the long axis of the liquid crystal molecules LCM aligns along the electric field (when the liquid crystal has positive dielectric anisotropy). As a result, as shown in FIG. 4C, in the first liquid crystal layer LC1 there are regions which are formed where the liquid crystal molecules LCM stand up above the first strip electrode E11A and the second strip electrode E11B, regions where they align diagonally along the distribution of the electric field between the first strip electrode E11A and the second strip electrode E11B, and a region where the initial alignment state is maintained is far from the first substrate S11.

Similarly, as shown in FIG. 4B, when the first liquid crystal layer LC1 is in the ON state in which an electric field is generated between the third strip electrode E12A and the fourth strip electrode E12B, the liquid crystal molecules LCM form regions in which they rise above the third strip electrode E12A and the fourth strip electrode E12B, regions where the liquid crystal molecules LCM are obliquely oriented along the distribution of the electric field between the third strip electrode E12A and the fourth strip electrode E12B, and regions where the initial alignment state is maintained in a region away from the second substrate S12.

As shown in FIG. 4B and FIG. 4C, when the electric field is generated between the first strip electrode E11A and the second strip electrode E11B and between the third strip electrode E12A and the fourth strip electrode E12B, regions are formed in which the liquid crystal molecules LCM align in a convex circular arc with the long axis of the liquid crystal molecules along the direction in which the electric field occurs. That is, when the direction of the initial alignment of the liquid crystal molecules LCM and the direction of a transverse electric field generated between the first strip electrode E11A and the second strip electrode E11B are the same, as shown in FIG. 4A and FIG. 4B, the alignment of the liquid crystal molecules LCM aligns (tilts) in the direction normal to the surface of the first substrate S11 according to the intensity distribution of the electric field.

In this case, as shown in FIG. 4B and FIG. 4C, the distance D corresponding to the thickness of the first liquid crystal layer LC1 is sufficiently large, so the effect of the electric field on the first substrate S11 side on the alignment of the liquid crystal molecules closer to the second substrate S12 side is significantly small. The same is true vice versa.

The transverse electric field formed by the strip electrode forms a convex arc-shaped dielectric constant distribution in the first liquid crystal layer LC1. Among the light incident on the first liquid crystal layer LC1, the polarized component parallel to the direction of the initial alignment of the liquid crystal molecules LCM is radially diffused by the dielectric constant distribution. As shown in FIG. 4B and FIG. 4C, since the alignment directions of the liquid crystal molecules LCM cross (orthogonally) on the first substrate S11 side and the second substrate S12 side, light is diffused in different directions on the first substrate S11 side and the second substrate S12 side, respectively.

As described above, when light passes through the first liquid crystal cell 10, some polarized component is transmitted while diffusing, depending on the formation of the electric field in the first liquid crystal layer LC1, while the remaining polarized component is transmitted through the first liquid crystal LC1 as it is.

Figure 5A:
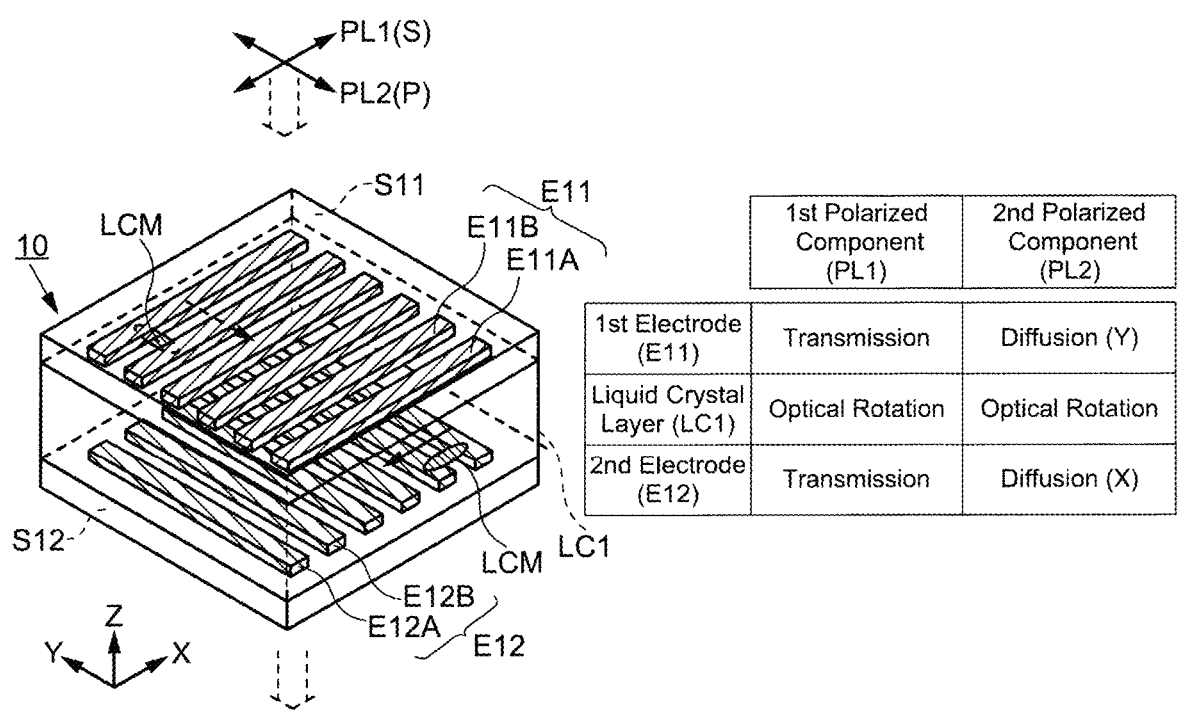
FIG. 5A is a diagram illustrating the operation of a liquid crystal cell configuring a liquid crystal light control device according to an embodiment of the present invention.

FIG. 5A shows the first liquid crystal cell 10 in which the strip electrode of the first electrode E11 extends in the X-axis direction and the strip electrode of the second electrode E12 extends in the Y-axis direction. It is assumed that a voltage is applied to the first electrode E11 that generates a transverse electric field (Y-axis direction) between the first strip electrode E11A and the second strip electrode E11B, and a voltage is applied to the second electrode E12 that generates a transverse electric field (X-axis direction) between the third strip electrode E12A and the fourth strip electrode E12B.

FIG. 5A shows a state in which light containing a first polarized component PL1 parallel to the X-axis direction and a second polarized component PL2 parallel to the Y-axis direction enters the first liquid crystal cell 10 from the first substrate S11 and is emitted from the second substrate S12 in such a bias state. Here, the first polarized component PL1 corresponds to an S-wave and the second polarized component PL2 corresponds to a P-wave.

The long axis of the liquid crystal molecules LCM closer to the first substrate S11 side is aligned in the Y-axis direction, and the long axis of the liquid crystal molecules LCM closer to the second substrate S12 side is aligned in the X-axis direction, in the first liquid crystal cell 10. In the light incident from the first substrate S11 side, the first polarized component PL1 is transmitted as it is because the direction of polarization is crossed with the long axis direction of the liquid crystal molecule LCM, and the second polarized component PL2 diffuses in the Y-axis direction under the influence of the arc-shaped refractive index distribution formed by the alignment of the liquid crystal molecules LCM because the polarization direction is parallel to the long axis direction of the liquid crystal molecules LCM. The light of the first polarized component PL1 is optically rotated 90 degrees by passing through the first liquid crystal layer LC1 from the first substrate S11 side to the second substrate S12 side, since the direction of polarization at that time is orthogonal to the direction of alignment of the long axis of the liquid crystal molecules closer to the side of the second substrate S12, the light is transmitted directly and emitted from the second substrate S12. On the other hand, the second polarized component PL2 is optically rotated 90 degrees by passing through the first liquid crystal layer LC1 from the first substrate S11 side to the second substrate S12 side, since the direction of polarization at that time is parallel to the direction of alignment of the long axis of the liquid crystal molecules closer to the second substrate S12 side, it is diffused in the X-axis direction and emitted from the second substrate S12.

As described above, when light enters the first liquid crystal cell 10 shown in FIG. 5A, the first polarized component PL1 (S-wave) is not diffused, and the second polarized component PL2 (P-wave) is diffused in the X-axis and Y-axis directions.

Figure 5B:
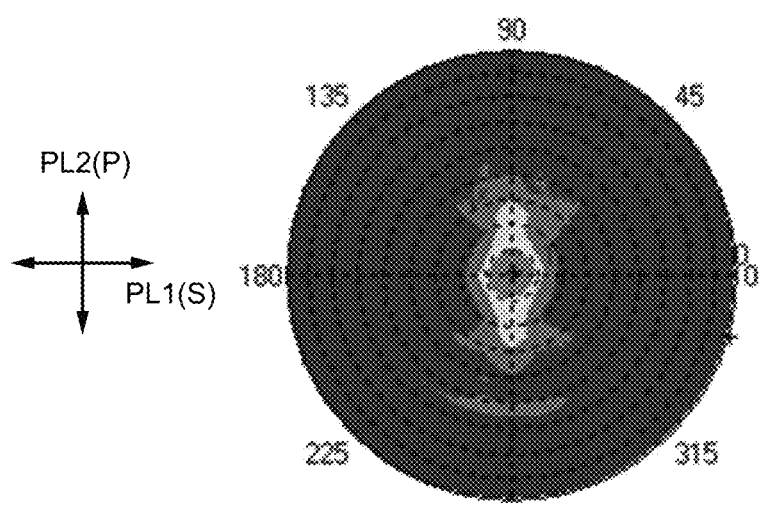
FIG. 5B is a diagram illustrating a liquid crystal cell configuring a liquid crystal light control device according to an embodiment of the present invention and shows an example of the profile of a polarization wave emitted from the liquid crystal cell.

FIG. 5B shows the profile of the S-wave (emitted light P-wave). The first polarized component PL1 (S-wave) should not be diffused in principle as described above, but the profile in FIG. 5B shows that the first polarized component PL1 (S-wave) is slightly diffused in the Y-axis direction. This suggests that the second polarized component PL2 (P-wave), which was diffused in the Y-axis direction on the first substrate S11 side, has residual components that were not fully optically rotated by the first liquid crystal layer LC1.

As described above, it is found that the profile of the emitted light is affected when polarized components that were not optically rotated by the liquid crystal cells remain. The liquid crystal light control device 102 illustrated in the embodiment shown below has a configuration that can precisely control the profile of the emitted light by arranging a plurality of liquid crystal cells on top of each other.

First Embodiment

This embodiment shows an example in which the liquid crystal light control device is configured with four liquid crystal cells. Each liquid crystal cell has a liquid crystal layer between a pair of substrates and a strip electrode on at least one of the substrates as shown in FIG. 1.

1-1. First Configuration

Figure 6:
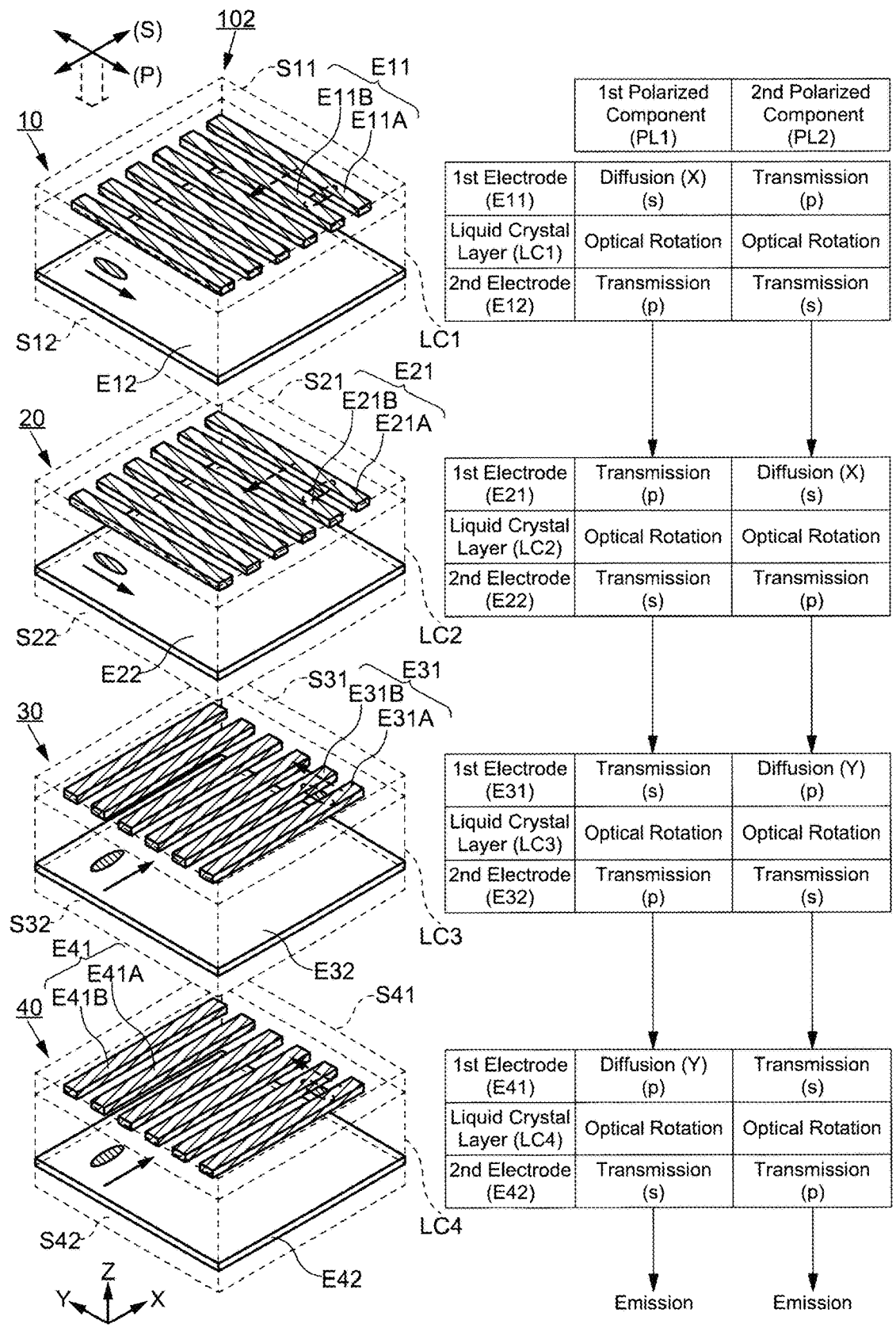
FIG. 6 is a diagram showing a configuration (first configuration) and a state of diffusion of a liquid crystal light control device according to a first embodiment of the present invention.

FIG. 6 shows an electrode arrangement in each liquid crystal cell of the liquid crystal light control device 102 according to the first configuration and the state of the light incident on the liquid crystal light control device 102 as it passes through each liquid crystal cell. The liquid crystal light control device 102 according to the first configuration has a first liquid crystal cell 10, a second liquid crystal cell 20, a third liquid crystal cell 30, and a fourth liquid crystal cell 40 stacked from the light incident side to the light emission side. FIG. 6 shows the X-axis, Y-axis, and Z-axis for illustration. In the following description, the X-axis direction refers to the direction along the X-axis, the Y-axis direction refers to the direction along the Y-axis, and the Z-axis direction refers to the direction along the Z-axis.

The liquid crystal light control device 102 according to the first configuration is arranged with the first liquid crystal cell 10, the second liquid crystal cell 20, the third liquid crystal cell 30, and the fourth liquid crystal cell 40 stacked in the Z-axis direction. Although the actual liquid crystal light control device 102 is arranged so that each liquid crystal cell is close together, FIG. 6 shows each liquid crystal cell unfolded for illustration.

The first liquid crystal cell 10 has a first electrode (a first strip electrode E11A and a second strip electrode E11B) arranged on the first substrate S11, a second electrode E12 (a plane (also referred to as a flat plate or a solid shape) electrode) is arranged on the second substrate S12, and the first liquid crystal layer LC1 is arranged between the first substrate S11 and the second substrate S12. The first strip electrode E11A and the second strip electrode E11B are arranged so that the direction of extension extends in the Y-axis direction. Although the alignment films are omitted in FIG. 6, the direction of alignment of the alignment films is indicated by arrows. That is, the alignment direction of the first alignment film AL11 (not shown) on the first substrate S11 side is aligned in the X-axis direction, and the alignment direction of the second alignment film AL12 (not shown) on the second substrate S12 side is aligned in the Y-axis direction. The intersection angle between the alignment direction of the first alignment film AL11 and the alignment direction of the second alignment film AL12 is preferably 90±10 degrees, and more preferably 90 degrees (orthogonal).

The second liquid crystal cell 20 includes a first substrate S21 and a second substrate S22, a first electrode E21 (a first strip electrode E21A and a second strip electrode E21B) and a second electrode E22 (a plane (also referred to as a flat plate or a solid shape) electrode), and a second liquid crystal layer LC2 between the first substrate S21 and the second substrate S22. The second liquid crystal cell 20 has the same configuration as the first liquid crystal cell 10. That is, the second liquid crystal cell 20 is arranged so that the direction of extension of the first strip electrode E21A and the second strip electrode E21B extends in the Y-axis direction.

The third liquid crystal cell 30 includes a first substrate S31 and a second substrate S32, a first electrode E31 (a first strip electrode E31A and a second strip electrode E31B) and a second electrode E32 (a plane (also referred to as a flat plate or a solid shape) electrode), and a third liquid crystal layer LC3 between the first substrate S31 and the second substrate S32. The third liquid crystal cell 30 has the same configuration as the first liquid crystal cell 10, except that the first strip electrode E31A and the second strip electrode E31B are arranged so that their extension direction extends in the X-axis direction. Accordingly, the alignment direction of the alignment film is aligned in the Y-axis direction on the first substrate S31 side and in the X-axis direction on the second substrate S32 side.

The fourth liquid crystal cell 40 includes a first substrate S41 and a second substrate S42, a first electrode E41 (a first strip electrode E41A and a second strip electrode E41B) and a second electrode E42 (a plane (also referred to as a flat plate or a solid shape) electrode), and a fourth liquid crystal layer LC4 between the first substrate S41 and the second substrate S42. The fourth liquid crystal cell 40 has the same configuration as the third liquid crystal cell 30. That is, the fourth liquid crystal cell 40 is arranged so that the direction of extension of the first strip electrode E41A and the second strip electrode E41B extends in the X-axis direction. The alignment direction of the alignment film is aligned in the Y-axis direction on the first substrate S41 side and in the X-axis direction on the second substrate S42 side.

As described above, the liquid crystal light control device 102 according to the first configuration has the same alignment direction of the liquid crystals in the first liquid crystal cell 10 and the second liquid crystal cell 20, and the direction of extension of the strip electrodes (E11A, E11B, E21A, E21B) in the first electrodes E11, E21 are oriented in the same direction. The alignment direction of the liquid crystal in the third liquid crystal cell 30 and the fourth liquid crystal cell 40 is the same, and the direction of extension of the strip electrodes (E31A, E31B, E41A, E41B) in the first electrodes E31, E41 is directed in the same direction. The direction of extension of the strip electrodes (E11A, E11B, E21A, E21B) of the first electrodes E11, E21 in the first liquid crystal cell 10 and the second liquid crystal cell 20 and the direction of the strip electrodes (E31A, E31B, E41A, E41B) of the first electrodes E31, E41 in the third liquid crystal cell 30 and the fourth liquid crystal cell 40 intersect at 90 degrees.

FIG. 6 shows the arrangement of the electrodes, the alignment direction (arrows) by the alignment film, and the initial orientation of the liquid crystal molecules in the first liquid crystal cell 10, the second liquid crystal cell 20, the third liquid crystal cell 30, and the fourth liquid crystal cell 40. The liquid crystal layer is formed by a positive liquid crystal, and in the initial state when control signals are not input to each liquid crystal cell, the long axis direction of the liquid crystal is aligned in the direction that intersects (orthogonally) with the strip electrodes. That is, the first liquid crystal cell 10, the second liquid crystal cell 20, the third liquid crystal cell 30, and the fourth liquid crystal cell 40 are arranged so that the alignment direction of the alignment film (first alignment film) on the first substrate S11, S21, S31, S41 side and the direction of extension of the first electrodes E11, E21, E31, E41 with strip patterns intersect, The alignment direction of the alignment film (second alignment film) on the second substrate S12, S22, S32, S42 side and the alignment film (first alignment film) on the first substrate S11, S21, S31, S41 side are arranged to intersect.

According to the arrangement shown in FIG. 6, the alignment films (not shown) on the first substrate S11, S21 side of the first liquid crystal cell 10 and the second liquid crystal cell 20 are aligned in a direction parallel to the X-axis direction, and the alignment films (not shown) on the second substrate S12, S22 side are aligned in a direction parallel to the Y-axis direction. The direction of extension of the strip patterns of the first electrodes E11, E21 of the first liquid crystal cell 10 and the second liquid crystal cell 20 is parallel to the Y-axis direction, and the second electrodes E12, E22 are plane (also referred to as a flat plate or a solid shape) electrodes that extend at least to the effective region (this refers to the region through which incident light is transmitted, and is the same hereafter). The direction of extension of the strip pattern of the first electrodes E31, E41 in the third liquid crystal cell 30 and the fourth liquid crystal cell 40 is oriented parallel to the X-axis direction, and the second electrodes E32, E42 are plane (also referred to as a flat plate or a solid shape) electrodes that extend at least to the effective region. The alignment direction of the alignment films, according to the definition of the X-axis direction and the Y-axis direction, will intersect at an angle of 90 degrees on the first substrate side and the second substrate side of each liquid crystal cell, but the angle of intersection can be set within a range of 90±10 degrees.

In the following description, the X-axis direction is the same direction as the polarization direction of the first polarized component PL1, and the Y-axis direction is the same direction as the polarization direction of the second polarized component PL2. For example, the first polarized component PL1 is S-wave and the second polarized component PL2 is P-wave. The "diffusion (X)" shown in the table in FIG. indicates that the polarized component is diffused in the X-axis direction, and the "diffusion (Y)" indicates that the polarized component is diffused in the Y-axis direction.

FIG. 6 shows the electrodes to which the control signal is applied to form the transverse electric field in hatches. A table is inserted in FIG. 6 to show the state of each polarized component when light containing the first polarized component PL1 and the second polarized component PL2 passes through the first electrode, the liquid crystal layer, and the second electrode of each liquid crystal cell, using the terms transmission, optical rotation, and diffusion. Here, term "transmission" means that the polarized component passes through without being diffused or optically rotated. The term "diffusion" indicates that the polarized component is transmitted while being diffused under the influence of the refractive index distribution of the liquid crystal molecules. Therefore, in the chart, for example, "transmission" at the first electrode indicates that the above "transmission" phenomenon occurs in the vicinity of the first electrode of the liquid crystal layer. In the following explanations, the term "optical rotation" in the liquid crystal layer indicates that the polarized component transitions 90 degrees in the direction of polarization in the process of passing through the liquid crystal layer from the first substrate side to the second substrate side.

The liquid crystal light control device 102 according to the first configuration has the first liquid crystal cell 10, the second liquid crystal cell 20, the third liquid crystal cell 30, and the fourth liquid crystal cell 40 arranged in this order from the light incident side to the light emitted side. Light incident on the liquid crystal light control device 102 includes the first polarized component PL1 and the second polarized component PL2 orthogonal to the first polarized component PL1.

As shown in FIG. 6, the first electrode E11 of the first liquid crystal cell 10 and the first electrode E21 of the second liquid crystal cell 20 are arranged in the same direction of extension of the strip electrodes, the first liquid crystal cell 10 can diffuse the first polarized component PL1 in the X-axis direction, and the second liquid crystal cell 20 can diffuse the second polarized component PL2 in the X-axis direction. The second electrode E32 of the third liquid crystal cell 30 and the second electrode E42 of the fourth liquid crystal cell 40 are arranged in the same direction of extension, the third liquid crystal cell 30 can diffuse the second polarized component PL2 in the Y-axis direction, and the fourth liquid crystal cell 40 can diffuse the first polarized component PL1 in the Y-axis direction.

Figure 7:
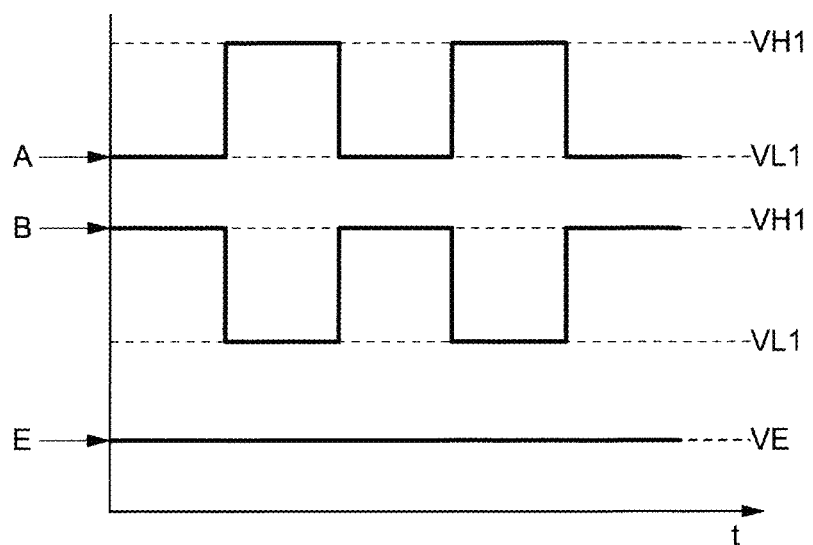
FIG. 7 is a waveform of the control signal applied to the liquid crystal cell configuring a liquid crystal light control device according to an embodiment of the present invention.

Control signals are input to each liquid crystal cell to control the polarization state and diffusion state of light incident on the liquid crystal light control device 102. FIG. 7 shows an example of the waveform of control signals applied to the electrodes of each liquid crystal cell. A control signal A, a control signal B, or a control signal E shown in FIG. 7 is input to each liquid crystal cell. For the control signals A, B, VL1 means a low-level voltage and VH1 means a high-level voltage. For example, VL1 is a voltage of 0 V or −15 V, and VH1 is 30 V (relative to 0 V) or 15 V (relative to −15 V). The control signal A and the control signal B are synchronized, and when the control signal A is at the level VL1, the control signal B is at the level VH1, and when the control signal A changes to the level VH1, the control signal B changes to the level VL1. The period of the control signals A, B is about 15 to 100 Hz. The control signal E, on the other hand, is a constant voltage signal. For example, the control signal E is an intermediate voltage between VL1 and VH1, and VE=0V when VL1=−15V and VH1=+15V.

Light is incident on the liquid crystal light control device 102 from a light source not shown in the figure. The light emitted from the light source should be collimated light. The liquid crystal light control device 102 can control the profile (intensity distribution) of the light distribution pattern of the light emitted from the light source, which is not shown in the figure, by selecting the control signal to be applied to each liquid crystal cell. Specifically, the profile of the polar angular direction of the illumination light can be controlled.

Table 1 shows the control signals applied to each liquid crystal cell of the liquid crystal light control device 102 shown in FIG. 6. The control signals A, B, and E shown in Table 1 correspond to the control signals shown in FIG. 7.

TABLE 1

| | Liquid crystal light control element: 102 | | | Control signal |
|---|---|---|---|---|
| First liquid crystal cell 10 | 1st substrate S11 | 1st electrode E11 | 1st strip electrode: E11A 2nd strip electrode: E11B | A B |
| | 2nd substrate S12 | 2nd electrode E12 | | E |
| Second liquid crystal cell 20 | 1st substrate S21 | 1st electrode E21 | 1st strip electrode: E21A 2nd strip electrode: E21B | A B |
| | 2nd substrate S22 | 2nd electrode E22 | | E |
| Third liquid crystal cell 30 | 1st substrate S31 | 1st electrode E31 | 1st strip electrode: E31A 2nd strip electrode: E31B | A B |
| | 2nd substrate S32 | 2nd electrode E32 | | E |
| Fourth liquid crystal cell 40 | 1st substrate S41 | 1st electrode E41 | 1st strip electrode: E41A 2nd strip electrode: E41B | A B |
| | 2nd substrate S42 | 2nd electrode E42 | | E |

As shown in Table 1, the control signals are input to each liquid crystal cell of the liquid crystal light control device 102. The control signal A is input to the first strip electrode E11A of the first liquid crystal cell 10, the control signal B is input to the second strip electrode E11B, and the control signal E is input to the second electrode E12, and the transverse electric field is generated on the first electrode E11 side only. The same is true for the second liquid crystal cell 20, the third liquid crystal cell 30, and the fourth liquid crystal cell 40, as shown in Table 1. That is, the control signals A, B are applied to the first electrode of each liquid crystal cell, the control signal E is applied to the second electrode, and the transverse electric field is generated only on the first substrate side, in the liquid crystal light control device shown in FIG. 6.

During operation of the liquid crystal light control device 102, the control signals shown in Table 1 are input to each strip electrode of each liquid crystal cell. When the control signals shown in Table 1 are input to the first liquid crystal cell 10, the second liquid crystal cell 20, the third liquid crystal cell 30, and the fourth liquid crystal cell 40, the liquid crystal molecules on the first substrate side of each liquid crystal cell are affected by the transverse electric field and their alignment state changes as shown in FIG. 4C.

The operation of the liquid crystal light control device 102 is explained next by how each liquid crystal cell acts on the incident light. Here, the incident light is assumed to contain two polarized components, the first polarized component PL1 and the second polarized component PL2. The first polarized component PL1 and the second polarized component PL2 are linearly polarized components and have one of the polarization states of s-polarization or p-polarization. These polarization states can transition from s-polarization to p-polarization or from p-polarization to s-polarization by being optically rotated in the liquid crystal layer. The first polarized component PL1 is assumed to be s-polarized and the second polarized component PL2 is assumed to be p-polarized in the state immediately before entering the liquid crystal light control device 102.

Focusing on the first polarized component PL1 in FIG. 6, the first polarized component PL1 enters the first liquid crystal cell 10 in the state of s-polarization. The polarization direction of the first polarized component PL1 (s-polarization) is along the X-axis direction, which is parallel to the alignment direction of the long axis of the liquid crystal molecules on the first substrate S11 side of the first liquid crystal layer LC1. On the first substrate S11 side, the liquid crystal molecules are aligned under the influence of the transverse electric field generated by the first electrode E11, and the arc-shaped refractive index distribution is formed in the first liquid crystal layer LC1. The first polarized component PL1 (s-polarization) incident on the first liquid crystal layer LC1 from the first substrate S11 is diffused in the X-axis direction under the influence of the arc-shaped refractive index distribution in the first liquid crystal layer LC1. The first polarized component PL1 (s-polarization) is optically rotated 90 degrees according to the twisting alignment of the liquid crystal molecules in the process of passing through the first liquid crystal layer LC1 from the first substrate S11 side to the second substrate S12 side. As a result, the first polarized component PL1 transitions from s-polarization to p-polarization. Since the second electrode E12 is a planar (also referred to as a flat plate or a solid shape) electrode and has a constant potential on the entire surface, the arc-shaped refractive index distribution is not formed on the liquid crystal molecules on the second substrate S12 side of the first liquid crystal layer LC1. Therefore, the first polarized component PL1 (p-polarization) is not diffused and is emitted directly from the second substrate S12. Thus, the first polarized component PL1 enters the first liquid crystal cell 10 in the s-polarized component, is diffused in the X-axis direction, is optically rotated 90 degrees, and is emitted from the first liquid crystal cell 10 in the p-polarized component.

The first polarized component PL1 that passes through the first liquid crystal cell 10 enters the second liquid crystal cell 20 in the state of p-polarized component. The polarization direction of the first polarized component PL1 (p-polarization) is along the Y-axis direction, which is the direction that intersects the alignment direction of the long axis of the liquid crystal molecules on the first substrate S21 side of the second liquid crystal layer LC2. Although on the first substrate S21 side, the liquid crystal molecules are aligned under the influence of the transverse electric field generated by the first electrode E21 and the arc-shaped refractive index distribution is formed in the second liquid crystal layer LC2, the first polarized component PL1 (p-polarization) is not diffused and directly passes through to the second substrate S22. The first polarized component PL1 (p-polarization) is optically rotated 90 degrees according to the twisting alignment of the liquid crystal molecules in the process of passing through the second liquid crystal layer LC2 from the first substrate S21 side to the second substrate S22 side. As a result, the first polarized component PL1 transitions from the p-polarization to the s-polarization. Since the second electrode E22 is a planar (also referred to as a flat plate or a solid shape) electrode and has a constant potential on the entire surface, the arc-shaped refractive index distribution is not formed on the liquid crystal molecules on the second substrate S22 side of the second liquid crystal layer LC2. Therefore, the first polarized component PL1 (s-polarization) is not diffused and is emitted directly from the second substrate S22. As described above, the first polarized component PL1 enters the second liquid crystal cell 20 in the p-polarized state, is not diffused, is optically rotated 90 degrees, and is emitted from the second liquid crystal cell 20 in the s-polarized state.

The first polarized component PL1 passing through the second liquid crystal cell 20 enters the third liquid crystal cell 30 in the s-polarized state. At the third liquid crystal cell 30, the direction of extension of the strip electrodes (E31A, E31B) of the first electrode E31 is directed orthogonally to the direction of extension of the strip electrodes (E11A, E11B, E21A, E21B) of the first electrodes E11, E21 of the first liquid crystal cell 10 and second liquid crystal cell 20. The polarization direction of the first polarized component PL1 (s-polarization) is along the X-axis direction, which is the direction that intersects the alignment direction of the long axis of the liquid crystal molecules on the first substrate S31 side of the third liquid crystal layer LC3. On the first substrate S31 side, the liquid crystal molecules are aligned under the influence of the transverse electric field generated by the first electrode E31, and the circular arc-shaped refractive index distribution is formed in the third liquid crystal layer LC3, but the first polarized component PL1 (s-polarization) is not diffused and directly passes through toward the second substrate S32. The first polarized component PL1 (s-polarization) is optically rotated 90 degrees according to the twisting alignment of the liquid crystal molecules in the process of passing through the third liquid crystal layer LC3 from the first substrate S31 side to the second substrate S32 side. As a result, the first polarized component PL1 transitions from the s-polarized component to the p-polarized component. Since the second electrode E32 is a planar (also referred to as a flat plate or a solid shape) electrode and a constant potential is formed on the entire surface, the arc-shaped refractive index distribution is not formed on the liquid crystal molecules on the second substrate S32 side of the third liquid crystal layer LC3. Therefore, the first polarized component PL1 (p-polarization) is not diffused and is emitted directly from the second substrate S32. As described above, the first polarized component PL1 enters the third liquid crystal cell 30 in the s-polarized state, is not diffused, is optically rotated 90 degrees, and is emitted from the third liquid crystal cell 30 in the p-polarized state.

The first polarized component PL1 passing through the third liquid crystal cell 30 enters the fourth liquid crystal cell 40 in the p-polarized state. The first electrode E41 of the fourth liquid crystal cell 40 is directed in the same direction as the first electrode E31 of the third liquid crystal cell 30. Therefore, the alignment direction of the long axis of the liquid crystal molecules on the first substrate S41 side of the fourth liquid crystal cell 40 is also the same as that of the third liquid crystal cell 30. The polarization direction of the first polarized component PL1 (p-polarization) is along the Y-axis direction, which is parallel to the alignment direction of the long axis of the liquid crystal molecules on the first substrate S41 side of the fourth liquid crystal layer LC4. At the first substrate S41 side, the liquid crystal molecules are aligned under the influence of the transverse electric field generated by the first electrode E41, and the arc-shaped refractive index distribution is formed in the fourth liquid crystal layer LC4. The first polarized component PL1 (p-polarization) incident on the fourth liquid crystal layer LC4 from the first substrate S41 is diffused in the Y-axis direction under the influence of the arc-shaped refractive index distribution in the fourth liquid crystal layer LC4. The first polarized component PL1 (p-polarization) is optically rotated 90 degrees according to the twisting alignment of the liquid crystal molecules in the process of passing through the fourth liquid crystal layer LC4 from the first substrate S41 side to the second substrate S42 side. As a result, the first polarized component PL1 transitions from the p-polarization to the s-polarization. Since the second electrode E42 is a planar (also referred to as a flat plate or a solid shape) electrode and a constant potential is formed on the entire surface, the arc-shaped refractive index distribution is not formed on the liquid crystal molecules on the second substrate S42 side of the fourth liquid crystal layer LC4. Therefore, the first polarized component PL1 (s-polarization) is not diffused and is emitted directly from the second substrate S42. Thus, the first polarized component PL1 enters the fourth liquid crystal cell 40 in the p-polarized state, is diffused in the Y-axis direction, is optically rotated 90 degrees, and is emitted from the fourth liquid crystal cell 40 in the s-polarized state.

As described above, the first polarization component PL1 incident on the liquid crystal light control device 102 is diffused once in the X-axis direction and once in the Y-axis direction during the period from the time when it is incident on the first liquid crystal cell 10 to the time when it is emitted from the fourth liquid crystal cell 40, and is emitted in the s-polarized state by being incident in the s-polarized state and optically rotated four times at an angle of 90 degrees.

Next, focusing on the second polarized component PL2, the second polarized component PL2 enters the liquid crystal cell 1 10 in the p-polarized state. The polarization direction of the second polarized component PL2 (p-polarization) is along the Y-axis direction, which is the direction that intersects the alignment direction of the long axis of the liquid crystal molecules on the first substrate S11 side of the first liquid crystal layer LC1. Although the arc-shaped refractive index distribution is formed in the first liquid crystal layer LC1 on the first substrate S11 side, the second polarized component PL2 (p-polarization) is not diffused and directly passes through to the second substrate S12. The first polarized component PL1 (p-polarization) is optically rotated 90 degrees according to the twisting alignment of the liquid crystal molecules in the process of passing through the first liquid crystal layer LC1 from the first substrate S11 side to the second substrate S12 side. As a result, the first polarized component PL1 transitions from the p-polarization to the s-polarization. Since the second electrode E12 having a planar shape (also referred to as a flat plate or a solid shape) is at a constant potential on the second substrate S12 side, the arc-shaped refractive index distribution is not formed in the first liquid crystal layer LC1, and the second polarization component PL2 (s-polarization) is emitted from the second substrate S12 without diffusion. Thus, the second polarized component PL2 enters the first liquid crystal cell 10 in the p-polarized state, is not diffused, is optically rotated 90 degrees, and is emitted from the first liquid crystal cell 10 in the s-polarized state.

The second polarization component PL2 passing through the first liquid crystal cell 10 enters the second liquid crystal cell 20 in the s-polarized state. The polarization direction of the second polarized component PL2 (s-polarization) is along the X-axis direction, which is parallel to the alignment direction of the long axis of the liquid crystal molecules on the first substrate S21 side of the second liquid crystal layer LC2. The arc-shaped refractive index distribution is formed in the second liquid crystal layer LC2 on the first substrate S21 side. The second polarized component PL2 (s-polarization) incident on the second liquid crystal layer LC2 from the first substrate S21 is diffused in the X-axis direction under the influence of the arc-shaped refractive index distribution of the second liquid crystal layer LC2. The second polarized component PL2 (s-polarization) is optically rotated 90 degrees according to the twisting alignment of the liquid crystal molecules in the process of passing through the second liquid crystal layer LC2 from the first substrate S21 side to the second substrate S22 side. As a result, the second polarized component PL2 transitions from the s-polarization to the p-polarization. Since the second electrode E22 is a planar (also referred to as a flat plate or a solid shape) electrode and a constant potential is formed on the entire surface, the arc-shaped refractive index distribution is not formed on the liquid crystal molecules on the second substrate S22 side of the second liquid crystal layer LC2. Therefore, the second polarized component PL2 (p-polarization) is not diffused and is emitted directly from the second substrate S22. Thus, the second polarized component PL2 enters the second liquid crystal cell 20 in the s-polarized state, is diffused in the X-axis direction, is optically rotated 90 degrees, and is emitted from the second liquid crystal cell 20 in the p-polarized state.

The second polarized component PL2 passing through the second liquid crystal cell 20 enters the third liquid crystal cell 30 in the p-polarized state. The polarization direction of the second polarized component PL2 (p-polarization) is along the Y-axis direction, which is parallel to the alignment direction of the long axis of the liquid crystal molecules on the first substrate S31 side of the third liquid crystal layer LC3. The arc-shaped refractive index distribution is formed in the third liquid crystal layer LC3 on the first substrate S31 side. The second polarized component PL2 (p-polarization) incident on the third liquid crystal layer LC3 from the first substrate S31 is diffused in the Y-axis direction under the influence of the arc-shaped refractive index distribution of the third liquid crystal layer LC3. The second polarized component PL2 (p-polarization) is optically rotated 90 degrees according to the twisting alignment of the liquid crystal molecules in the process of passing through the third liquid crystal layer LC3 from the first substrate S31 side to the second substrate S32 side. As a result, the second polarized component PL2 transitions from the p-polarization to the s-polarization. Since the second electrode E32 is a planar (also referred to as a flat plate or a solid electrode) electrode and a constant potential is formed on the entire surface, the arc-shaped refractive index distribution is not formed on the liquid crystal molecules on the second substrate S32 side of the third liquid crystal layer LC3. Therefore, the second polarized component PL2 (s-polarization) is not diffused and is emitted directly from the second substrate S32. Thus, the second polarized component PL2 enters the third liquid crystal cell 30 in the p-polarized state, is diffused in the Y-axis direction, is optically rotated 90 degrees, and is emitted from the third liquid crystal cell 30 in the s-polarization.

The second polarized component PL2 passing through the third liquid crystal cell 30 enters the fourth liquid crystal cell 40 in a state of the s-polarization. The polarization direction of the second polarized component PL2 (s-polarization) is along the X-axis direction, which is the direction that intersects the alignment direction of the long axis of the liquid crystal molecules on the first substrate S31 side in the third liquid crystal layer LC3. Although the arc-shaped refractive index distribution is formed in the fourth liquid crystal layer LC4 on the first substrate S41 side, the second polarized component PL2 (s-polarization) is not diffused and passes directly to the second substrate S42. The second polarized component PL2 (s-polarization) is optically rotated 90 degrees according to the twisting alignment of the liquid crystal molecules in the process of passing through the fourth liquid crystal layer LC4 from the first substrate S41 side to the second substrate S42 side. As a result, the second polarized component PL2 transitions from the s-polarization to the p-polarization. Since the second electrode E42 is a planar (also referred to as a flat plate or a solid electrode) electrode and a constant potential is formed on the entire surface, the arc-shaped refractive index distribution is not formed on the liquid crystal molecules on the second substrate S42 side of the fourth liquid crystal layer LC4. Therefore, the second polarized component PL2 (p-polarization) is not diffused and is emitted directly from the second substrate S42. Thus, the second polarized component PL2 enters the fourth liquid crystal cell 40 in the s-polarized state, is not diffused, is optically rotated 90 degrees, and is emitted from the fourth liquid crystal cell 40 in the p-polarized state.

The second polarization component PL2 incident on the liquid crystal light control device 102 is diffused once in the X-axis direction and once in the Y-axis direction before being incident on the first liquid crystal cell 10 and emitted from the fourth liquid crystal cell 40, and is emitted in the p-polarized state by being incident in the p-polarized state and being optically rotated four times at an angle of 90 degrees.

In the first configuration, the first polarized component PL1 is diffused in the X-axis direction before being optically rotated in the first liquid crystal cell 10 and diffused in the Y-axis direction before being optically rotated in the fourth liquid crystal cell 40, the second polarized component PL2 is diffused in the X-axis direction before being optically rotated in the second liquid crystal cell 20 and diffused in the Y-axis direction before being optically rotated in the third liquid crystal cell 30. When the diffusion of polarized components in each liquid crystal cell before rotation is called pre-diffusion, and the diffusion of polarized components after rotation is called post-diffusion, in the first configuration, the first polarized component PL1 is pre-diffused once in the X-axis direction and pre-diffused once in the Y-axis direction, and the second polarized component PL2 is pre-diffused once in the X-axis direction and pre-diffused once in the Y-axis direction. There is no post-diffusion for any of the polarized components.

1-1-1. Variation of the First Configuration (1)

Figure 8:
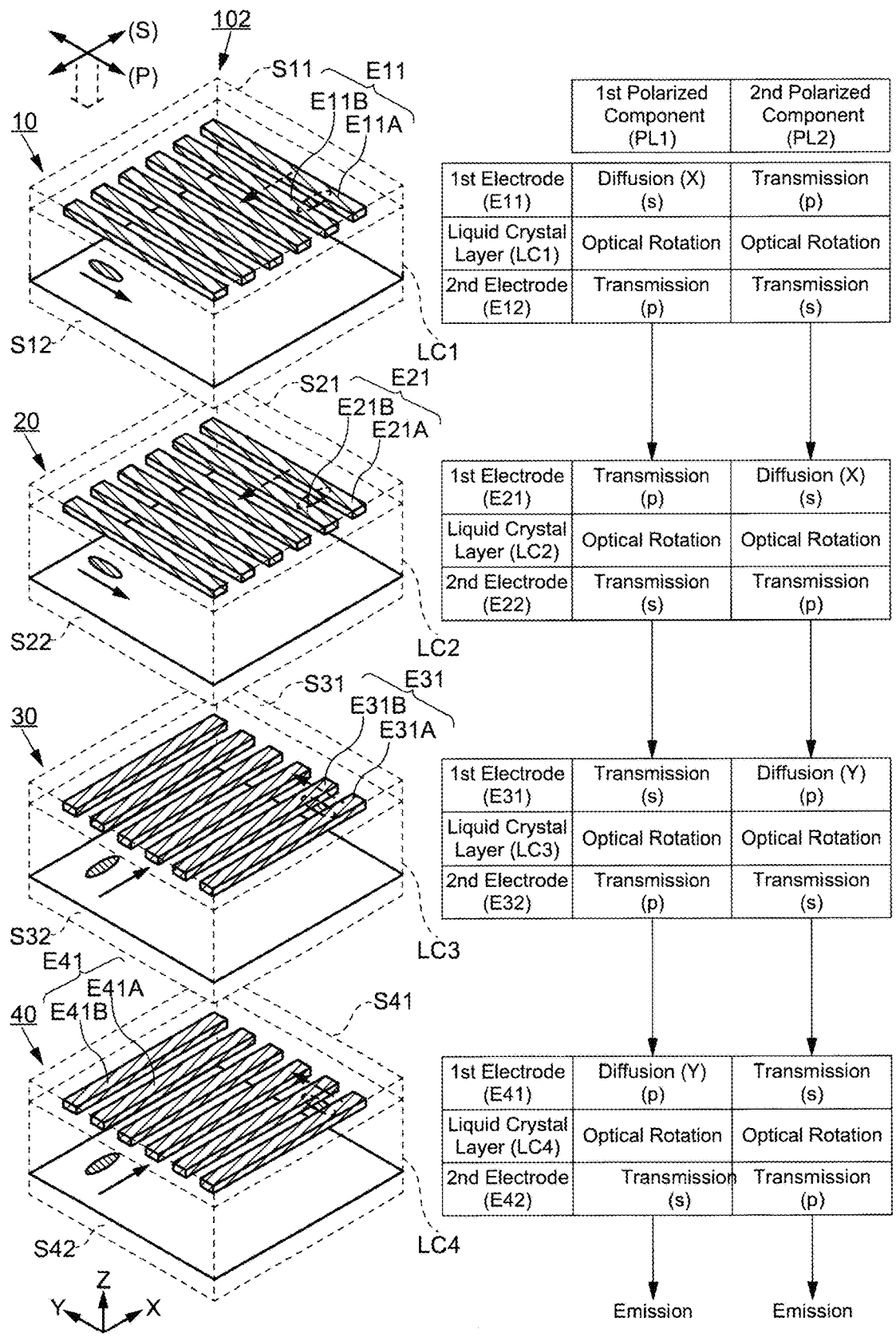
FIG. 8 is a diagram showing a configuration (variation of the first configuration) and a state of diffusion of a liquid crystal light control device according to a first embodiment of the present invention.

FIG. 6 shows a configuration in which the planar (also referred to as a flat plate or a solid shape) second electrode (E12, E22, E32, E42) is arranged in each liquid crystal cell, but the liquid crystal light control device 102 according to the first configuration is not limited to such a configuration. For example, as shown in FIG. 8, the second substrates (S12, S22, S32, S42) of the first to fourth liquid crystal cells may have a configuration in which the second electrode is omitted and only the alignment film (not shown) is arranged. The alignment direction of the alignment film on the second substrate side is aligned orthogonally (90 degrees±10 degrees) with the alignment direction of the alignment film on the first substrate side in each liquid crystal cell. Even with the configuration in which the second electrode of each liquid crystal cell is omitted, the first polarized component PL1 and the second polarized component PL2 can be diffused in the same manner as in the liquid crystal light control device 102 shown in FIG. 6.

1-1-2. Variation of the First Configuration (2)

Figure 9:
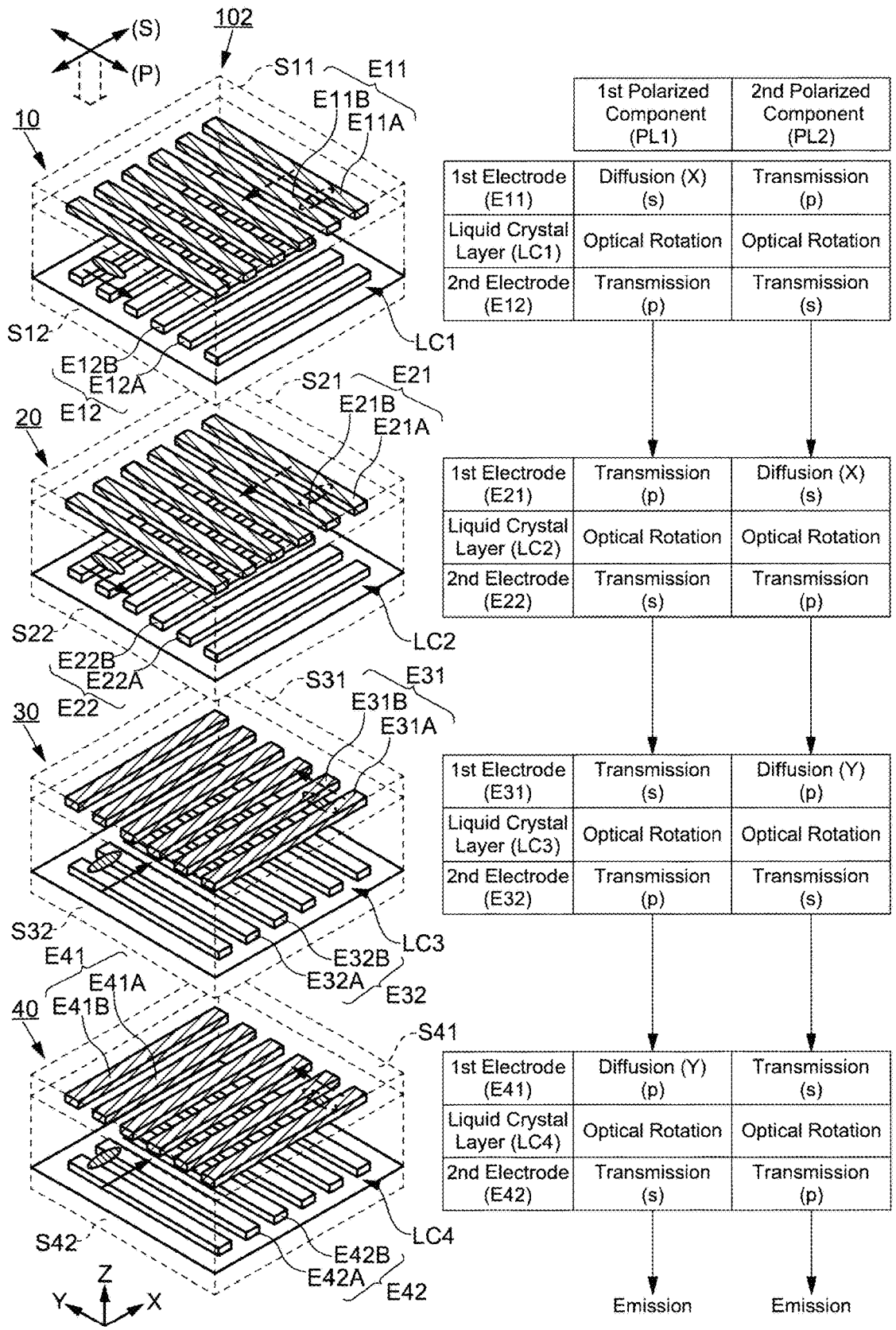
FIG. 9 is a diagram showing a configuration (variation of the first configuration) and a state of diffusion of a liquid crystal light control device according to a first embodiment of the present invention.

FIG. 9 shows a configuration in which the second electrodes (E12, E22, E32, E42) of the first to fourth liquid crystal cells are arranged with strip electrodes (third strip electrodes E12A, E22A, E32A, E42A, and fourth strip electrodes E12B, E22B, E32B, E42B) in place of planar electrodes (also referred to as a flat plate or a solid shape). In this case, a constant voltage such as the control signal E shown in FIG. is applied to the third strip electrodes E12A, E22A, E32A, E42A, and the fourth strip electrodes E12B, E22B, E32B, E42B, for example, so that the transverse electric field is not generated, and it is possible to obtain light distribution characteristics similar to those of the liquid crystal light control device 102 shown in FIG. 6.

1-2. Second Configuration

In the second configuration, the liquid crystal light control device does not diffuse polarized components by the first electrodes E11, E41 (light incident side) of the first liquid crystal cell 10 and the fourth liquid crystal cell 40, but diffuses them at the second electrodes E12, E42 (light emission side) of the first liquid crystal cell 10 and the fourth liquid crystal cell 40, diffuses polarized components by the first electrodes E21, E31 (light incident side) of the second liquid crystal cell 20 and the third liquid crystal cell 30, and does not diffuse them at the second electrodes E22, E32 (light emission side).

Figure 10:
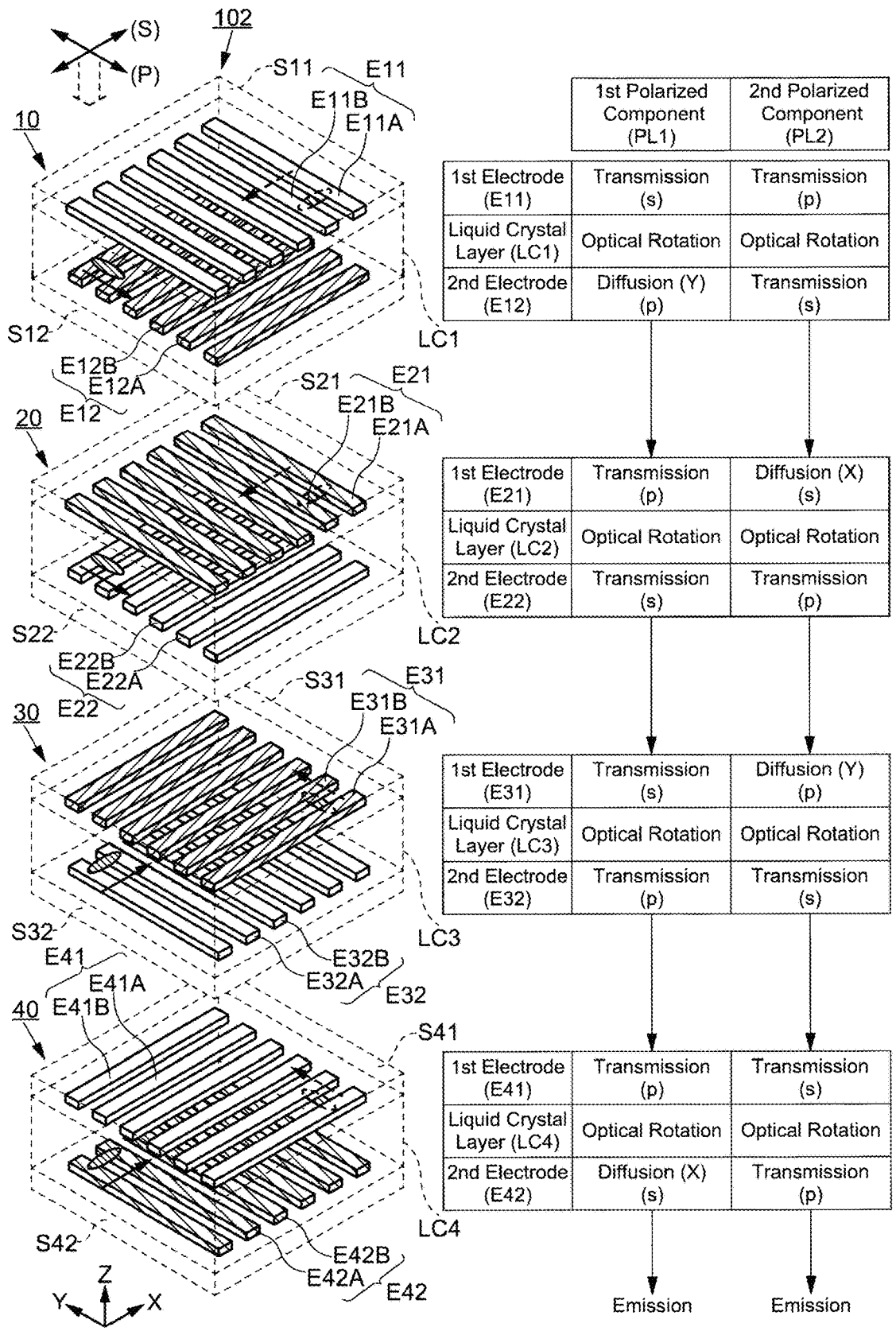
FIG. 10 is a diagram showing a configuration (second configuration) and a state of diffusion of a liquid crystal light control device according to a first embodiment of the present invention.

FIG. 10 shows the liquid crystal light control device 102 according to the second configuration. The liquid crystal light control device 102 according to the second configuration includes first through fourth liquid crystal cells. the first liquid crystal cell 10 is arranged with the first electrode E11 (first strip electrode E11A, second strip electrode E11B) on the first substrate S11 and a second electrode E12 (third strip electrode E12A, fourth strip electrode E12B) on a second substrate S12, the second liquid crystal cell 20 is arranged with the first electrode E21 (first strip electrode E21A, second strip electrode E21B) on the first substrate S21 and the second electrode E22 (third strip electrode E22A, fourth strip electrode E22B) on the second substrate S22, the third liquid crystal cell 30 is arranged with the first electrode E31 (first strip electrode E31A, second strip electrode E31B) on the first substrate S31 and the second electrode E32 (third strip electrode E32A, fourth strip electrode E32B) on the second substrate S32, and the fourth liquid crystal cell 40 is arranged with the first electrode E41 (first strip electrode E41A, second strip electrode E41B) on the first substrate S41 and the second electrode E42 (third strip electrode E42A, fourth strip electrode E42B) on the second substrate S42.

Table 2 shows the control signals applied to each liquid crystal cell of the liquid crystal light control device 102 shown in FIG. 10. FIG. 10 shows the strip electrode to which the control signal is applied, and which generates the transverse electric field in hatching, and the strip electrode to which the control signal is not applied, and which does not generate the transverse electric field is shown in white. The control signals A, B shown in Table 3 correspond to the control signals shown in FIG. 7.

TABLE 2

| Liquid crystal light control element: 102 | | | | Control signal |
|---|---|---|---|---|
| First liquid crystal cell 10 | 1st substrate S11 | 1st electrode E11 | 1st strip electrode: E11A | E |
| | | | 2nd strip electrode: E11B | E |
| | 2nd substrate S12 | 2nd electrode E12 | 3rd strip electrode: E12A | A |
| | | | 4th strip electrode: E12B | B |
| Second liquid crystal cell 20 | 1st substrate S21 | 1st electrode E21 | 1st strip electrode: E21A | A |
| | | | 2nd strip electrode: E21B | B |
| | 2nd substrate S22 | 2nd electrode E22 | 3rd strip electrode: E22A | E |
| | | | 4th strip electrode: E22B | E |
| Third liquid crystal cell 30 | 1st substrate S31 | 1st electrode E31 | 1st strip electrode: E31A | A |
| | | | 2nd strip electrode: E31B | B |
| | 2nd substrate S32 | 2nd electrode E32 | 3rd strip electrode: E32A | E |
| | | | 4th strip electrode: E32B | E |
| Fourth liquid crystal cell 40 | 1st substrate S41 | 1st electrode E41 | 1st strip electrode: E41A | E |
| | | | 2nd strip electrode: E41B | E |
| | 2nd substrate S42 | 2nd electrode E42 | 3rd strip electrode: E42A | A |
| | | | 4th strip electrode: E42B | B |

As shown in Table 2, in the first liquid crystal cell 10, the control signal E is input to the first strip electrode E11A and the second strip electrode E11B, the control signal A is input to the third strip electrode E12A, and the control signal B is input to the fourth strip electrode E12B. The same is true for the fourth liquid crystal cell 40. In the second liquid crystal cell 20, the control signal A is applied to the first strip electrode E21A, the control signal B is input to the second strip electrode E21B, and the control signal E is input to the third strip electrode E22A and the fourth strip electrode E22B. The same is true for the third liquid crystal cell 30. That is, the liquid crystal light control device 102 shown in FIG. 10 is controlled so that in the first liquid crystal cell 10 and the fourth liquid crystal cell 40, the transverse electric field is not generated on the first substrate side and the transverse electric field is generated on the second substrate side, and in the second liquid crystal cell 20 and the third liquid crystal cell 30, the transverse electric field is generated on the first substrate side and the transverse electric field is not generated on the second substrate side.

Next, the operation of the liquid crystal light control device 102 according to the second configuration is explained by the effect of each liquid crystal cell on the incident light.

Focusing on the first polarized component PL1 in FIG. 10, the first polarized component PL1 enters the first liquid crystal cell 10 in the s-polarized state. The first electrode E11 of the first liquid crystal cell 10 does not generate the transverse electric field. Therefore, the first polarized component PL1 is not diffused at the first electrode E11, and in the process of passing through the first liquid crystal layer LC1 from the first substrate S11 side to the second substrate S12 side, it is aligned 90 degrees according to the twisting alignment of the liquid crystal molecules and transitions to the p-polarization. The control signal A is applied to the third strip electrode E12A, and the control signal B is applied to the fourth strip electrode E12B, so the transverse electric field is generated, in the second electrode E12. Therefore, the arc-shaped refractive index distribution is formed on the second substrate S12 side of the first liquid crystal layer LC1. The first polarized component PL1 (p-polarization) is diffused in the Y-axis direction and emitted from the second substrate S12 due to the arc-shaped refractive index distribution, since the polarization direction is parallel to the long axis of the liquid crystal molecules. Thus, the first polarized component PL1 enters the first liquid crystal cell 10 in the s-polarized state, is optically rotated 90 degrees to the p-polarized state, is diffused in the Y-axis direction, and is emitted from the first liquid crystal cell 10.

The first polarized component PL1 passing through the first liquid crystal cell enters the second liquid crystal cell 20 in the p-polarized state. The first polarized component (p-polarization) incident on the second liquid crystal cell 20 is not diffused, as in the first embodiment, and is emitted from the second liquid crystal cell 20 in the s-polarized state after being optically rotated 90 degrees.

The first polarized component PL1 that passes through the second liquid crystal cell 20 enters the third liquid crystal cell 30 in the s-polarized state. The first polarized component (s-polarization) incident on the third liquid crystal cell 30 is not diffused, as in the first embodiment, and is emitted from the third liquid crystal cell in the p-polarized state after being optically rotated 90 degrees.

The first polarized component PL1 that passes through the third liquid crystal cell 30 enters the fourth liquid crystal cell 40 in the p-polarized state. The first electrode E41 of the fourth liquid crystal cell 40 does not generate the transverse electric field. Therefore, the first polarized component PL1 is not diffused by the first electrode E41, and in the process of passing through the fourth liquid crystal layer LC4 from the first substrate S41 side to the second substrate S42 side, it is aligned degrees according to the twisting alignment of the liquid crystal molecules and transitions to the s-polarized state. The control signal A is applied to the third strip electrode E42A, and the control signal B is applied to the fourth strip electrode E42B, so that the transverse electric field is generated, in the second electrode E42. Therefore, the arc-shaped refractive index distribution is formed on the second substrate S42 side of the fourth liquid crystal layer LC4. The first polarized component PL1 (s-polarization) is emitted from the second substrate S42 after being diffused in the X-axis direction due to the effect of the arc-shaped refractive index distribution, since the polarization direction is parallel to the long axis of the liquid crystal molecules. Thus, the first polarized component PL1 enters the fourth liquid crystal cell 40 in the state of p-polarization, is optically rotated 90 degrees to the state of s-polarization, diffused in the X-axis direction, and emitted from the fourth liquid crystal cell 40.

The first polarized component PL1 incident on the liquid crystal light control device 102 according to the second configuration is diffused once in the X-axis direction and once in the Y-axis direction between being incident into the first liquid crystal cell 10 and emitted from the fourth liquid crystal cell 40, and is emitted in the s-polarized state by being incident in the s-polarized state and optically rotated four times at 90 degrees angle.

Next, focusing on the second polarized component PL2, the second polarized component PL2 enters the first liquid crystal cell 10 in the p-polarized state. The first electrode E11 of the first liquid crystal cell 10 does not generate the transverse electric field. Therefore, the second polarized component PL2 (p-polarization) is not diffused by the first electrode E11, and in the process of passing through the first liquid crystal layer LC1 from the first substrate S11 side to the second substrate S12 side, it is turned 90 degrees according to the twisting alignment of the liquid crystal molecules and transitions to the s-polarization. The second polarized component PL2 (s-polarization) is not diffused at the second electrode E12 and is emitted from the first liquid crystal cell 10 in the s-polarized state.

The second polarized component PL2 passing through the first liquid crystal cell 10 enters the second liquid crystal cell 20 in the s-polarized state. In the second liquid crystal cell 20, the second polarized component PL2 (s-polarization) is diffused in the X-axis direction on the first substrate S21 side, as in the first configuration. The second polarized component PL2 (s-polarization) is optically rotated 90 degrees according to the twisting alignment of the liquid crystal molecules in the process of passing through the second liquid crystal layer LC2 from the first substrate S21 side to the second substrate S22 side. As a result, the second polarized component PL2 transitions from the s-polarization to the p-polarization. The second electrode E22 of the second liquid crystal cell 20 does not generate the transverse electric field. Therefore, the second polarized component PL2 is not diffused at the second electrode E22 and is emitted from the second liquid crystal cell 20 in the p-polarized state.

The second polarized component PL2 passing through the second liquid crystal cell 20 enters the third liquid crystal cell 30 in the p-polarized state. In the third liquid crystal cell 30, the second polarized component PL2 (p-polarization) is diffused in the Y-axis direction on the first substrate S31 side, as in the first configuration. The second polarized component PL2 (p-polarization) is optically rotated 90 degrees according to the twisting alignment of the liquid crystal molecules in the process of passing through the third liquid crystal layer LC3 from the first substrate S31 side to the second substrate S32 side. As a result, the second polarized component PL2 transitions from the p-polarization to the s-polarization. The second electrode E32 of the third liquid crystal cell 30 does not generate the transverse electric field. Therefore, the second polarized component PL2 is not diffused at the second electrode E32 and is emitted from the third liquid crystal cell in the s-polarized state.

The second polarized component PL2 passing through the third liquid crystal cell 30 enters the fourth liquid crystal cell 40 in the s-polarized state. The first electrode E41 of the fourth liquid crystal cell 40 does not generate the transverse electric field. Therefore, the second polarized component PL2 (s-polarization) is not diffused by the first electrode E11, and in the process of passing through the first liquid crystal layer LC1 from the first substrate S11 side to the second substrate S12 side, it is turned 90 degrees according to the twisting alignment of the liquid crystal molecules and transitions to the p-polarization. The second polarized component PL2 (p-polarization) is then emitted from the fourth liquid crystal cell 40 without being diffused by the second substrate S42.

The second polarization component PL2 incident on the liquid crystal light control device 102 according to the second configuration is diffused once in the X-axis direction and once in the Y-axis direction before being incident on the first liquid crystal cell 10 and emitted from the fourth liquid crystal cell 40, and is emitted in the p-polarized state by being incident in the p-polarized state and being optically rotated four times at an angle of 90 degrees.

In the second configuration, the first polarized component PL1 is diffused in the Y-axis direction after being optically rotated in the first liquid crystal cell 10 and diffused in the X-axis direction after being optically rotated in the fourth liquid crystal cell 40, the second polarized component PL2 is diffused in the X-axis direction before being optically rotated in the second liquid crystal cell 20 and diffused in the Y-axis direction before being optically rotated in the third liquid crystal cell 30. That is, in the second configuration, the pre-diffusion of the first polarized component PL1 in the X-axis direction is 0 times, the post-diffusion is 1 time, the pre-diffusion in the Y-axis direction is 0 times, and the post-diffusion is 1 time. In addition, the pre-diffusion of the first polarized component PL2 in the X-axis direction is 1 time, the post-diffusion is 0 time, the pre-diffusion in the Y-axis direction is 1 time, and the post-diffusion is 0 time.

1-3. Reference Example 1

Figure 11:
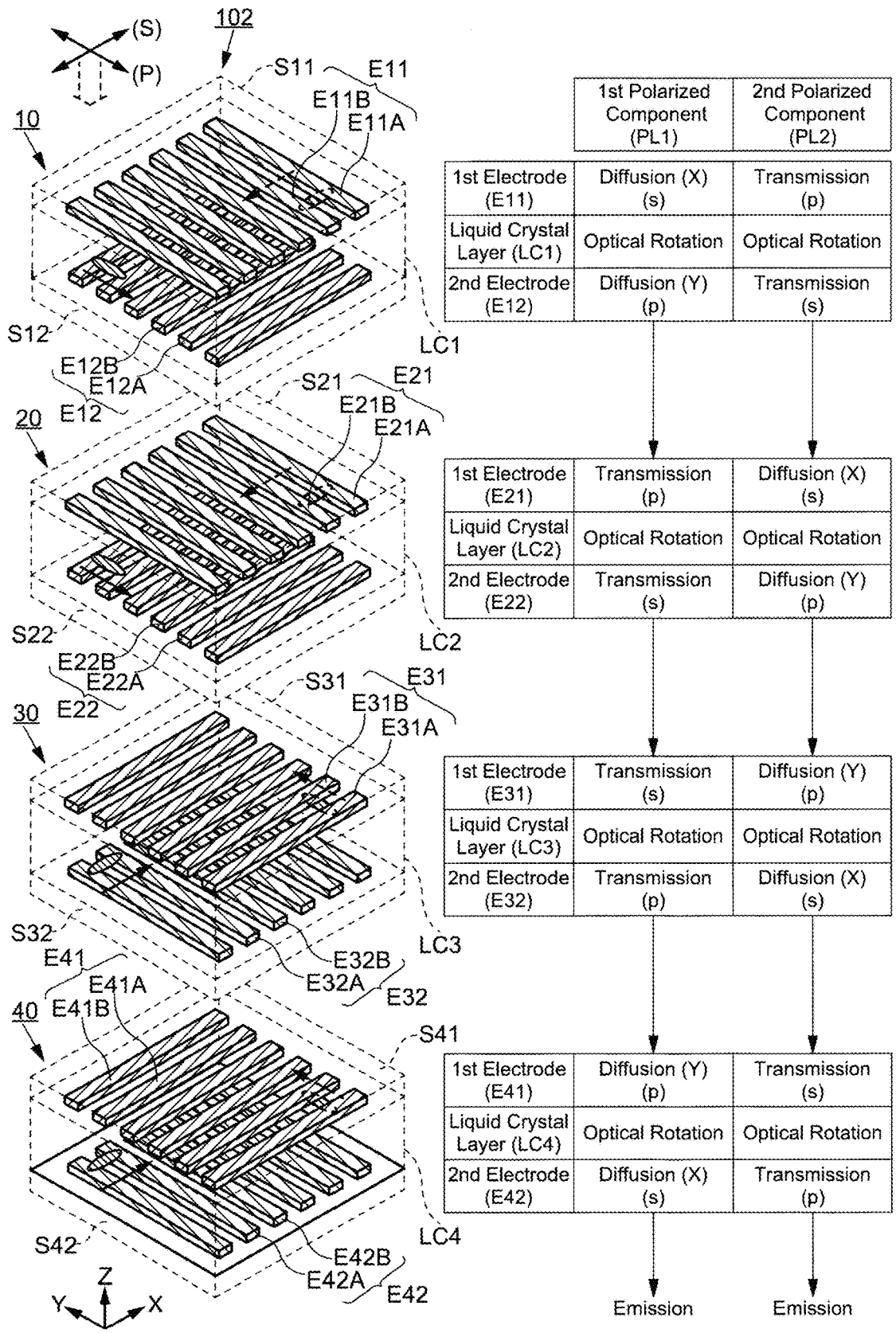
FIG. 11 is a diagram showing a configuration and a state of diffusion of a liquid crystal light control device according to a reference example.

FIG. 11 shows the liquid crystal light control device related to a reference example 1. In the reference example 1, the control signal A is applied to the first strip electrode E11A on the first substrate S11 side of the first liquid crystal cell 10, the control signal B is applied to the second strip electrode E11B, the control signal A is applied to the third strip electrode E12A on the second substrate S12 side, and the control signal B is applied to the fourth strip electrode E12B. The same is true for the second liquid crystal cell 20, the third liquid crystal cell 30, and the fourth liquid crystal cell 40. That is, in all of the liquid crystal cells, transverse electric fields are generated on both the first substrate (S11, S21, S31, S41) side and the second substrate (S12, S22, S32, S42) side.

Focusing on the first polarized component PL1 in FIG. 11, the first polarized component PL1 enters the first liquid crystal cell 10 in the s-polarized state. The first polarized component PL1 is diffused in the X-axis direction on the first electrode E11 side of the first liquid crystal cell 10, optically rotated 90 degrees in the first liquid crystal layer LC1, and diffused in the Y-axis direction on the second electrode E12 side. The first polarized component PL1 is transmitted through the second liquid crystal cell 20 and the third liquid crystal cell 30 while being optically rotated 90 degrees respectively, diffused in the Y-axis direction at the first electrode E41 side of the fourth liquid crystal cell 40, optically rotated 90 degrees at the fourth liquid crystal layer LC4, diffused in the X-axis direction at the second electrode E42 side, and emitted in the s-polarized state.

Focusing on the second polarized component PL2 in FIG. 11, the second polarized component PL2 enters the first liquid crystal cell 10 in the p-polarized state. The second polarized component PL2 is optically rotated 90 degrees by the first liquid crystal cell 10 and enters the second liquid crystal cell 20 in the s-polarized state without being diffused in the first liquid crystal cell 10. The second polarized component PL2 is diffused in the X-axis direction on the first electrode E21 side of the second liquid crystal cell 20, optically rotated 90 degrees by the second liquid crystal layer LC2 to transform it into p-polarization, and diffused in the Y-axis direction on the second electrode E22 side. The second polarized component PL2 is diffused in the Y-axis direction at the first electrode E31 side of the third liquid crystal cell 30, is optically rotated 90 degrees by the third liquid crystal layer LC3 to transform it into s-polarization, and is diffused in the X-axis direction at the second electrode E22 side. The second polarization component PL2 is optically rotated 90 degrees in the fourth liquid crystal cell 40, and is not diffused in the fourth liquid crystal cell 40 and is emitted in the p-polarized state.

Thus, in the liquid crystal light control device related to the reference example 1, the first polarized component PL1 is diffused in the X-axis and Y-axis directions by the first liquid crystal cell 10 and the fourth liquid crystal cell 40, and the second polarized component PL2 is diffused in the X-axis and Y-axis directions by the second liquid crystal cell 20 and the third liquid crystal cell 30.

1-4. Angular Characteristics

Figure 12A:
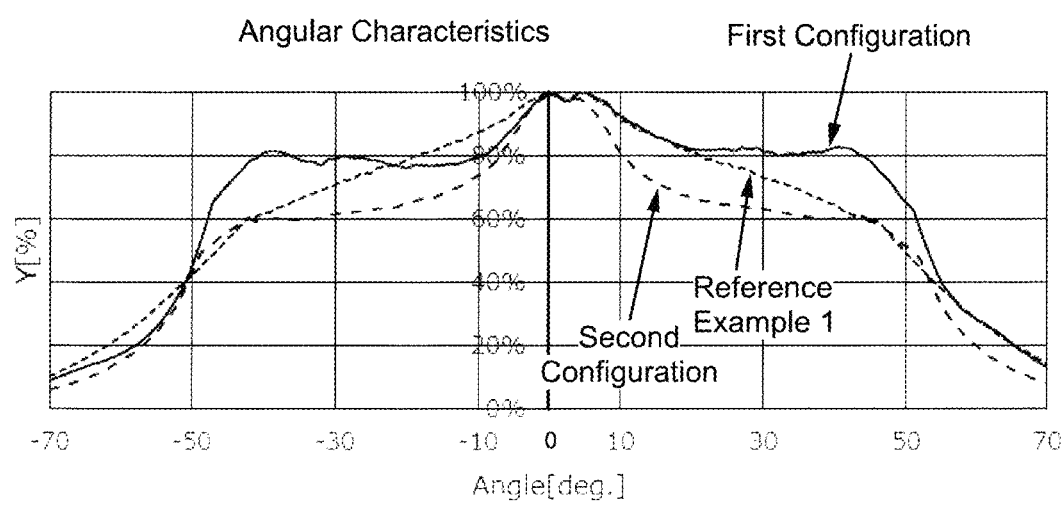
FIG. 12A is a graph of the luminance-angle characteristic of a liquid crystal light control device as a characteristic of a liquid crystal light control device according to a first embodiment of the present invention.
Figure 12B:
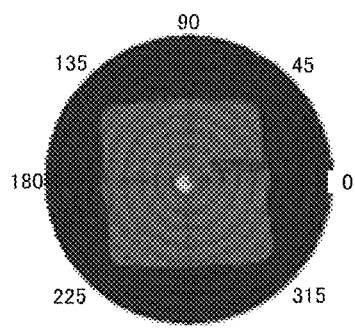
FIG. 12B is a profile of light emitted as a characteristic of a liquid crystal light control device according to a first embodiment of the present invention.
Figure 12C:
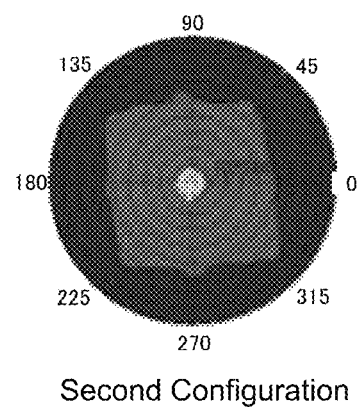
FIG. 12C is a profile of light emitted as a characteristic of a liquid crystal light control device according to a first embodiment of the present invention.

FIG. 12A shows graphs of the luminance-angle characteristics of the liquid crystal light control device 102 related to the first and second configurations. FIG. 12A also shows the characteristics of the reference example 1 in the same graph. The horizontal axis of the graph shown in FIG. 12A indicates the polar angle. As shown in FIG. 12E, the polar angles shown in the graph indicate the angle when 0 degrees represents the light emission surface of the liquid crystal light control device viewed from the front, and tilted in the positive and negative directions on the X-axis direction. The vertical axis of the graph shows the luminance when the luminance at the center (0-degree polar angle) is normalized to be 100%.

In the graph shown in FIG. 12A, the characteristics for the first configuration of the liquid crystal light control device 102 show that although the luminance in the polar angle range of +20 degree to +40 degree and −20 degree to −40 degree drops by about 20% from the central luminance, a constant luminance distribution is obtained in the same range. The first configuration shows that by adopting a configuration in which each polarization component is diffused before being optically rotated in the liquid crystal layer and not diffused after the optical rotation as shown above, a substantially flat intensity distribution can be obtained over a certain range of polar angles. That is, among the polarized components diffused in a predetermined direction (X-axis or Y-axis direction) in the liquid crystal cell, the components that were not fully optically rotated in the liquid crystal layer are not diffused again at the electrode on the light output side, thereby obtaining a flat characteristic in the angular characteristic of luminance.

The description above of "diffusing each polarized component before being optically rotated in the liquid crystal layer and not diffusing after the rotation" means that a polarized component is diffused before being optically rotated in a certain liquid crystal panel and is not further diffused after the rotation in the same liquid crystal panel immediately after that. It does not include the case where the polarized component diffuses in different liquid crystal panels in the process of passing through the liquid crystal light control device. For example, in the first configuration, the first polarized component is diffused in the first liquid crystal cell and the fourth liquid crystal cell, but in the first liquid crystal cell it is diffused before rotation (pre-diffusion) and not after rotation, and in the fourth liquid crystal cell it is similarly diffused before rotation and not after rotation.

The characteristics for the second configuration of the liquid crystal light control device 102 shows that the luminance in the polar angle range of +20 degrees to +40 degrees and −20 degrees to −40 degrees drops by about 40% from the central luminance, but a constant luminance distribution is obtained in the same range. The second configuration is that the first polarized component PL1 is diffused after the first polarized component PL1 is optically rotated in the liquid crystal layer, and the second polarized component PL2 is diffused before the rotation. The characteristics for the second configuration have a profile similar to those for the first configuration, although the luminance in the polar angle range of +20 degrees to +40 degrees and −20 degrees to −40 degrees is reduced. Thus, it can be seen that by diffusing each polarized component once each in the X-axis direction and Y-axis direction, relatively flat luminance characteristics can be obtained in the polar angle range of +20 degrees to +40 degrees and −20 degrees to −40 degrees.

As described above, comparing the first configuration and the second configuration, the first polarization component and the second polarization component both diffuse one time in the X-axis direction in the process of passing through the liquid crystal light control device 102 in the first configuration. On the other hand, the first polarized component is post-diffused once in the X-axis direction and the second polarized component is pre-diffused once in the X-axis direction, indicating that the pre-diffusion has a wider polar angle range to maintain constant luminance while reducing luminance decline than in the post-diffusion, in the second configuration.

In contrast, the characteristics of the liquid crystal light control device shown as the reference example 1 show that the intensity distribution of luminance has the highest intensity at a polar angle of 0 degrees and decreases linearly as the polar angle increases in the positive and negative directions (that is, in the left and right directions). The liquid crystal light control device according to the reference example diffuses each polarized component before and after the liquid crystal layer, and it is found that the change in the polar angular direction of luminance differs from the characteristics in the first and second configurations. That is, it is found that the luminance distribution that decreases linearly in the polar angular direction is obtained by diffusing polarized components in the liquid crystal cell before and after the rotation of the light.

More specifically, in the reference example 1, the first polarized component is pre-diffused once in the X-axis direction, but is post-diffused in the Y-axis direction in the same liquid crystal cell (first liquid crystal cell) immediately after the pre-diffusion. The second polarized component is pre-diffused once in the X-axis direction, but is post-diffused in the same liquid crystal cell (second liquid crystal cell) in the Y-axis direction immediately before the post-diffusion. Furthermore, in the reference example 1, the first polarized component is pre-diffused once in the Y-axis direction, but is post-diffused in the X-axis direction in the same liquid crystal cell (the fourth liquid crystal cell) immediately after the pre-diffusion. The second polarized component is pre-diffused once in the Y-axis direction, but is post-diffused in the same liquid crystal cell (the third liquid crystal cell) in the X-axis direction immediately after the pre-diffusion. That is, in the reference example 1, one pre-diffusion and one post-diffusion are made in the X-axis direction for each polarized component, but both are accompanied by diffusion in the Y-axis direction in the same liquid crystal cell. It is shown in FIG. 12A that when diffusion is accompanied before and after optically rotation in the same liquid crystal cell, even if the number of first diffusions is the same, the luminance decreases monotonically as the polar angle increases, compared to the case where diffusion is accompanied only by first diffusion (the first configuration).

According to FIG. 12A, in each of the first configuration, the second configuration, and the reference example 1, the luminance around the polar angle of degrees is reduced by half with respect to at the polar angle of 0 degrees, and thereafter, the luminance is similarly reduced. Assuming that the region until the luminance is reduced to half is called the half-width, in the first configuration, the half-width is the same as in the reference example 1, while the luminance within the half-width is improved and kept constant compared to that in the reference example 1, and in the second configuration, the half-width is the same as in the reference example 1, while the luminance within the half-width is reduced and kept constant compared to that in the reference example 1.

Next, the profiles of the emitted light for each configuration are shown. FIG. 12B shows the profile of the emitted light in the first configuration. A square-like, well-shaped profile is obtained in the first configuration since the first polarized component PL1 and the second polarized component PL2 are diffused once each in the X-axis direction and the Y-axis direction at the electrode on the incident side of each crystal cell. FIG. 12C shows the profile of the emitted light in the second configuration. In the second configuration, the first polarization component PL1 is diffused by the second substrate (substrate on the light emission side) of the first liquid crystal cell 10 and the fourth liquid crystal cell 40, and the second polarization component PL2 is diffused by the first substrate (substrate on the light incident side) of the second liquid crystal cell 20 and the third liquid crystal cell 30, thereby obtaining a profile similar to a square shape as in the first configuration.

Figure 12D:
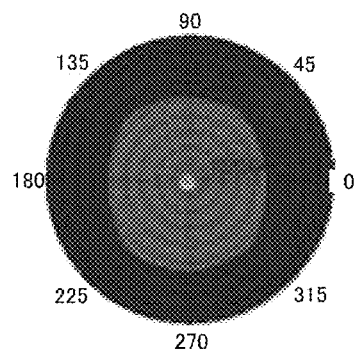
FIG. 12D is a profile of light emitted as a characteristic of a liquid crystal light control device according to a first embodiment of the present invention.
Figure 12E:
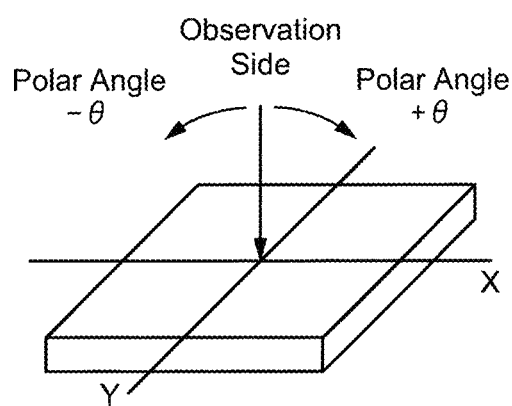
FIG. 12E is a profile of light emitted as a characteristic of a liquid crystal light control device according to a first embodiment of the present invention.

On the other hand, FIG. 12D shows the profile of the emitted light in the reference example 1. In the reference example 1, the first polarization component PL1 is diffused twice in the X-axis direction and the Y-axis direction in the first liquid crystal cell 10 and the fourth liquid crystal cell 40, and the second polarization component PL2 is diffused twice in the X-axis direction and the Y-axis direction in the second liquid crystal cell 20 and the third liquid crystal cell 30, so that a profile close to a circular shape is obtained compared with the profiles obtained in the first configuration and the second configuration.

Comparing the characteristics of the first and second configurations with those of Reference Example 1 in the graph in FIG. 12A, it can be seen that the intensity of light distribution is higher when the light is diffused on the first substrate (substrate on the light incident side) side in each liquid crystal cell. On the other hand, as in the reference example 1, by increasing the number of diffusions, it is possible to reduce the decrease in luminance around the polar angle 0 degree.

As shown in FIG. 12B to FIG. 12D, it can be seen that a well-shaped (square) profile can be obtained by diffusing the polarization component in one liquid crystal cell before the light is optically rotated and not after the light is optically rotated, rather than by diffusing the polarization component before and after the light is optically rotated by the liquid crystal layer. Also, it can be seen that a well-shaped (square) profile can be obtained by diffusing the polarization component in one liquid crystal cell only before and only after the light is optically rotated in the liquid crystal layer.

As described with reference to FIG. 5A and FIG. 5B, in the process of passing through each of the liquid crystal cells, a portion of the polarization component that cannot be optically rotated remains, therefore, light distribution characteristics can be enhanced by diffusing the corresponding polarization component in another liquid crystal cell rather than diffusing it in different directions before and after rotation in one liquid crystal cell, and an irradiation profile having a well-formed shape can be obtained.

According to the present embodiment, the liquid crystal cell stacked in four stages has a configuration in which each polarization component is diffused before being optically rotated by the liquid crystal layer and is prevented from diffusing after being optically rotated, so that a substantially flat intensity distribution can be obtained within a certain range of polar angles and a well-shaped irradiation profile can be obtained. Furthermore, in the liquid crystal cell arranged in four stages, it is possible to obtain a substantially flat intensity distribution in a certain range of polar angles by adopting a configuration in which each polarization component is diffused before or after rotating the light in the liquid crystal layer and is not diffused before or after rotating the light in one liquid crystal cell, and to obtain a well-shaped irradiation profile.

Second Embodiment

This embodiment shows an example in which the liquid crystal light control device is configured with five liquid crystal cells. Each liquid crystal cell is arranged with the liquid crystal layer between the pair of substrates, and at least one of the substrates has the strip electrode as shown in FIG. 1.

2-1. Third Configuration

Figure 13:
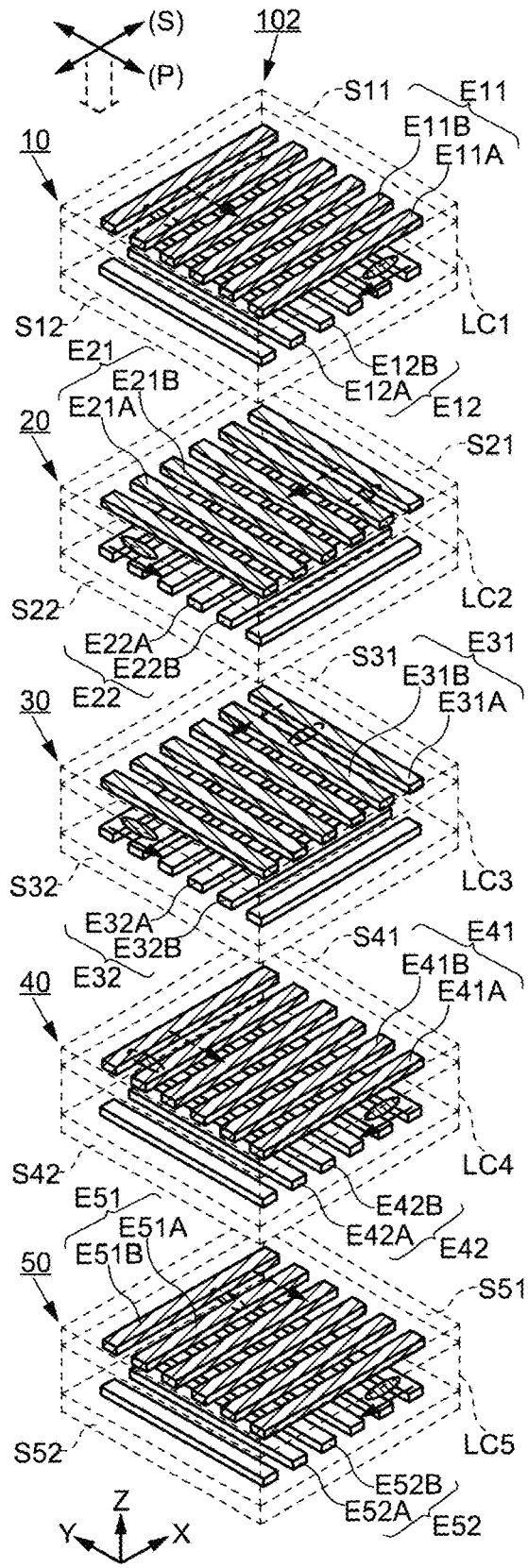
FIG. 13 is a diagram showing a configuration (third configuration) and a state of diffusion of a liquid crystal light control device according to a second embodiment of the present invention.
Figure 13:
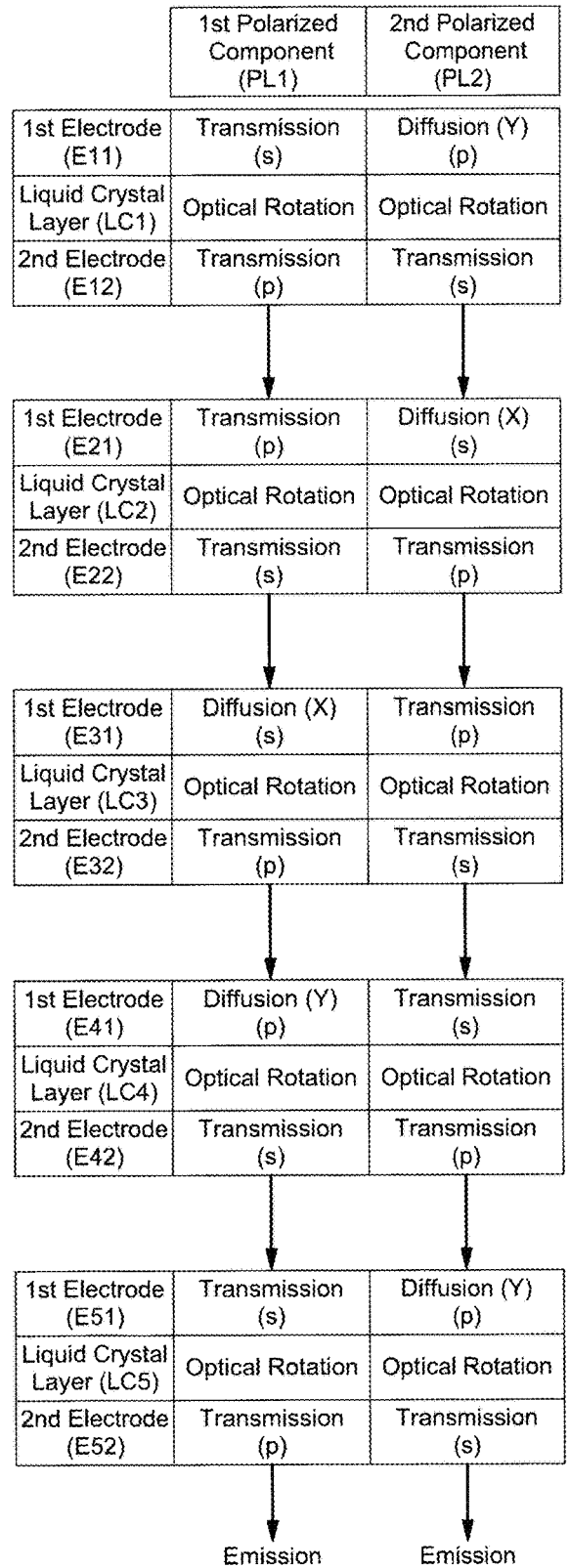

FIG. 13 shows an electrode arrangement in each liquid crystal cell of the liquid crystal light control device 102 according to the third configuration and the state of the light incident on the liquid crystal light control device 102 as it passes through each liquid crystal cell. The liquid crystal light control device 102 according to the third configuration includes first through fifth liquid crystal cells. As described in the first configuration, the configuration of each liquid crystal cell configures the first electrode on the first substrate side with strip electrodes and the second electrode on the second substrate side with strip electrodes.

As shown in FIG. 13, the liquid crystal light control device 102 according to the third configuration is arranged so that a first liquid crystal cell 10, a second liquid crystal cell 20, a third liquid crystal cell 30, a fourth liquid crystal cell 40, and a fifth liquid crystal cell 50 overlap from the light incident side to the emitting side.

The first liquid crystal cell 10 is arranged so that the direction of extension of a first strip electrode E11A and a second strip electrode E11B on a first substrate S11 side extends in the X-axis direction, and a direction of extension of a third strip electrode E12A and a fourth strip electrode E12B on a second substrate S12 side extends in the Y-axis direction. The second liquid crystal cell 20 and the third liquid crystal cell 30 are arranged so that a direction of extension of first strip electrodes E21A, E31A and second strip electrodes E21B, E31B on the first substrates S21, S31 side extends in the Y-axis direction, and a direction of extension of third strip electrodes E22A, E32A and fourth strip electrodes E22B, E32B on the second substrates S22, S32 side extends in the X-axis direction. The fourth liquid crystal cell 40 and the fifth liquid crystal cell 50 are arranged so that a direction of extension of first strip electrodes E41A, E51A and second strip electrodes E41B, E51B on the first substrates S41, S51 side extends in the X-axis direction, and a direction of extension of third strip electrodes E42A, E52A and fourth strip electrodes E42B, E52B on the second substrates S42, S52 side extends in the Y-axis direction. An alignment direction of the alignment film of each liquid crystal cell is also the same as that of the first embodiment in the arrangement where a direction of extension of the strip electrode crosses the direction of extension. This embodiment can also be said to be a configuration in which one more liquid crystal cell is added to the configuration of the variant of the first embodiment shown in FIG. 9 and FIG. 10 and stacked on the incident side. The added liquid crystal cell can be said to be the same liquid crystal cell as the third to fourth liquid crystal cells in the said first embodiment variant and arranged in the same direction as these liquid crystal cells.

FIG. 13 shows the electrodes to which the control signal is applied to form the transverse electric field are indicated by hatching, as in the first embodiment. Tables are inserted in FIG. 13 to show the state of each polarized component when light containing a first polarized component PL1 and a second polarized component PL2 passes through the first electrode, the liquid crystal layer, and the second electrode of each liquid crystal cell, using the terms transmission, rotation, and diffusion.

Table 3 shows the control signals applied to each liquid crystal cell of the liquid crystal light control device 102 according to the third configuration shown in FIG. 13.

TABLE 3

| | Liquid crystal light control element: 102 | | | Control signal |
|---|---|---|---|---|
| First liquid crystal cell 10 | 1st substrate S11 | 1st electrode E11 | 1st strip electrode: E11A | A |
| | | | 2nd strip electrode: E11B | B |
| | 2nd substrate S12 | 2nd electrode E12 | 3rd strip electrode: E12A | E |
| | | | 4th strip electrode: E12B | E |
| Second liquid crystal cell 20 | 1st substrate S21 | 1st electrode E21 | 1st strip electrode: E21A | A |
| | | | 2nd strip electrode: E21B | B |
| | 2nd substrate S22 | 2nd electrode E22 | 3rd strip electrode: E22A | E |
| | | | 4th strip electrode: E22B | E |
| Third liquid crystal cell 30 | 1st substrate S31 | 1st electrode E31 | 1st strip electrode: E31A | A |
| | | | 2nd strip electrode: E31B | B |
| | 2nd substrate S32 | 2nd electrode E32 | 3rd strip electrode: E32A | E |
| | | | 4th strip electrode: E32B | E |
| Fourth liquid crystal cell 40 | 1st substrate S41 | 1st electrode E41 | 1st strip electrode: E41A | A |
| | | | 2nd strip electrode: E41B | B |
| | 2nd substrate S42 | 2nd electrode E42 | 3rd strip electrode: E42A | E |
| | | | 4th strip electrode: E42B | E |
| Fifth liquid crystal cell 50 | 1st substrate S51 | 1st electrode E51 | 1st strip electrode: E51A | A |
| | | | 2nd strip electrode: E51B | B |
| | 2nd substrate S52 | 2nd electrode E52 | 3rd strip electrode: E52A | E |
| | | | 4th strip electrode: E52B | E |

As shown in Table 3, square wave control signals A, B are applied to the first electrodes (first strip electrode and second strip electrode) on the first substrate side (light incident side), and the constant voltage control signal E is applied to the second electrodes (third strip electrode and fourth strip electrode) on the second substrate side (light emission side), in each liquid crystal cell of the liquid crystal light control device 102 according to the third configuration. That is, control signals A, B are applied to the first electrode of each liquid crystal cell, a control signal E is applied to the second electrode, and the transverse electric field is generated only on the first substrate side, in the third configuration of the liquid crystal light control device 102 shown in FIG. 13.

Next, the state of diffusion, optical rotation, and transmission of light incident on the liquid crystal light control device 102 according to the third configuration will be described. It is assumed that in the third configuration, an initial state of the first polarized component PL1 (the state immediately before it enters the liquid crystal light control device 102) is in the s-polarization, and an initial state of the second polarized component PL2 is in the p-polarization.

Focusing on the first polarized component PL1 in FIG. 13, the first polarized component PL1 enters the first liquid crystal cell 10 in the s-polarized state. The first polarized component PL1 (s-polarization) incident on the first liquid crystal cell 10 is not diffused by the first electrode E11, is optically rotated 90 degrees by the first liquid crystal layer LC1 to transition to the p-polarization, is not diffused by the second electrode E12, and is emitted from the first liquid crystal cell 10. The first polarized component PL1 (p-polarization) incident on the second liquid crystal cell 20 is not diffused at the first electrode E21, is optically rotated 90 degrees by the second liquid crystal layer LC2 to transition to the s-polarization, is not diffused at the second electrode E22, and is emitted from the second liquid crystal cell 20. The first polarized component PL1 (s-polarization) incident on the third liquid crystal cell 30 is diffused in the X-axis direction at the first electrode E31, is optically rotated 90 degrees by the third liquid crystal layer LC3 to transition to the p-polarization, is not diffused at the second electrode E32, and is emitted from the third liquid crystal cell 30. The first polarized component PL1 (p-polarization) incident on the fourth liquid crystal cell 40 is diffused in the Y-axis direction at the first electrode E41, is optically rotated 90 degrees by the fourth liquid crystal layer LC4 to transition to the s-polarization, is not diffused at the second electrode E42, and is emitted from the fourth liquid crystal cell 40. The first polarized component PL1 (s-polarization) incident on the fifth liquid crystal cell 50 is not diffused by the first electrode E51, is optically rotated 90 degrees by the fifth liquid crystal layer LC5 to transition to the p-polarization, is not diffused by the second electrode E52, and is emitted from the fifth liquid crystal cell 50. Thus, the first polarized component PL1 (s-polarization) incident on the liquid crystal light control device 102 according to the third configuration is diffused once in the X-axis direction and once in the Y-axis direction, is optically rotated five times in the liquid crystal layer, and is emitted in the p-polarized state.

Focusing on the second polarized component PL2 in FIG. 13, the second polarized component PL2 enters the first liquid crystal cell 10 in the p-polarized state. The second polarized component PL2 (p-polarization) incident on the first liquid crystal cell 10 is diffused in the Y-axis direction at the first electrode E11, optically rotated 90 degrees by the first liquid crystal layer LC1 to transition to the s-polarization, is not diffused at the second electrode E12, and is emitted from the first liquid crystal cell 10. The second polarized component PL2 (s-polarization) incident on the second liquid crystal cell 20 is diffused in the X-axis direction at the first electrode E21, is optically rotated 90 degrees by the second liquid crystal layer LC2 to transition to the p-polarization, is not diffused at the second electrode E22, and is emitted from the second liquid crystal cell 20. The second polarized component PL2 (p-polarization) incident on the third liquid crystal cell 30 is not diffused by the first electrode E31, is optically rotated 90 degrees by the third liquid crystal layer LC3, transitions to the s-polarization, is not diffused by the second electrode E32, and is emitted from the third liquid crystal cell 30. The second polarized component PL2 (s-polarization) incident on the fourth liquid crystal cell 40 is not diffused by the first electrode E41, is optically rotated 90 degrees by the fourth liquid crystal layer LC4, transitions to the p-polarization, is not diffused by the second electrode E42, and is emitted from the fourth liquid crystal cell 40. The second polarized component PL2 (p-polarization) incident on the fifth liquid crystal cell 50 is diffused in the Y-axis direction at the first electrode E51, is optically rotated 90 degrees at the fifth liquid crystal layer LC5 to transition to the s-polarization, is not diffused at the second electrode E52, and is emitted from the fifth liquid crystal cell 50. Thus, the second polarized component PL2 (p-polarization) incident on the liquid crystal light control device 102 according to the third configuration is diffused once in the X-axis direction and twice in the Y-axis direction, optically rotated five times in the liquid crystal layer, and emitted in the s-polarized state. The second polarized component PL2 (p-polarization) incident on the fifth liquid crystal cell 50 is diffused in the Y-axis direction at the first electrode E51, is optically rotated 90 degrees at the fifth liquid crystal layer LC5 to transition to the s-polarization, is not diffused by the second electrode E52, and is emitted from the fifth liquid crystal cell 50. Thus, the second polarized component PL2 (p-polarization) incident on the liquid crystal light control device 102 according to the third configuration is diffused once in the X-axis direction and twice in the Y-axis direction, optically rotated five times in the liquid crystal layer, and emitted in the s-polarized state.

In the third configuration, the first polarized component PL1 is diffused in the X-axis direction before being optically rotated in the third liquid crystal cell 30 and diffused in the Y-axis direction before being optically rotated in the fourth liquid crystal cell 40, and the second polarized component PL2 is diffused in the X-axis direction before being optically rotated in the second liquid crystal cell 20, diffused in the Y-axis direction before being optically rotated in the third liquid crystal cell 30, and further diffused in the Y-axis direction before being optically rotated in the fifth liquid crystal cell 50. In the third configuration, the second electrodes E12, E22, E32, E42, E52 may be planar (also referred to as a flat plate or a solid shape) electrodes as shown in FIG. 6 or without the second electrode as shown in FIG. 8.

2-2. Fourth Configuration

The fourth configuration is such that the liquid crystal light control device does not diffuse the polarized component on the first electrode E11, E41, E51 side (light input side) of the first liquid crystal cell 10, the second liquid crystal cell 20, and the fifth liquid crystal cell 50, but diffuses it on the second electrode E12, E42, E52 side (light output side), and the third liquid crystal cell 30 and fourth liquid crystal cell are diffused on the first electrode E21, E31 side (light-entering side) and not diffused on the second electrode E22, E32 side.

Figure 14:
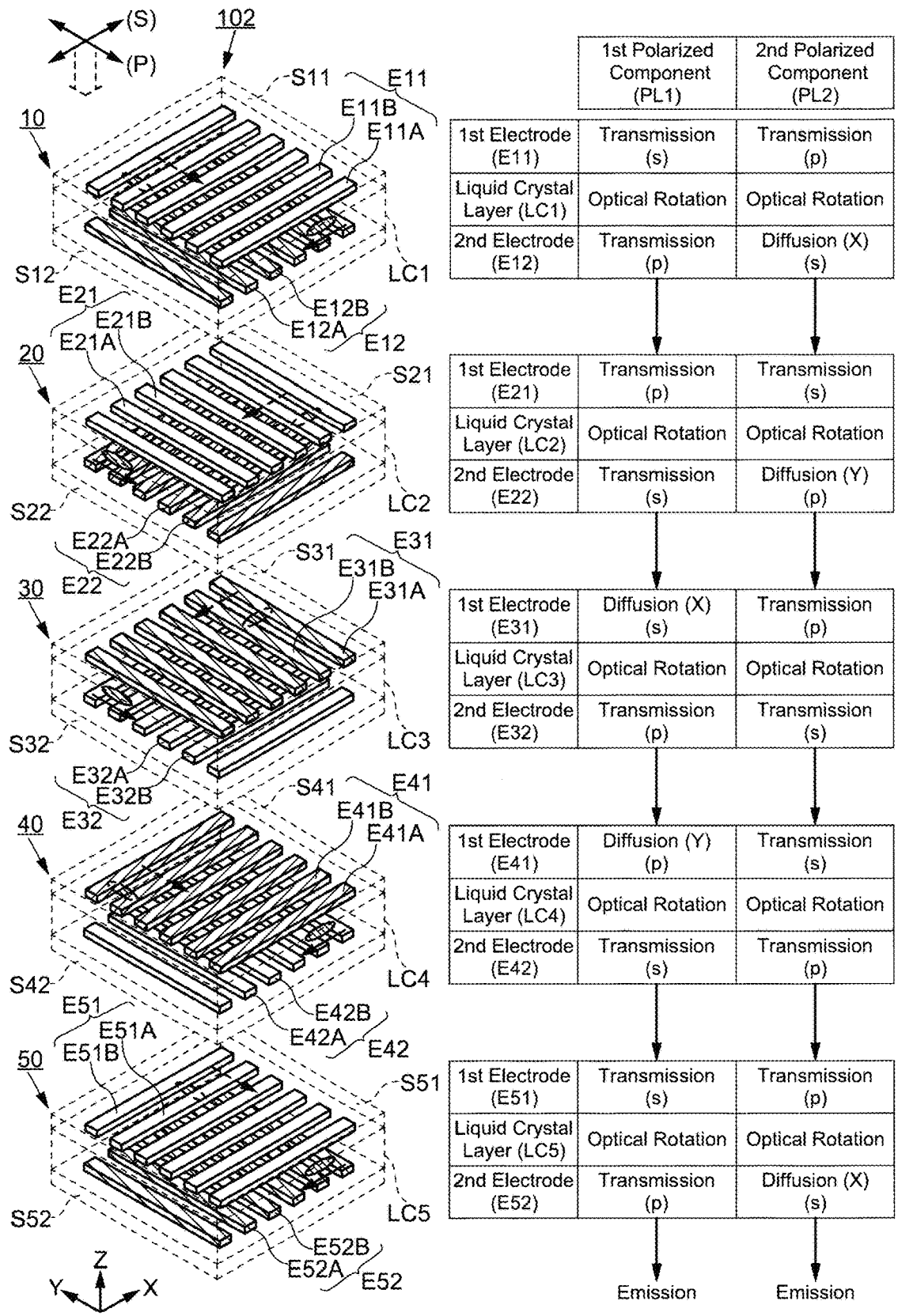
FIG. 14 is a diagram showing a configuration (fourth configuration) and a state of diffusion of a liquid crystal light control device according to a second embodiment of the present invention.

FIG. 14 shows the arrangement of electrodes in each liquid crystal cell of the liquid crystal light control device 102 according to the fourth configuration and the state of light incident on the liquid crystal light control device 102 as it passes through each liquid crystal cell. The arrangement of the strip electrodes in each liquid crystal cell is the same as in the third configuration.

Table 4 shows the control signals applied to each liquid crystal cell of the liquid crystal light control device 102 according to the fourth configuration shown in FIG. 14.

TABLE 4

| Liquid crystal light control element: 102 | | | | Control signal |
|---|---|---|---|---|
| First liquid crystal cell 10 | 1st substrate S11 | 1st electrode E11 | 1st strip electrode: E11A | E |
| | | | 2nd strip electrode: E11B | E |
| | 2nd substrate S12 | 2nd electrode E12 | 3rd strip electrode: E12A | A |
| | | | 4th strip electrode: E12B | B |
| Second liquid crystal cell 20 | 1st substrate S21 | 1st electrode E21 | 1st strip electrode: E21A | E |
| | | | 2nd strip electrode: E21B | E |
| | 2nd substrate S22 | 2nd electrode E22 | 3rd strip electrode: E22A | A |
| | | | 4th strip electrode: E22B | B |

TABLE 4-continued

| | Liquid crystal light control element: 102 | | | Control signal |
|---|---|---|---|---|
| Third liquid crystal cell 30 | 1st substrate S31 | 1st electrode E31 | 1st strip electrode: E31A | A |
| | | | 2nd strip electrode: E31B | B |
| | 2nd substrate S32 | 2nd electrode E32 | 3rd strip electrode: E32A | E |
| | | | 4th strip electrode: E32B | E |
| Fourth liquid crystal cell 40 | 1st substrate S41 | 1st electrode E41 | 1st strip electrode: E41A | A |
| | | | 2nd strip electrode: E41B | B |
| | 2nd substrate S42 | 2nd electrode E42 | 3rd strip electrode: E42A | E |
| | | | 4th strip electrode: E42B | E |
| Fifth liquid crystal cell 50 | 1st substrate S51 | 1st electrode E51 | 1st strip electrode: E51A | E |
| | | | 2nd strip electrode: E51B | E |
| | 2nd substrate S52 | 2nd electrode E52 | 3rd strip electrode: E52A | A |
| | | | 4th strip electrode: E52B | B |

As shown in Table 4, the liquid crystal light control device 102 according to the fourth configuration is such that, for the first liquid crystal cell 10, the second liquid crystal cell 20, and the fifth liquid crystal cell 50, the control signal E having a constant voltage is applied to the first electrodes E11, E21, E51 (the first strip electrodes E111A, E21A, E51A, and the second strip electrodes E11B, E21B, E51B) on the light incidence side, and the control signals A, B are applied to the second electrodes E12, E22, E52 (the third strip electrodes E12A, E22A, E52A, and the fourth strip electrodes E121B, E221B, E521B) on the light emission side after optical rotation. For the third liquid crystal cell 30 and the fourth liquid crystal cell 40, the control signals A, B are applied to the first electrodes E31, E41 (the first strip electrodes E31A, E41A, and the second strip electrodes E31B, E41B) on the light incident side, and the control signals E having a constant voltage are applied to the second electrodes E32, E42 (the third strip electrodes E32A, E42A, and the fourth strip electrodes E32B, E42B). That is, the liquid crystal light control device 102 according to the fourth configuration shown in FIG. 14 does not generate the transverse electric field on the first substrates S11, S21, S51 side of the first liquid crystal cell 10, the second liquid crystal cell 20, and the fifth liquid crystal cell 50, generates the transverse electric field on the second substrates S12, S22, S52 side, generates the transverse electric field on the first substrates S31, S41 side of the third liquid crystal cell 30 and the fourth liquid crystal cell 40, and does not generate the transverse electric field on the second substrates S32, S42 side.

Next, the state of diffusion, optical rotation, and transmission of light incident on the liquid crystal light control device 102 according to the fourth configuration will be described. It is assumed that in the fourth configuration, the initial state of the first polarized component PL1 (the state immediately before it enters the liquid crystal light control device 102) is s-polarization, and the initial state of the second polarized component PL2 is p-polarization.

Focusing on the first polarized component PL1 in FIG. 14. the first polarized component PL1 enters the first liquid crystal cell 10 in the s-polarized state. The first polarized component PL1 (s-polarization) incident on the first liquid crystal cell 10 is not diffused by the first electrode E11, is optically rotated 90 degrees by the first liquid crystal layer LC1 to transition to the p-polarization, is not diffused by the second electrode E12, and is emitted from the first liquid crystal cell 10. The first polarized component PL1 (p-polarization) incident on the second liquid crystal cell 20 is not diffused at the first electrode E21, is optically rotated 90 degrees by the second liquid crystal layer LC2 to transition to the s-polarization, is not diffused at the second electrode E22, and is emitted from the second liquid crystal cell 20.

The first polarized component PL1 (s-polarization) incident on the third liquid crystal cell 30 is diffused in the X-axis direction at the first electrode E31, is optically rotated 90 degrees by the third liquid crystal layer LC3 to transition to the p-polarization, is not diffused at the second electrode E32, and is emitted from the third liquid crystal cell 30. The first polarized component PL1 (p-polarization) incident on the fourth liquid crystal cell 40 is diffused in the Y-axis direction at the first electrode E41, is optically rotated 90 degrees at the fourth liquid crystal layer LC4 to transition to the s-polarization, is not diffused at the second electrode E42, and is emitted from the fourth liquid crystal cell 40. The first polarized component PL1 (s-polarization) incident on the fifth liquid crystal cell 50 is not diffused by the first electrode E51, is optically rotated 90 degrees by the fifth liquid crystal layer LC5 to transition to the p-polarization, is not diffused by the second electrode E52, and is emitted from the fifth liquid crystal cell 50. Thus, the first polarized component PL1 (s-polarization) incident on the liquid crystal light control device 102 according to the fourth configuration is diffused once in the X-axis direction and once in the Y-axis direction, is optically rotated five times in the liquid crystal layer, and is emitted in the p-polarized state.

Focusing on the second polarized component PL2 in FIG. 14, the second polarized component PL2 enters the first liquid crystal cell 10 in the p-polarized state. The second polarized component PL2 (p-polarization) incident on the first liquid crystal cell 10 is not diffused by the first electrode E11, is optically rotated 90 degrees by the first liquid crystal layer LC1 to transition to the s-polarization, is diffused in the X-axis direction by the second electrode E12, and is emitted from the first liquid crystal cell 10. The second polarized component PL2 (s-polarization) incident on the second liquid crystal cell 20 is not diffused by the first electrode E21, is optically rotated 90 degrees by the second liquid crystal layer LC2 to transition to the p-polarization, is diffused in the Y-axis direction by the second electrode E22, and is emitted from the second liquid crystal cell 20. The second polarized component PL2 (p-polarization) incident on the third liquid crystal cell 30 is not diffused at the first electrode E31, is optically rotated 90 degrees by the third liquid crystal layer LC3 to transition to the s-polarization, is not diffused at the second electrode E32, and is emitted from the third liquid crystal cell 30. The second polarized component PL2 (s-polarization) incident on the fourth liquid crystal cell 40 is not diffused at the first electrode E41, is optically rotated 90 degrees by the fourth liquid crystal layer LC4 to transition to the p-polarization, is not diffused at the second electrode E42, and is emitted from the fourth liquid crystal cell 40. The second polarized component PL2 (p-polarization) incident on the fifth liquid crystal cell 50 is not diffused by the first electrode E51, is optically rotated 90 degrees by the fifth liquid crystal layer LC5 to transition to the s-polarization, is diffused in the X-axis direction by the second electrode E52, and is emitted from the fifth liquid crystal cell 50. Thus, the second polarized component PL2 (p-polarization) incident on the liquid crystal light control device 102 according to the fourth configuration is diffused twice in the X-axis direction and once in the Y-axis direction, then optically rotated five times in the liquid crystal layer and emitted in the s-polarized state.

In the fourth configuration, the first polarized component PL1 is diffused in the X-axis direction before being optically rotated in the third liquid crystal cell 30 and diffused in the Y-axis direction before being optically rotated in the fourth liquid crystal cell 40, the second polarized component PL2 is diffused in the X-axis direction after being optically rotated in the first liquid crystal cell 10, diffused in the Y-axis direction after being optically rotated in the second liquid crystal cell 20, and diffused in the X-axis direction after being optically rotated in the fifth liquid crystal cell 50.

2-3. Reference Example 2

Figure 15:
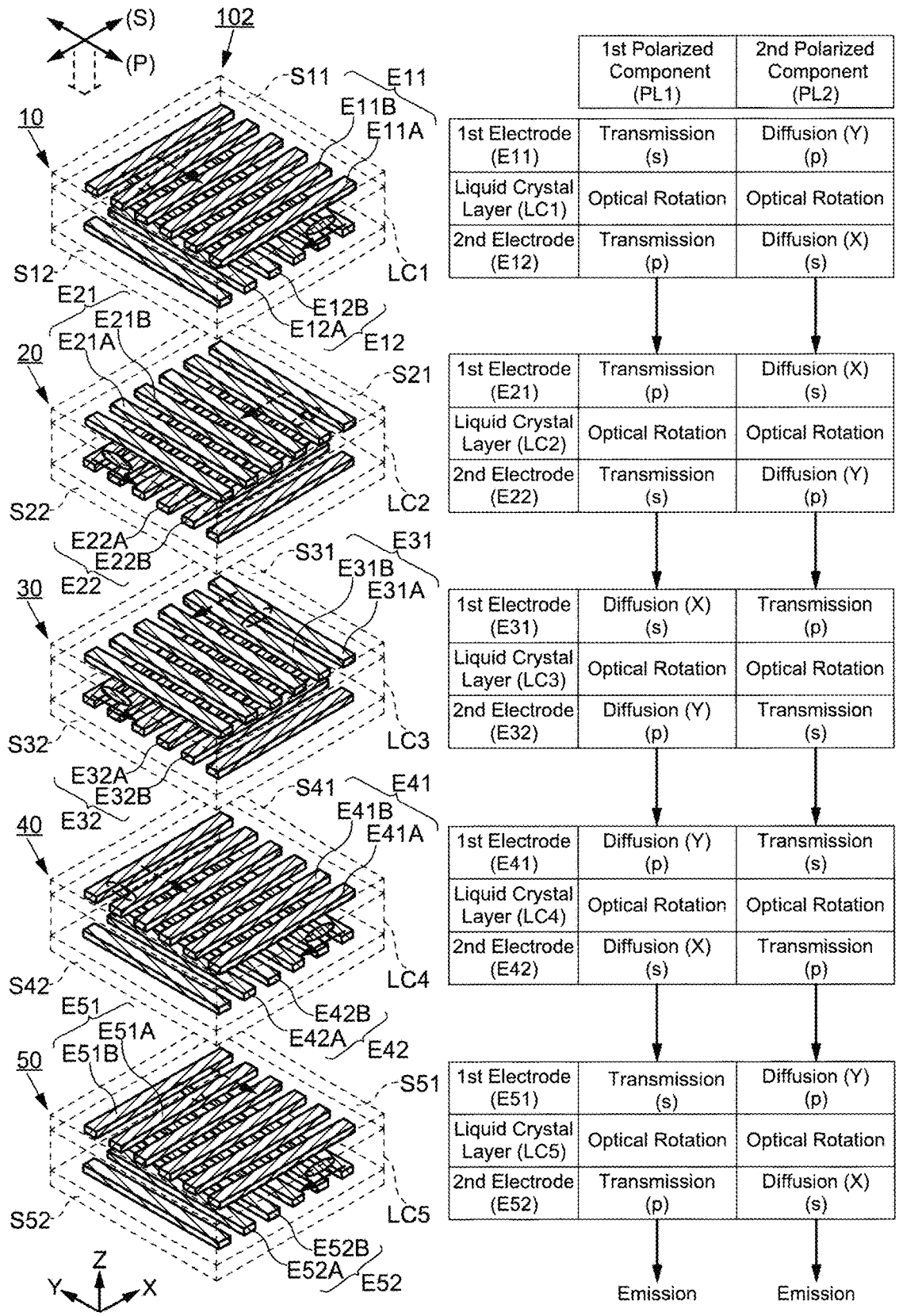
FIG. 15 is a diagram showing a configuration and a state of diffusion of a liquid crystal light control device according to a reference example.

FIG. 15 shows a liquid crystal light control device related to a reference example 2. For the reference example 2, the control signal A is applied to the first strip electrode E11A on the first substrate S11 side of the first liquid crystal cell 10, the control signal B is applied to the second strip electrode E11B, the control signal A is applied to the third strip electrode E12A on the second substrate S12 side, and the control signal B is applied to the fourth strip electrode E12B. The same is true for the second liquid crystal cell 20, the third liquid crystal cell 30, the fourth liquid crystal cell 40, and the fifth liquid crystal cell 50. That is, the transverse electric field is generated on both substrate sides in all of the first through fifth liquid crystal cells.

Focusing on the first polarized component PL1 in FIG. 15, the first polarized component PL1 enters the first liquid crystal cell 10 in the s-polarized state. The first polarized component PL1 is not diffused in the first liquid crystal cell 10, and is optically rotated 90 degrees by the first liquid crystal layer LC1 to the p-polarized state. The first polarized component PL1 is not diffused in the second liquid crystal cell 20, and is optically rotated 90 degrees by the second liquid crystal layer LC2 to again transition to the s-polarized state. The first polarized component PL1 enters the third liquid crystal cell 30 in the s-polarized state, is diffused in the X-axis direction by the first electrode E31, is optically rotated 90 degrees by the third liquid crystal layer LC3 to transition to the p-polarized state, and is diffused in the Y-axis direction by the second electrode E32. The first polarized component PL1 enters the fourth liquid crystal cell 40 in the p-polarized state, is diffused in the Y-axis direction at the first electrode E41, is optically rotated 90 degrees at the fourth liquid crystal layer LC4 to transition to the s-polarized state, and is diffused in the X-axis direction at the second electrode E42. The first polarized component PL1 is not diffused in the fifth liquid crystal cell 50, and is emitted after being optically rotated 90 degrees by the fifth liquid crystal layer LC5 and transitions to the p-polarized state.

Focusing on the second polarized component PL2 in FIG. 15, the second polarized component PL2 enters the first liquid crystal cell 10 in the p-polarized state. The second polarized component PL2 is diffused in the Y-axis direction at the first electrode E11, is optically rotated 90 degrees by the first liquid crystal layer LC1 to transition to the s-polarized state, and is diffused in the X-axis direction at the second electrode E12. The second polarized component PL2 enters the second liquid crystal cell 20 in the s-polarized state, is diffused in the X-axis direction by the first electrode E21, is optically rotated 90 degrees by the second liquid crystal layer LC2 to transition to the p-polarized state, and is diffused in the Y-axis direction by the second electrode E22. The second polarized component PL2 is not diffused in the third liquid crystal cell 30, and is optically rotated 90 degrees by the third liquid crystal layer LC3 to transition to the s-polarized state. The second polarized component PL2 is not diffused in the fourth liquid crystal cell, and is optically rotated 90 degrees by the fourth liquid crystal layer LC4 to transition to the p-polarized state. The second polarized component PL2 enters the fifth liquid crystal cell 50 in the p-polarized state, is diffused in the Y-axis direction at the first electrode E51, is optically rotated 90 degrees by the fifth liquid crystal layer LC5 to transition to the s-polarized state, is diffused in the X-axis direction at the second electrode E52, and is emitted in the s-polarized state.

Thus, the liquid crystal light control device according to the reference example 2 is such that the first polarized component PL1 is diffused in the X-axis direction and Y-axis direction in the third liquid crystal cell 30 and the fourth liquid crystal cell 40, and the second polarized component PL2 is diffused in the X-axis direction and Y-axis direction in the first liquid crystal cell 10, second liquid crystal cell 20, and fifth liquid crystal cell 50.

2-4. Angular Characteristics

Figure 16:
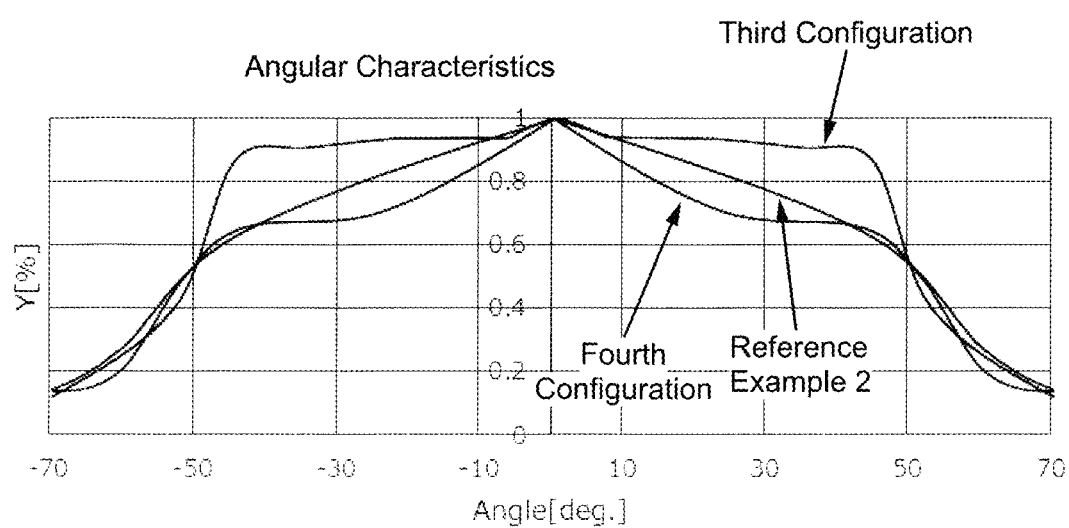
FIG. 16 is a graph of luminance-angle characteristics of a liquid crystal light control device according to a second embodiment of the present invention.

FIG. 16 shows a graph of the luminance-angle characteristics of the liquid crystal light control device 102 according to the third configuration and the fourth configuration. FIG. 16 shows characteristics of the reference example 2 in the graph. The graph in FIG. 16 shows, as in FIG. 12A, the horizontal axis indicates the polar angle, and the vertical axis indicates the luminance when the luminance of the center (polar angle 0 degrees) is normalized as 100%.

It can be seen in the graph shown in FIG. 16 that the characteristic of the third configuration of the liquid crystal light control device 102 is that the luminance in the range from the polar angle of +10 degrees to +45 degrees and from −10 degrees to −45 degrees decreases by about 5% from the center luminance, but a constant luminance distribution is obtained in the same range. In the third configuration, it is shown that a substantially flat intensity distribution can be obtained in a certain range of polar angles by adopting a configuration in which each polarization component is diffused before being optically rotated by the liquid crystal layer and is prevented from diffusing after being optically rotated. Furthermore, compared with the configuration of the first configuration, it can be seen that the range of polar angles in which the luminance distribution is constant is extended.

It can be seen that the fourth configuration of the liquid crystal light control device 102 is characterized by a constant luminance distribution in the same range, although the luminance in the range of +20 degrees to +45 degrees and −20 degrees to −45 degrees decreases by about 45% from the center luminance. The first polarized component PL1 diffuses before rotating in the liquid crystal layer, and the second polarized component PL2 diffuses before rotating in the liquid crystal layer, in the fourth configuration. The characteristic of the fourth configuration has a profile close to the characteristic of the fourth configuration, although the luminance decreases in the range of polar angle +20 degrees to +45 degrees and −20 degrees to −45 degrees.

Comparing the third and fourth configurations, the third configuration diffuses both the first polarized component and the second polarized component once in the X-axis direction in the process of passing through the liquid crystal light control device 102, on the other hand, the fourth configuration diffuses the first polarized component once in the X-axis direction and the second polarized component twice in the X-axis direction, and it is shown that the twice pre-diffusion has a wider polar angle range to maintain constant luminance while suppressing the luminance decrease than the once pre-diffusion and twice post-diffusion.

Comparing the third configuration and the first configuration, the luminance is relatively higher and the range of polar angles where the luminance is constant is wider. The same characteristic is observed when the fourth configuration is compared with the second configuration. This change in characteristics can be attributed in part to the reason that the second polarized component PL2 is diffused one more time than in the first configuration.

The characteristics of the liquid crystal light control device shown as the reference example 2 indicate that the intensity distribution of luminance has the highest intensity at a polar angle of 0 degrees and decreases linearly as the polar angle increases in the positive and negative directions (that is, in the left and right directions). As in the reference example 1, the liquid crystal light control device related to the reference example 2 is found to have a luminance distribution that decreases linearly in the direction of the polar angle by diffusing each polarized component in front of and behind the liquid crystal layer.

More specifically, the first polarized component in the reference example 2 is pre-diffused once in the X-axis direction, and is post-diffused in the Y-axis direction in the same liquid crystal cell (the third liquid crystal cell) immediately after the pre-diffusion. The second polarized component is pre-diffused once in the X-axis direction, and is post-diffused in the Y-axis direction in the same liquid crystal cell (second liquid crystal cell) immediately before the post-diffusion. Furthermore, the first polarized component in the reference example 2 is pre-diffused once in the Y-axis direction, and is post-diffused in the same liquid crystal cell (the fourth liquid crystal cell) in the X-axis direction immediately after the pre-diffusion. The second polarization component is pre-diffused once in the Y-axis direction in the first liquid crystal cell and the fifth liquid crystal cell, and is post-diffused once in the X-axis direction in the same liquid crystal cell immediately after the said pre-diffusion. That is, in Reference Example 2, the first polarization component is pre-diffused once in the X-axis direction and post-diffused once in the Y-axis direction, both involving diffusion in the same liquid crystal cell. In Reference Example 2, the second polarization component is pre-diffused once and post-diffused twice in the X-axis direction, both accompanied by diffusion in the Y-axis direction within the same LCD cell. According to FIG. 16, when diffusion is performed before and after optical rotation in the same liquid crystal cell as described above, even if the number of pre-diffusions is the same, the luminance decreases monotonically as the polar angle increases compared with the case where diffusion is performed only by pre-diffusion (third configuration).

According to FIG. 16, the third configuration can improve the luminance within the half value width and keep it constant compared to the reference example 2, while the half value width is the same as that of the reference example 2, the fourth configuration, while keeping the half value width the same as in the reference example 2, can reduce the luminance within the half value width and keep it constant compared to the reference example 2.

According to this embodiment, it is possible to obtain a substantially flat intensity distribution over a certain range of polar angles by adopting a configuration in which, in a liquid crystal cell stacked in five stacks, each polarized component is diffused before being optically rotated in a liquid crystal layer and not diffused after the rotation. It is also possible to obtain a substantially flat intensity distribution over a certain range of polar angles by adopting a configuration in which each polarized component is diffused before or after being optically rotated in the liquid crystal layer and not diffused before or after rotation in one liquid crystal cell in a five-stacked liquid crystal cell.

Third Embodiment 3-1. Fifth Configuration

Figure 17:
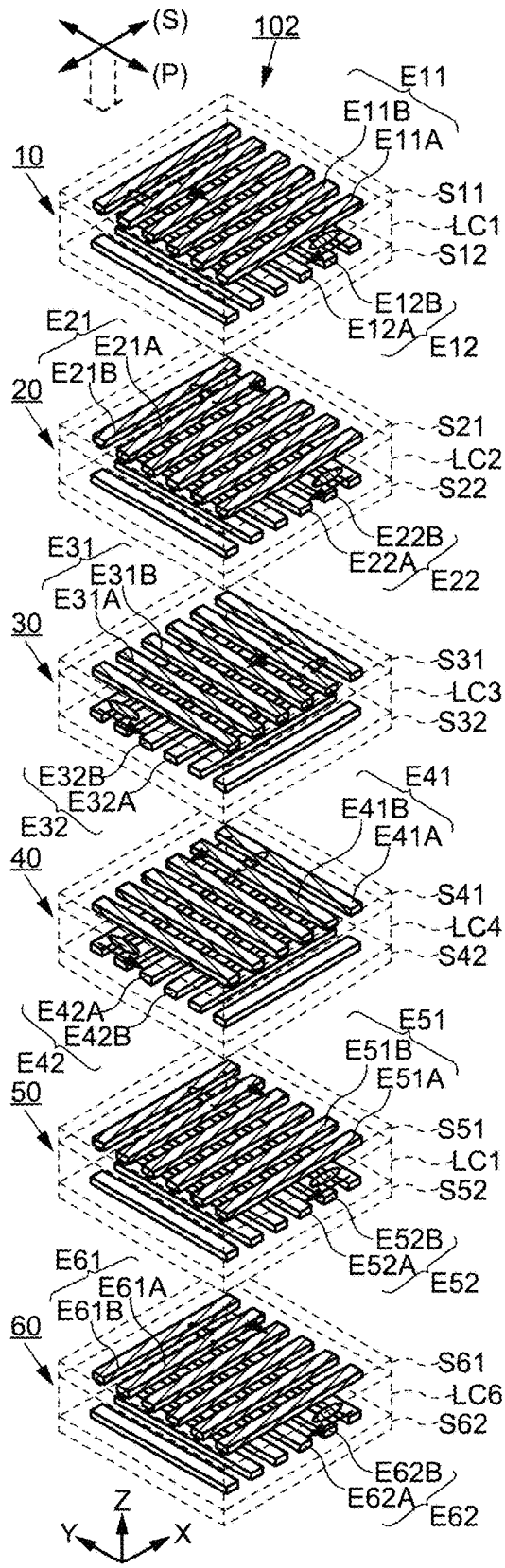
FIG. 17 is a diagram showing a configuration (fifth configuration) and a state of diffusion of a liquid crystal light control device according to a third embodiment of the present invention.
Figure 17:
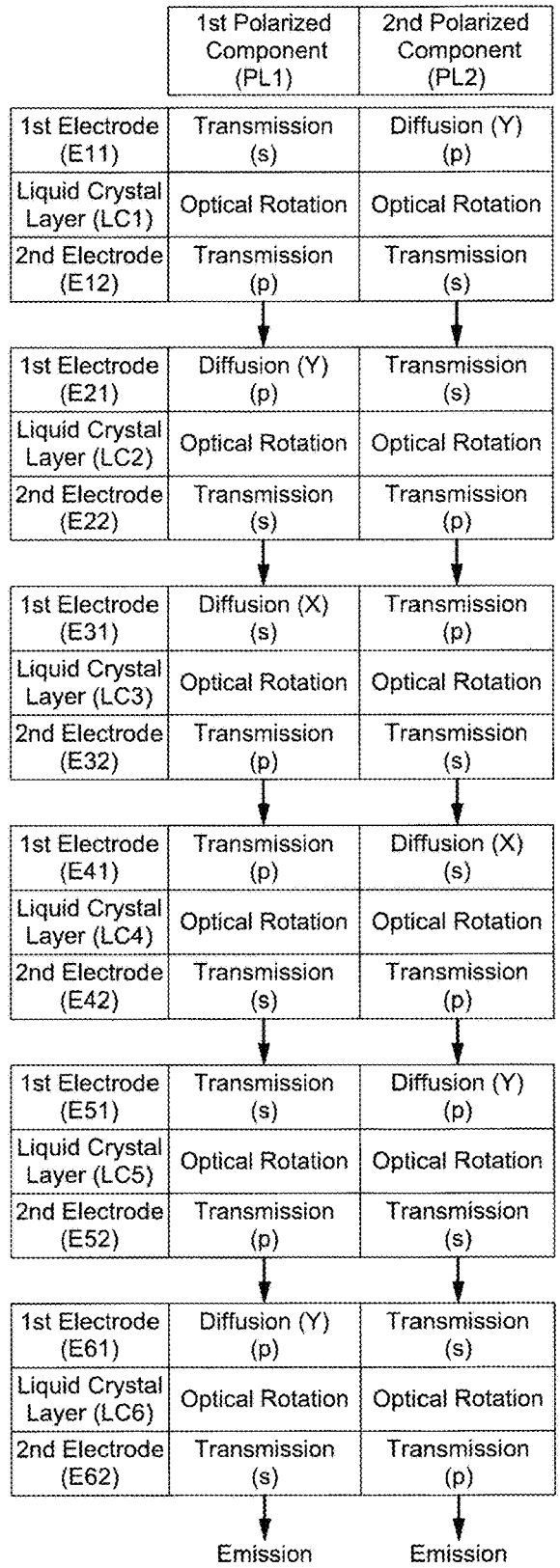

FIG. 17 shows an arrangement of electrodes in each liquid crystal cell of a liquid crystal light control device 102 according to the fifth configuration and states of light incident on the liquid crystal light control device 102 as the light passes through each liquid crystal cell. The liquid crystal light control device 102 according to the fifth configuration includes first through sixth liquid crystal cells. The configuration of each liquid crystal cell is as described in the first configuration, with the first electrode on the first substrate side including a strip electrode and the second electrode on the second substrate side including a strip electrode.

As shown in FIG. 17, the liquid crystal light control device 102 according to the fifth configuration is arranged so that a first liquid crystal cell 10, a second liquid crystal cell 20, a third liquid crystal cell 30, a fourth liquid crystal cell 40, a fifth liquid crystal cell 50, and a sixth liquid crystal cell 60 overlap from the light incident side to the light emission side.

In the first liquid crystal cell 10 and the second liquid crystal cell 20, a direction of extension of first strip electrodes E11A, E21A and second strip electrodes E11B, E21B on first substrates S11, S21 is arranged so as to extend in the X-axis direction, and a direction of extension of third strip electrodes E12A, E22A and fourth strip electrodes E12B, E22B on second substrates S12, S22 is arranged so as to extend in the Y-axis direction. In the third liquid crystal cell 30 and the fourth liquid crystal cell 40, a direction of extension of first strip electrodes E31A, E41A and second strip electrodes E31B, E41B on first substrates S31, S41 is arranged so as to extend in the Y-axis direction, and a direction of extension of third strip electrodes E32A, E42A and fourth strip electrodes E32B, E42B on second substrates S32, S42 is arranged so as to extend in the X-axis direction. In the fifth liquid crystal cell 50 and the sixth liquid crystal cell 60, a direction of extension of first strip electrodes E51A, E61A and second strip electrodes E51B, E61B on first substrates S51, S61 is arranged so as to extend in the X-axis direction, and a direction of extension of third strip electrodes E52A, E52A and fourth strip electrodes E52B, E52B on second substrates S52, S62 is arranged so as to extend in the X-axis direction. The alignment direction of alignment films of each liquid crystal cell is arranged in the direction that intersects the direction in which the strip electrodes extend, which is also the same as in the first embodiment.

Thus, the liquid crystal light control device 102 according to the fifth configuration has the same arrangement of zonal electrodes for the first liquid crystal cell 10 and the second liquid crystal cell 20, and for the fifth liquid crystal cell 50 and the sixth liquid crystal cell 60. The third liquid crystal cell 30 and fourth liquid crystal cell 40 are arranged with the arrangement of the strip electrodes rotated 90 degrees with respect to these liquid crystal cells. This embodiment may also be said to be a configuration in which two more liquid crystal cells are added and stacked on the incident side to the configuration of the variant of the first embodiment shown in FIG. 9 and FIG. 10. The added liquid crystal cells may also be said to be the same liquid crystal cells as the third and fourth liquid crystal cells in the variant of the first embodiment concerned, and are arranged in the same orientation as these liquid crystal cells.

FIG. 17 shows the electrodes to which the control signal is applied and forming the transverse electric field are shown by hatching, the same as the first embodiment. Tables are inserted in FIG. 17 to show the state of each polarization component when light containing a first polarization component PL1 and a second polarization component PL2 passes through the first electrode, the liquid crystal layer, and the second electrode of each liquid crystal cell, using the terms transmission, optical rotation, and diffusion.

Table 5 shows the control signals applied to each liquid crystal cell of the liquid crystal light control device 102 according to the fifth configuration shown in FIG. 17.

liquid crystal cell, and the control signal E is applied to the second electrode, and the transverse electric field is generated only on the first substrate side.

Next, the state of diffusion, rotation, and transmission of light incident on the liquid crystal light control device 102 according to the fifth configuration will be described. It is assumed that in the fifth configuration, the initial state of the first polarization component PL1 (the state immediately before it enters the liquid crystal light control device 102) is s-polarization, and the initial state of the second polarization component PL2 is p-polarization.

Focusing on the first polarization component PL1 in FIG. 17, the first polarization component PL1 enters the first liquid crystal cell 10 in the s-polarized state. The first polarization component PL1 (s-polarization) incident on the first liquid crystal cell 10 is not diffused by the first electrode E11, is optically rotated 90 degrees by the first liquid crystal layer LC1 to transform into the p-polarization, is not diffused by the second electrode E12, and is emitted from the first liquid crystal cell 10. The first polarization component PL1 (p-polarization) incident on the second liquid crystal cell 20 is diffused in the Y-axis direction at the first electrode E21, optically rotated degrees by the second liquid crystal layer LC2 to the s-polarization, is not diffused at the second electrode E22, and is emitted from the second liquid crystal cell 20. The first polarization component PL1 (s-polarization) incident on the third liquid crystal cell 30 is diffused in the X-axis direction at the first electrode E31, optically rotated 90 degrees at the third liquid crystal layer LC3 to the p-polarization, is not diffused at the second electrode E32, and is emitted from the third liquid crystal cell 30. The first

TABLE 5

| Liquid crystal light control element: 102 | | | | Control signal |
|---|---|---|---|---|
| First liquid crystal cell 10 | 1st substrate S11 | 1st electrode E11 | 1st strip electrode: E11A | A |
| | | | 2nd strip electrode: E11B | B |
| | 2nd substrate S12 | 2nd electrode E12 | 3rd strip electrode: E12A | E |
| | | | 4th strip electrode: E12B | E |
| Second liquid crystal cell 20 | 1st substrate S21 | 1st electrode E21 | 1st strip electrode: E21A | A |
| | | | 2nd strip electrode: E21B | B |
| | 2nd substrate S22 | 2nd electrode E22 | 3rd strip electrode: E22A | E |
| | | | 4th strip electrode: E22B | E |
| Third liquid crystal cell 30 | 1st substrate S31 | 1st electrode E31 | 1st strip electrode: E31A | A |
| | | | 2nd strip electrode: E31B | B |
| | 2nd substrate S32 | 2nd electrode E32 | 3rd strip electrode: E32A | E |
| | | | 4th strip electrode: E32B | E |
| Fourth liquid crystal cell 40 | 1st substrate S41 | 1st electrode E41 | 1st strip electrode: E41A | A |
| | | | 2nd strip electrode: E41B | B |
| | 2nd substrate S42 | 2nd electrode E42 | 3rd strip electrode: E42A | E |
| | | | 4th strip electrode: E42B | E |
| Fifth liquid crystal cell 50 | 1st substrate S51 | 1st electrode E51 | 1st strip electrode: E51A | A |
| | | | 2nd strip electrode: E51B | B |
| | 2nd substrate S52 | 2nd electrode E52 | 3rd strip electrode: E52A | E |
| | | | 4th strip electrode: E52B | E |
| Sixth liquid crystal cell 60 | 1st substrate S61 | 1st electrode E61 | 1st strip electrode: E61A | A |
| | | | 2nd strip electrode: E61B | B |
| | 2nd substrate S62 | 2nd electrode E62 | 3rd strip electrode: E62A | E |
| | | | 4th strip electrode: E62B | E |

As shown in Table 5, in each liquid crystal cell of the liquid crystal light control device 102 according to the fifth configuration, square wave control signals A, B are applied to the first electrodes (the first strip electrode and the second strip electrode) on the first substrate side (light incident side) and the constant voltage control signal E is applied to the second electrodes (the third strip electrode and the fourth strip electrode) on the second substrate side (light emission side). That is, in the liquid crystal light control device 102 according to the fifth configuration shown in FIG. 17, the control signals A, B are applied to the first electrode of each polarization component PL1 (p-polarization) incident on the fourth liquid crystal cell 40 is not diffused at the first electrode E41, is optically rotated 90 degrees by the fourth liquid crystal layer LC4 to the s-polarization, is not diffused at the second electrode E42, and is emitted from the fourth liquid crystal cell 40. The first polarization component PL1 (s-polarization) incident on the fifth liquid crystal cell 50 is not diffused at the first electrode E51, is optically rotated 90 degrees by the fifth liquid crystal layer LC5 to the p-polarization, is not diffused at the second electrode E52, and is emitted from the fifth liquid crystal cell 50. The first polarization component PL1 (p-polarization) incident on the sixth liquid crystal cell 60 is diffused in the Y-axis direction at the first electrode E61, optically rotated 90 degrees by the sixth liquid crystal layer LC6 to the s-polarization, is not diffused at the second electrode E62, and is emitted from the sixth liquid crystal cell 60. Thus, the first polarization component PL1 (s-polarization) incident on the liquid crystal light control device 102 according to the fifth configuration is diffused once in the X-axis direction and twice in the Y-axis direction, then optically rotated six times in the liquid crystal layer and emitted in the s-polarized state.

Focusing on the second polarization component PL2 in FIG. 17, the second polarization component PL2 enters the first liquid crystal cell 10 in the p-polarized state. The second polarization component PL2 (p-polarization) incident on the first liquid crystal cell 10 is diffused in the Y-axis direction at the first electrode E11, optically rotated 90 degrees by the first liquid crystal layer LC1 to the s-polarization, is not diffused at the second electrode E12, and is emitted from the first liquid crystal cell 10. The second polarization component PL2 (s-polarization) incident on the second liquid crystal cell 20 is not diffused at the first electrode E21, is optically rotated 90 degrees by the second liquid crystal layer LC2 to the p-polarization, is not diffused at the second electrode E22, and is emitted from the second liquid crystal cell 20. The second polarization component PL2 (p-polarization) incident on the third liquid crystal cell 30 is not diffused by the first electrode E31, is optically rotated 90 degrees by the third liquid crystal layer LC3 to the s-polarization, is not diffused by the second electrode E32, and is emitted from the third liquid crystal cell 30. The second polarization component PL2 (s-polarization) incident on the fourth liquid crystal cell 40 is diffused in the X-axis direction at the first electrode E41, is optically rotated 90 degrees by the fourth liquid crystal layer LC4 to the p-polarization, is not diffused at the second electrode E42, and is emitted from the fourth liquid crystal cell 40. The second polarization component PL2 (p-polarization) incident on the fifth liquid crystal cell 50 is diffused in the Y-axis direction at the first electrode E51, is optically rotated 90 degrees by the fifth liquid crystal layer LC5 to the s-polarization, is not diffused at the second electrode E52, and is emitted from the fifth liquid crystal cell 50. The second polarization component PL2 (s-polarization) incident on the sixth liquid crystal cell 60 is not diffused at the first electrode E61, is optically rotated 90 degrees by the sixth liquid crystal layer LC6 to the p-polarization, is not diffused at the second electrode E62, and is emitted from the sixth liquid crystal cell 60. Thus, the second polarization component PL2 (p-polarization) incident on the liquid crystal light control device 102 according to the fifth configuration is diffused once in the X-axis direction and twice in the Y-axis direction, then optically rotated six times by the liquid crystal layer and emitted in the s-polarized state.

In the fifth configuration, the first polarization component PL1 is diffused in the Y-axis direction before being optically rotated in the second liquid crystal cell 20 and the sixth liquid crystal cell 60, respectively, and diffused in the X-axis direction before being optically rotated in the third liquid crystal cell 30, and the second polarization component PL2 is diffused in the Y-axis direction before being optically rotated in the first liquid crystal cell 10 and the fifth liquid crystal cell 50, respectively, and diffused in the X-axis direction before being optically rotated in the third liquid crystal cell 30. In the fifth configuration, the second electrodes E12, E22, E32, E42, E52, E62 may be planar (also referred to as a flat plate or a solid shape) electrodes as shown in FIG. 6 or without the second electrode as shown in FIG. 8.

3-2. Sixth Configuration

The sixth configuration is that the liquid crystal light control device diffuses polarization components on the first electrode E11, E41, E51 side (light incident side) of the first liquid crystal cell 10, the fourth liquid crystal cell 40, and the fifth liquid crystal cell 50, and does not diffuse them on the second electrode E12, E42, E52 side (light emission side), the second liquid crystal cell 20, the third liquid crystal cell 30, and the sixth liquid crystal cell 60 are not diffused on the first electrode E21, E31, E61 side (light incident side) and diffused on the second electrode E22, E32, E62 side (light emission side).

Figure 18:
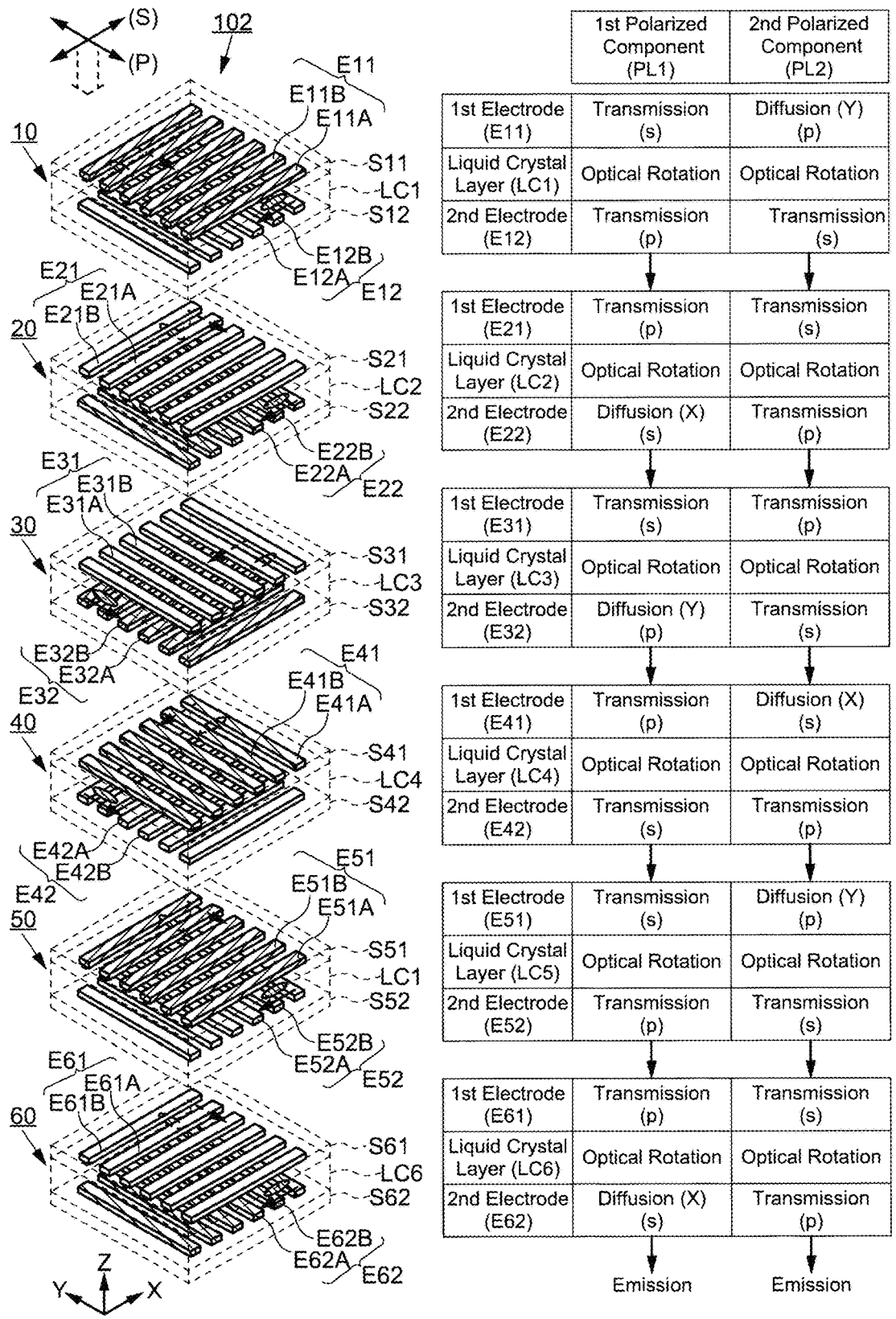
FIG. 18 is a diagram showing a configuration (sixth configuration) and a state of diffusion of a liquid crystal light control device according to a third embodiment of the present invention.

FIG. 18 shows the electrode arrangement in each liquid crystal cell of the liquid crystal light control device 102 according to the sixth configuration and the state of the light incident on the liquid crystal light control device 102 as it passes through each liquid crystal cell. The arrangement of the strip electrodes in each liquid crystal cell is the same as in the fifth configuration.

Table 6 shows the control signals applied to each liquid crystal cell of the liquid crystal light control device 102 according to the sixth configuration shown in FIG. 18.

TABLE 6

| | Liquid crystal light control element: 102 | | | Control signal |
|---|---|---|---|---|
| First liquid crystal cell 10 | 1st substrate S11 | 1st electrode E11 | 1st strip electrode: E11A | A |
| | | | 2nd strip electrode: E11B | B |
| | 2nd substrate S12 | 2nd electrode E12 | 3rd strip electrode: E12A | E |
| | | | 4th strip electrode: E12B | E |
| Second liquid crystal cell 20 | 1st substrate S21 | 1st electrode E21 | 1st strip electrode: E21A | E |
| | | | 2nd strip electrode: E21B | E |
| | 2nd substrate S22 | 2nd electrode E22 | 3rd strip electrode: E22A | A |
| | | | 4th strip electrode: E22B | B |
| Third liquid crystal cell 30 | 1st substrate S31 | 1st electrode E31 | 1st strip electrode: E31A | E |
| | | | 2nd strip electrode: E31B | E |
| | 2nd substrate S32 | 2nd electrode E32 | 3rd strip electrode: E32A | A |
| | | | 4th strip electrode: E32B | B |
| Fourth liquid crystal cell 40 | 1st substrate S41 | 1st electrode E41 | 1st strip electrode: E41A | A |
| | | | 2nd strip electrode: E41B | B |
| | 2nd substrate S42 | 2nd electrode E42 | 3rd strip electrode: E42A | E |
| | | | 4th strip electrode: E42B | E |
| Fifth liquid crystal cell | 1st substrate S51 | 1st electrode E51 | 1st strip electrode: E51A | A |
| | | | 2nd strip electrode: E51B | B |

TABLE 6-continued

| | Liquid crystal light control element: 102 | | | Control signal |
|---|---|---|---|---|
| 50 | 2nd substrate S52 | 2nd electrode E52 | 3rd strip electrode: E52A | E |
| | | | 4th strip electrode: E52B | E |
| Sixth liquid crystal cell 60 | 1st substrate S61 | 1st electrode E61 | 1st strip electrode: E61A | E |
| | | | 2nd strip electrode: E61B | E |
| | 2nd substrate S62 | 2nd electrode E62 | 3rd strip electrode: E62A | A |
| | | | 4th strip electrode: E62B | B |

As shown in Table 6, the liquid crystal light control device 102 according to the sixth configuration is such that in the first liquid crystal cell 10, the fourth liquid crystal cell 40, and the fifth liquid crystal cell 50, the control signals A, B are applied to the first electrodes E11, E41, E51 (the first strip electrodes E11A, E41A, E51A, and the second strip electrodes E11B, E41B, E51B) on the light incident side, and the control signals E are applied to the second electrodes E12, E42, E52 (the third strip electrodes E12A, E42A, E52A, and the fourth strip electrodes E121B, E421B, E521B) on the light emission side after optical rotation. In the second liquid crystal cell 20, the third liquid crystal cell 30, and the sixth liquid crystal cell 60, the control signal E is applied to the first electrodes E21, E31, E61 (the first strip electrodes E21A, E31A, E61A, and the second strip electrodes E21B, E31B, E61B) on the light incident side, and the control signals A, B are applied to the second electrodes E22, E32, E42 (the third strip electrodes E22A, E32A, E42A, and the fourth strip electrodes E22B, E32B, E42B). That is, the liquid crystal light control device 102 according to the sixth configuration shown in FIG. 18 generates the transverse electric field on the side of the first substrates S11, S41, S51 of the first liquid crystal cell 10, the fourth liquid crystal cell 40, and the fifth liquid crystal cell 50, and does not generate the transverse electric field on the side of the second substrates S12, S42, S52, and does not generate the transverse electric field on the side of the first substrates S21, S31, S61 of the second liquid crystal cell 20, the third liquid crystal cell 30, and the sixth liquid crystal cell 60, and generates the transverse electric field on the side of the second substrates S22, S32, S62.

Next, the state of diffusion, rotation, and transmission of light incident on the liquid crystal light control device 102 according to the sixth configuration will be described. It is assumed that in the sixth configuration, the initial state of the first polarized component PL1 (the state immediately before it enters the liquid crystal light control device 102) is s-polarization, and the initial state of the second polarized component PL2 is p-polarization.

Focusing on the first polarized component PL1 in FIG. 18, the first polarized component PL1 enters the first liquid crystal cell 10 in the s-polarized state. The first polarization component PL1 (s-polarization) incident on the first liquid crystal cell 10 is not diffused by the first electrode E11, is optically rotated 90 degrees by the first liquid crystal layer LC1 to the p-polarization, is not diffused by the second electrode E12, and is emitted from the first liquid crystal cell 10. The first polarization component PL1 (p-polarization) incident on the second liquid crystal cell 20 is not diffused by the first electrode E21, is optically rotated 90 degrees by the second liquid crystal layer LC2 to the s-polarization, is diffused in the X-axis direction by the second electrode E22, and is emitted from the second liquid crystal cell 20. The first polarization component PL1 (s-polarization) incident on the third liquid crystal cell 30 is not diffused by the first electrode E31, is optically rotated 90 degrees by the third liquid crystal layer LC3 to the p-polarization, is diffused in the Y-axis direction by the second electrode E32, and is emitted from the third liquid crystal cell 30. The first polarization component PL1 (p-polarization) incident on the fourth liquid crystal cell is not diffused by the first electrode E41, is optically rotated 90 degrees by the fourth liquid crystal layer LC4 to the s-polarization, is not diffused by the second electrode E42, and is emitted from the fourth liquid crystal cell 40. The first polarization component PL1 (s-polarization) incident on the fifth liquid crystal cell 50 is not diffused by the first electrode E51, is optically rotated 90 degrees by the fifth liquid crystal layer LC5 to the p-polarization, is not diffused by the second electrode E52, and is emitted from the fifth liquid crystal cell 50. The first polarization component PL1 (p-polarization) incident on the sixth liquid crystal cell 60 is not diffused by the first electrode E61, is optically rotated 90 degrees by the sixth liquid crystal layer LC6 to the s-polarization, is diffused in the X-axis direction by the second electrode E62, and is emitted from the sixth liquid crystal cell 60. Thus, the first polarized component PL1 (s-polarization) incident on the liquid crystal light control device 102 according to the sixth configuration is diffused twice in the X-axis direction and once in the Y-axis direction after rotation, and is then optically rotated six times in the liquid crystal layer and emitted in the s-polarized state.

Focusing on the second polarized component PL2 in FIG. 18, the second polarized component PL2 enters the first liquid crystal cell 10 in a p-polarized state. The second polarization component PL2 (p-polarization) incident on the first liquid crystal cell 10 is diffused in the Y-axis direction by the first electrode E11, is optically rotated 90 degrees by the first liquid crystal layer LC1 to the s-polarization, is not diffused by the second electrode E12, and is emitted from the first liquid crystal cell 10. The second polarization component PL2 (s-polarization) incident on the second liquid crystal cell 20 is not diffused by the first electrode E21, is optically rotated 90 degrees by the second liquid crystal layer LC2 to the p-polarization, is not diffused by the second electrode E22, and is emitted from the second liquid crystal cell 20. The second polarization component PL2 (p-polarization) incident on the third liquid crystal cell 30 is not diffused by the first electrode E31, is optically rotated at 90 degrees by the third liquid crystal layer LC3 to the s-polarization, is not diffused by the second electrode E32, and is emitted from the third liquid crystal cell 30. The second polarization component PL2 (s-polarization) incident on the fourth liquid crystal cell 40 is diffused in the X-axis direction by the first electrode E41, is optically rotated 90 degrees by the fourth liquid crystal layer LC4 to the p-polarization, is not diffused by the second electrode E42, and is emitted from the fourth liquid crystal cell 40. The second polarization component PL2 (p-polarization) incident on the fifth liquid crystal cell 50 is diffused in the Y-axis direction by the first electrode E51, is optically rotated 90 degrees by the fifth liquid crystal layer LC5 to the s-polarization, is not diffused by the second electrode E52, and is emitted from the fifth liquid crystal cell 50. The second polarization component PL2 (p-polarization) incident on the sixth liquid crystal cell 60 is not diffused by the first electrode E61, is optically rotated degrees by the second liquid crystal layer LC2 to the p-polarization, is not diffused by the second electrode E62, and is emitted from the sixth liquid crystal cell 60. Thus, the second polarized component PL2 (p-polarization) incident on the liquid crystal light control device 102 according to the sixth configuration is diffused once in the X-axis direction and twice in the Y-axis direction before being optically rotated, and is then optically rotated five times in the liquid crystal layer and emitted in the p-polarized state.

In the sixth configuration, the first polarized component PL1 is diffused in the X-axis direction after being optically rotated in the second liquid crystal cell 20 and the fifth liquid crystal cell 50 and diffused in the Y-axis direction after being optically rotated in the third liquid crystal cell 30, and the second polarized component PL2 is diffused in the Y-axis direction before being optically rotated in the first liquid crystal cell 10 and the fifth liquid crystal cell 50, and diffused in the X-axis direction before being optically rotated in the third liquid crystal cell 30.

3-3. Reference Example 3

Figure 19:
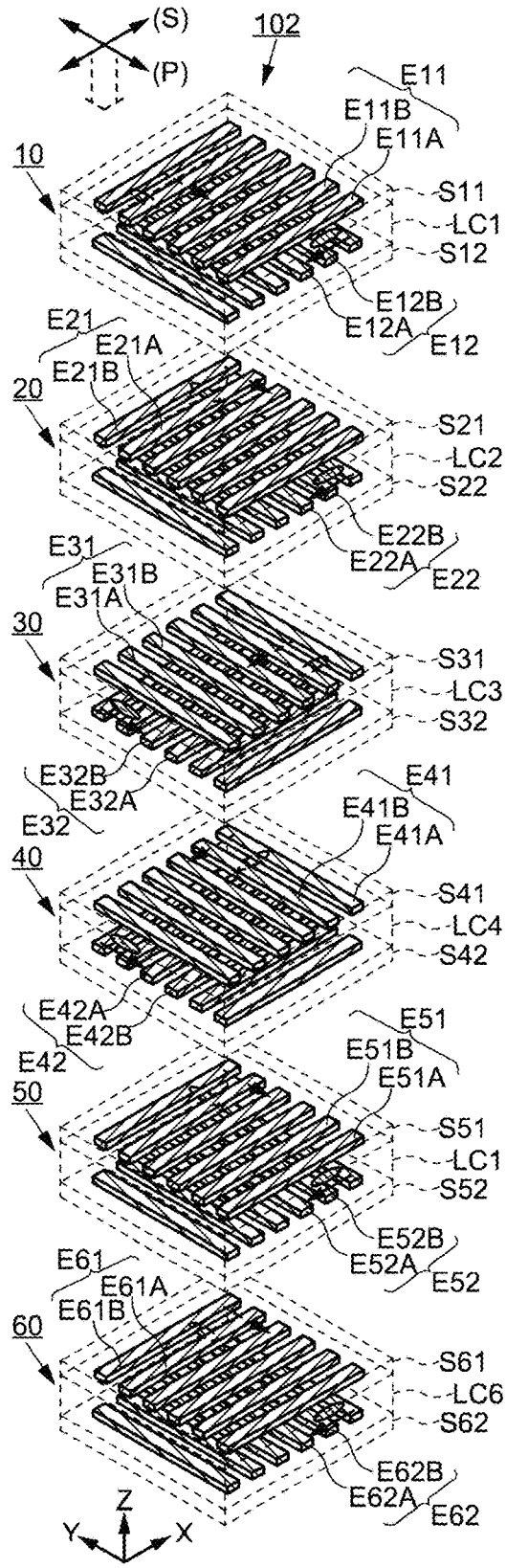
FIG. 19 is a diagram showing a configuration and a state of diffusion of a liquid crystal light control device according to a reference example.
Figure 19:
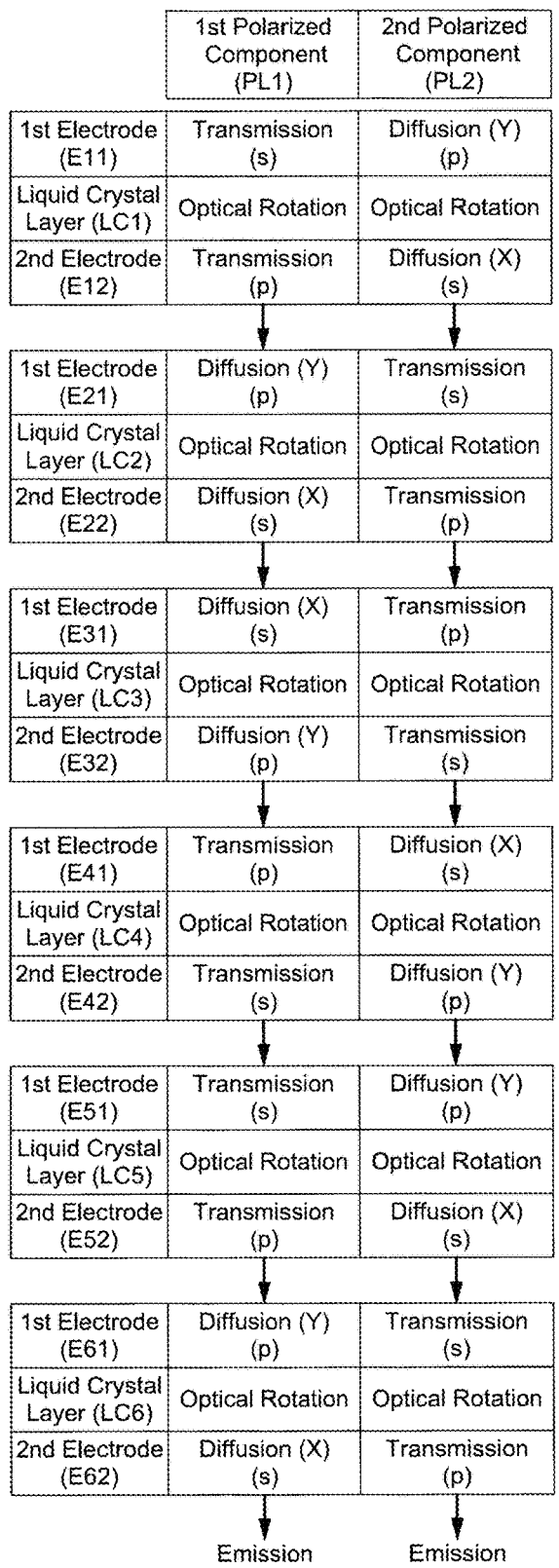

FIG. 19 shows a liquid crystal light control device related to a reference example 3. In the reference example 3, the control signal A is applied to the first strip electrode E11A on the first substrate S11 side of the first liquid crystal cell 10, the control signal B is applied to the second strip electrode E11B, the control signal A is applied to the third strip electrode E12A on the second substrate S12 side, and the control signal B is applied to the fourth strip electrode E12B. The same is true for the second liquid crystal cell 20, the third liquid crystal cell 30, the fourth liquid crystal cell 40, the fifth liquid crystal cell 50, and the sixth liquid crystal cell 60.

Focusing on the first polarized component PL1 in FIG. 19, the first polarized component PL1 enters the first liquid crystal cell 10 in the s-polarized state. The first polarization component PL1 is not diffused in the first liquid crystal cell 10, and is optically rotated 90 degrees by the first liquid crystal layer LC1 to the p-polarized state. The first polarization component PL1 is incident on the second liquid crystal cell 20 in the p-polarized state, diffused in the Y-axis direction by the first electrode E21, optically rotated 90 degrees by the second liquid crystal layer LC2, and diffused in the X-axis direction by the second electrode E22. The first polarization component PL1 is incident on the third liquid crystal cell 30 in the s-polarized state, diffused in the X-axis direction by the first electrode E31, optically rotated 90 degrees by the third liquid crystal layer LC3 to the p-polarized state, and diffused in the Y-axis direction by the second electrode E32. The first polarized component PL1 is incident on the fourth liquid crystal cell 40 in the p-polarized state, is not diffused, is optically rotated 90 degrees by the fourth liquid crystal layer LC4 to the s-polarized state, and is emitted. The first polarized component PL1 is incident on the fifth liquid crystal cell 50 in the s-polarized state, is not diffused, is optically rotated 90 degrees by the fifth liquid crystal layer LC5 to the p-polarized state, and is emitted. The first polarization component PL1 is incident on the sixth liquid crystal cell 60 in the p-polarized state, diffused in the Y-axis direction by the first electrode E61, optically rotated 90 degrees by the sixth liquid crystal layer LC6 to the s-polarized state, and diffused in the X-axis direction by the second electrode E62.

Focusing on the second polarized component PL2 in FIG. 19, the second polarized component PL2 enters the first liquid crystal cell 10 in the p-polarized state. The second polarization component PL2 is diffused in the Y-axis direction by the first electrode E11, optically rotated 90 degrees by the first liquid crystal layer LC1 to the s-polarized state, and diffused in the X-axis direction by the second electrode E12. The second polarized component PL2 is incident on the second liquid crystal cell 20 in the s-polarized state, is not diffused, is optically rotated 90 degrees by the second liquid crystal layer LC2, and is emitted in the p-polarized state. The second polarized component PL2 is incident on the third liquid crystal cell 30 in the p-polarized state, is not diffused, is optically rotated 90 degrees by the third liquid crystal layer LC3, and is emitted in the s-polarized state. The second polarized component PL2 is incident on the fourth liquid crystal cell 40 in the s-polarized state, diffused in the x-axis direction by the first electrode E41, optically rotated 90 degrees by the fourth liquid crystal layer LC4 to the p-polarized state, and diffused in the y-axis direction by the second electrode E42. The second polarization component PL2 is incident on the fifth liquid crystal cell 50 in the p-polarized state, diffused in the Y-axis direction by the first electrode E51, optically rotated 90 degrees by the fifth liquid crystal layer LC5, and diffused in the X-axis direction by the second electrode E52. The second polarized component PL2 is incident on the sixth liquid crystal cell 60 in the s-polarized state, is not diffused, is optically rotated 90 degrees by the sixth liquid crystal layer LC6, and is emitted in the p-polarized state.

Thus, in the liquid crystal light control device related to the reference example 3, the first polarized component PL1 is diffused in the X-axis direction and the Y-axis direction in the second liquid crystal cell 20, the third liquid crystal cell 30, and the sixth liquid crystal cell 60, respectively, and the second polarized component PL2 is diffused in the X-axis direction in the first liquid crystal cell 10, the fourth liquid crystal cell 40, and the fifth liquid crystal cell 50 and Y-axis directions, respectively.

3-4. Angular Characteristics

Figure 20:
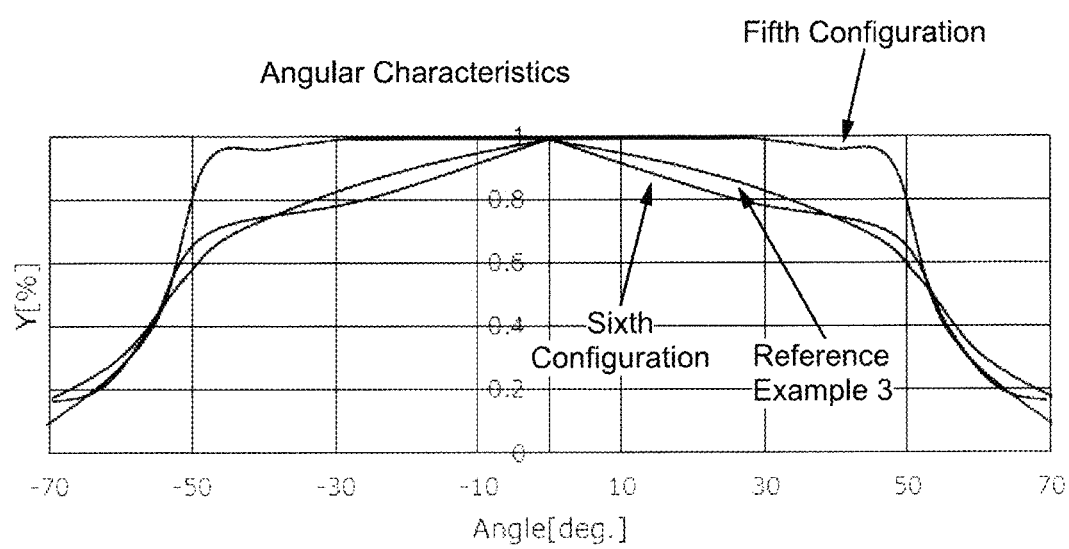
FIG. 20 is a graph of luminance-angle characteristics of a liquid crystal light control device according to a third embodiment of the present invention.

FIG. 20 shows graphs of the luminance-angle characteristics of the liquid crystal light control device 102 according to the fifth configuration and the sixth configuration. FIG. 20 shows the characteristics of the reference example 3 in the same graph. The graph shown in FIG. 20, as in FIG. 12A, shows the luminance when the horizontal axis shows the polar angle, and the vertical axis shows the luminance when the luminance at the center (polar angle 0 degrees) is normalized as 100%.

In the graph shown in FIG. 20, the characteristics of the fifth configuration of the liquid crystal light control device 102 show that the same luminance (100%) as the central luminance (polar angle 0 degrees) is obtained in the range of ±30 degrees in polar angle, and that a constant luminance distribution is obtained in the same range, although it drops about 5% in the range of ±30 to ±45 degrees in polar angle. The fifth configuration shows that by adopting a configuration in which each polarized component is diffused before being optically rotated by the liquid crystal layer and not diffused after rotation, a virtually flat intensity distribution can be obtained over a certain range of polar angles. Furthermore, compared to the first configuration and the third configuration, it is found that the range of polar angles where the luminance is high, and the luminance distribution is constant is extended.

The characteristic related to the sixth configuration of the liquid crystal light control device 102 is that a trend of decreasing luminance is obtained as the polar angle spreads from the center (polar angle 0 degrees) in the positive and negative directions. In the range of polar angles from +30 to +45 degrees and from −30 to −45 degrees, a tendency for the rate of decrease in luminance to become smaller is apparent. In the sixth configuration, the diffusion of the first polarized component PL1 takes place after the polarization in the liquid crystal layer and the diffusion of the second polarized component PL2 takes place before the polarization. The characteristics related to the sixth configuration show an overall decrease in luminance compared to the fifth configuration, and different profiles are obtained in the angular characteristics of luminance.

Thus, comparing the fifth configuration with the sixth configuration, the fifth configuration has both the first polarized component and the second polarized component pre-diffused once in the X-axis direction in the process of passing through the liquid crystal light control device 102. In contrast, the sixth configuration has the first polarized component post-diffused twice in the X-axis direction and the second polarized component pre-diffused once in the X-axis direction, indicating that the twice pre-diffused configuration has a wider polar angle range to maintain constant luminance while suppressing luminance reduction than the once pre-diffused and twice post-diffused configurations.

Compared to the first configuration and the fifth configuration, the sixth configuration has a relatively higher luminance and a wider range of polar angles where the luminance is constant. The same characteristics are observed when the sixth configuration is compared with the second configuration and the fourth configuration. This change in characteristics may be due in part to the fact that the first polarized component PL1 and the second polarized component PL2 are diffused more often than in the first and second configurations.

The characteristics of the liquid crystal light control device shown as the reference example 3 show that the intensity distribution of luminance has the highest intensity at the position of 0 degrees polar angle, and tends to decrease linearly as the polar angle increases in the positive and negative directions (that is, the left and right directions). As in the cases of the reference example 1 and the reference example 2, it is found that the liquid crystal light control device related to the reference example 3 has a luminance distribution that decreases linearly in the direction of the polar angle by diffusing each polarized component in front of and behind the liquid crystal layer.

More specifically, the first polarized component in the reference example 3 is pre-diffused once in the X-axis direction, and immediately after the pre-diffusion, it is post-diffused in the same liquid crystal cell (the third liquid crystal cell) in the Y-axis direction. The second polarized component is pre-diffused once in the X-axis direction, and immediately before the post-diffusion, and it is post-diffused in the same liquid crystal cell (the fourth liquid crystal cell) in the Y-axis direction. Furthermore, in the reference example 3, the first polarized component is pre-diffused once in the Y-axis direction in the second and sixth liquid crystal cells, but is post-diffused in the X-axis direction in the same liquid crystal cell immediately after the pre-diffusion. The second polarized component is pre-diffused once in the Y-axis direction in the first and fifth liquid crystal cells and post-diffused once in the X-axis direction in the same liquid crystal cell immediately after the pre-diffusion. That is, in the reference example 3, the first polarized component has one pre-diffusion and two post-diffusions in the X-axis direction, both of which are accompanied by diffusion in the Y-axis direction in the same liquid crystal cell. For the reference example 2, there is one pre-diffusion and two post-diffusions in the X-axis direction in the second polarized component, both of which are accompanied by diffusion in the Y-axis direction in the same liquid crystal cell. FIG. 20 shows that when diffusion is accompanied by pre-diffusion and post-diffusion in the same liquid crystal cell, even if the number of pre-diffusions is the same, the luminance decreases monotonically as the polar angle increases, compared to the case where only pre-diffusion is performed (the fifth configuration).

According to FIG. 20, in the fifth configuration, while the half value width is the same as in the reference example 3, the luminance within the half value width can be maintained constant while being higher than in the reference example 3, and in the sixth configuration, the half value width is the same as in the reference example 3, and the luminance within the half value width is maintained constant while decreasing compared to the reference example 3.

According to this embodiment, it is possible to obtain a substantially flat intensity distribution over a certain range of polar angles by adopting a configuration in which each polarized component is diffused before being optically rotated in the liquid crystal cell arranged in six stacks and not diffused after the rotation in the liquid crystal layer. It is also possible to obtain a substantially flat intensity distribution over a certain range of polar angles by adopting a configuration in which each polarized component is diffused before or after being optically rotated in the liquid crystal layer in the liquid crystal cells arranged in six stacks, and is not diffused before or after the rotation in one liquid crystal cell.

Fourth Embodiment

Figure 21:
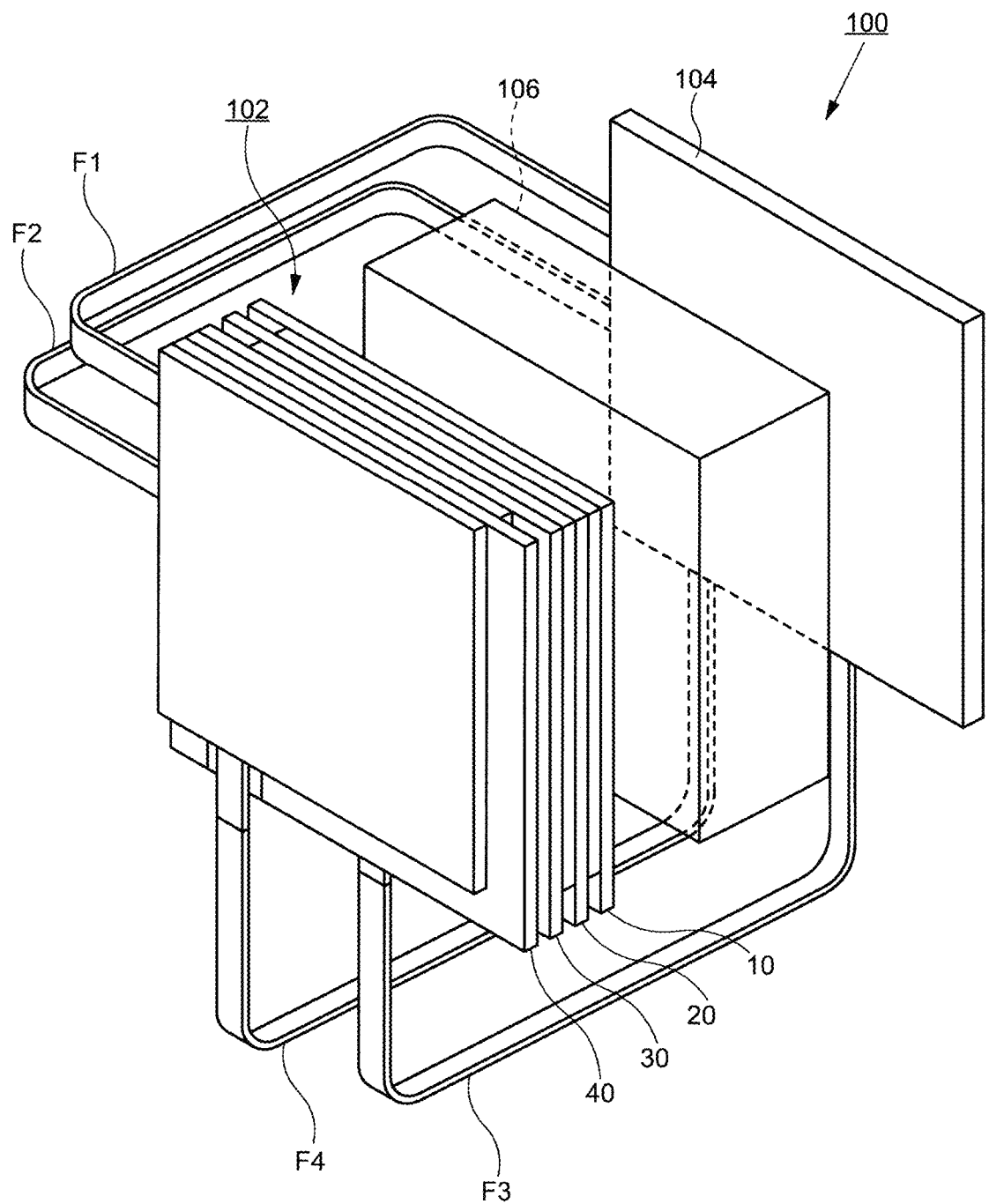
FIG. 21 is a diagram of a lighting system according to an embodiment of the present invention.

FIG. 21 shows a diagram of a lighting device 100 according to an embodiment of the present invention. The lighting device 100 includes a liquid crystal light control device 102 and a circuit board 104. The liquid crystal light control device 102 is applicable to the configurations shown in the first to fourth embodiments. FIG. 21 shows an example in which the liquid crystal light control device 102 is configured with a first liquid crystal cell 10, a second liquid crystal cell 20, a third liquid crystal cell 30, and a fourth liquid crystal cell 40. Transparent adhesive layers, not shown, are arranged between the first liquid crystal cell 10 and the second liquid crystal cell 20, between the second liquid crystal cell 20 and the third liquid crystal cell 30, and between the third liquid crystal cell 30 and the fourth liquid crystal cell 40. The liquid crystal light control device 102 has a structure in which the liquid crystal cells arranged adjacent to each other in the front and rear are bonded to each other by the transparent adhesive layer.

The circuit board 104 includes a circuit that drives the liquid crystal light control device 102. The first liquid crystal cell 10 is connected to the circuit substrate by a first flexible wiring substrate F1, the second liquid crystal cell 20 is connected to the circuit substrate 104 by a second flexible wiring substrate F2, the third liquid crystal cell 30 is connected to the circuit substrate 104 by a third flexible wiring substrate F3, and the fourth liquid crystal cell 40 is connected to the circuit substrate 104 by a fourth flexible wiring substrate F4. The circuit substrate 104 outputs control signals to each liquid crystal cell through the flexible wiring substrate to control the alignment state of the liquid crystal.

The lighting device 100 shown in FIG. 21 has a light source 106 arranged on the back side of the liquid crystal light control device 102. The lighting device 100 is configured so that light emitted from the light source 106 is emitted through the liquid crystal light control device 102 to the front side of the drawing. The liquid crystal light control device 102 is arranged with the first liquid crystal cell 10, the second liquid crystal cell 20, the third liquid crystal cell 30, and the fourth liquid crystal cell 40 in this order from the side of the light source 106.

The light source 106 includes a white light source, and if necessary, an optical element such as a lens may be arranged between the white light source and the liquid crystal light control device 102. The white light source is a light source that radiates light close to natural light and may be a light source that radiates dimmed light, such as daylight white or light bulb color. The light source 106 should be composed of a light source with a narrow light distribution range, for example, the light source 106 is preferably composed of an LED light source combined with a reflector, lens, or the like.

As shown in the first to fourth embodiments, the lighting device 100 according to the present embodiment is capable of controlling the intensity distribution of the light emitted from the light source 106 by the liquid crystal light control device 102. That is, the intensity distribution of the illumination light in the polar angular direction can be controlled by the control signal input to the liquid crystal light control device 102. The lighting device 100 of the present embodiment enables illumination in which the illuminance is adjusted within the irradiated surface.

What is claimed is:

1. A liquid crystal light control device, comprising:
    a plurality of liquid crystal cells arranged in a stack, wherein each of the plurality of liquid crystal cells comprises:
        a first substrate and a second substrate opposite the first substrate;
        a first electrode and a second electrode both of which have a strip pattern arranged on the first substrate;
        a third electrode and a fourth electrode both of which have a strip pattern arranged on the second substrate;
        a first alignment film on the first substrate;
        a second alignment film on the second substrate; and
        a liquid crystal layer between the first substrate and the second substrate,
    wherein:
        the plurality of liquid crystal cells is stacked on each other,
        the strip pattern of the first electrode and the second electrode is arranged alternately,
        the strip pattern of the third electrode and the fourth electrode is arranged alternately,
        a direction of extension of the strip pattern of the first electrode and the second electrode and a direction of extension of the strip pattern of the third electrode and the fourth electrode arranged intersecting each other,
        an alignment direction of the first alignment film is aligned with a direction that intersects the direction of extension of the strip pattern of the third electrode and the fourth electrode, and
        an alignment direction of the second alignment film is arranged intersecting the alignment direction of the first alignment film,
    wherein
        the plurality of liquid crystal cells is stacked in the order of a first liquid crystal cell, a second liquid crystal cell, a third liquid crystal cell, and a fourth liquid crystal cell from the light incident side to the light emitted side, and
        each of the plurality of liquid crystal cells is arranged with light incident from the first substrate side,
    wherein
        the direction of extension of the first electrode and the second electrode included in the first liquid crystal cell and the second liquid crystal cell are parallel to a first direction, and
        the direction of extension of the first electrode and the second electrode included in the third liquid crystal cell and the fourth liquid crystal cell are parallel to a second direction that intersects the first direction,
    wherein
        in the first liquid crystal cell and the fourth liquid crystal cell, the first electrode and the second electrode are at the same potential, and a voltage is applied between the third electrode and the fourth electrode to form a transverse electric field, and
        in the second liquid crystal cell and the third liquid crystal cell, a voltage is applied between the first electrode and the second electrode to form a transverse electric field, and the third electrode and the fourth electrode are at the same potential.

2. The liquid crystal light control device according to claim 1, wherein the liquid crystal layer is a TN (twisted nematic) liquid crystal.

3. A lighting device comprising:
    the liquid crystal light control device according to claim 1, and a light source, wherein the liquid crystal light control device is arranged on an optical path of light emitted from the light source.

4. A liquid crystal light control device, comprising:
    a plurality of liquid crystal cells arranged in a stack, wherein each of the plurality of liquid crystal cells comprises:
        a first substrate and a second substrate opposite the first substrate;
        a first electrode and a second electrode both of which have a strip pattern arranged on the first substrate;
        a third electrode and a fourth electrode both of which have a strip pattern arranged on the second substrate;
        a first alignment film on the first substrate;
        a second alignment film on the second substrate; and
        a liquid crystal layer between the first substrate and the second substrate,
    wherein
        the plurality of liquid crystal cells is stacked on each other,
        the strip pattern of the first electrode and the second electrode is arranged alternately,
        the strip pattern of the third electrode and the fourth electrode is arranged alternately,
        a direction of extension of the strip pattern of the first electrode and the second electrode and a direction of extension of the strip pattern of the third electrode and the fourth electrode arranged intersecting each other,
        an alignment direction of the first alignment film is aligned with a direction that intersects the direction of extension of the strip pattern of the third electrode and the fourth electrode, and
        an alignment direction of the second alignment film is arranged intersecting the alignment direction of the first alignment film, wherein
the plurality of liquid crystal cells is stacked in the order of a first liquid crystal cell, a second liquid crystal cell, a third liquid crystal cell, a fourth liquid crystal cell, and a fifth liquid crystal cell from the light incident side to the light emitted side, and
each of the plurality of liquid crystal cells is arranged with light incident from the first substrate side,
wherein
the direction of extension of the first electrode and the second electrode included in the second liquid crystal cell and the third liquid crystal cell are parallel to a first direction, and
the direction of extension of the first electrode and the second electrode included in the first liquid crystal cell, the fourth liquid crystal cell, and the fifth liquid crystal cell are parallel to a second direction that intersects the first direction.

5. The liquid crystal light control device according to claim 4, wherein:
in the first liquid crystal cell, the second liquid crystal cell, and the fifth liquid crystal cell, the first electrode and the second electrode are at the same potential, and a voltage is applied between the third electrode and the fourth electrode to form a transverse electric field, and
in the third liquid crystal cell and the fourth liquid crystal cell, a voltage is applied between the first electrode and the second electrode to form a transverse electric field, and the third electrode and the fourth electrode are at the same potential.

6. The liquid crystal light control device according to claim 4, wherein the liquid crystal layer is a TN (twisted nematic) liquid crystal.

7. A lighting device comprising:
the liquid crystal light control device according to claim 4, and a light source,
wherein the liquid crystal light control device is arranged on an optical path of light emitted from the light source.

8. A liquid crystal light control device, comprising:
a plurality of liquid crystal cells arranged in a stack, wherein each of the plurality of liquid crystal cells comprises:
a first substrate and a second substrate opposite the first substrate;
a first electrode and a second electrode both of which have a strip pattern arranged on the first substrate;
a third electrode and a fourth electrode both of which have a strip pattern arranged on the second substrate;
a first alignment film on the first substrate;
a second alignment film on the second substrate; and
a liquid crystal layer between the first substrate and the second substrate,
wherein
the plurality of liquid crystal cells is stacked on each other,
the strip pattern of the first electrode and the second electrode is arranged alternately,
the strip pattern of the third electrode and the fourth electrode is arranged alternately,
a direction of extension of the strip pattern of the first electrode and the second electrode and a direction of extension of the strip pattern of the third electrode and the fourth electrode arranged intersecting each other,
an alignment direction of the first alignment film is aligned with a direction that intersects the direction of extension of the strip pattern of the first electrode and the second electrode, and
an alignment direction of the second alignment film is arranged intersecting the alignment direction of the first alignment film,
wherein
the plurality of liquid crystal cells is stacked in the order of a first liquid crystal cell, a second liquid crystal cell, a third liquid crystal cell, a fourth liquid crystal cell, a fifth liquid crystal cell, and a sixth liquid crystal cell from the light incident side to the light emitted side, and
each of the plurality of liquid crystal cells is arranged with light incident from the first substrate side,
wherein
the direction of extension of the first electrode and the second electrode included in the first liquid crystal cell and the second liquid crystal cell are parallel to a second direction,
the direction of extension of the first electrode and the second electrode included in the third liquid crystal cell and the fourth liquid crystal cell are parallel to a first direction, and
the direction of extension of the first electrode and the second electrode included in the fifth liquid crystal cell and the sixth liquid crystal cell are parallel to the second direction.

9. The liquid crystal light control device according to claim 8, wherein:
in the first liquid crystal cell, the fourth liquid crystal cell, and the fifth liquid crystal cell, the third electrode and the fourth electrode are at the same potential, and a voltage is applied between the first electrode and the second electrode to form a transverse electric field, and
in the second liquid crystal cell, the third liquid crystal cell and the sixth liquid crystal cell, a voltage is applied between the first electrode and the second electrode to form a transverse electric field, and the third electrode and the fourth electrode are at the same potential.

10. The liquid crystal light control device according to claim 8, wherein the liquid crystal layer is a TN (twisted nematic) liquid crystal.

11. A lighting device comprising:
the liquid crystal light control device according to claim 8, and a light source,
wherein the liquid crystal light control device is arranged on an optical path of light emitted from the light source.

* * * * *